US008665202B2

(12) United States Patent
Tsubata

(10) Patent No.: US 8,665,202 B2
(45) Date of Patent: Mar. 4, 2014

(54) ACTIVE MATRIX SUBSTRATE, LIQUID CRYSTAL PANEL, LIQUID CRYSTAL DISPLAY DEVICE, AND TELEVISION RECEIVER

(75) Inventor: Toshihide Tsubata, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 325 days.

(21) Appl. No.: 13/322,133

(22) PCT Filed: Apr. 15, 2010

(86) PCT No.: PCT/JP2010/002753
§ 371 (c)(1),
(2), (4) Date: Nov. 22, 2011

(87) PCT Pub. No.: WO2010/137230
PCT Pub. Date: Dec. 2, 2010

(65) Prior Publication Data
US 2012/0068916 A1 Mar. 22, 2012

(30) Foreign Application Priority Data

May 25, 2009 (JP) ................. 2009-125732

(51) Int. Cl.
G09G 3/36 (2006.01)
(52) U.S. Cl.
USPC ........................................... 345/100; 349/139
(58) Field of Classification Search
CPC ..... G09G 5/10; G09G 3/3233; G09G 3/3258; G09G 3/36
USPC .......... 345/98, 99, 100, 103, 204; 349/38, 39, 349/43, 139, 143, 144; 257/59
See application file for complete search history.

(56) References Cited

U.S. PATENT DOCUMENTS 6,028,577 A 2/2000 Sakamoto
2004/0066474 A1 4/2004 Nakano et al.
(Continued)

FOREIGN PATENT DOCUMENTS

JP 4-67127 A 3/1992
JP 4-96021 A 3/1992
(Continued)

OTHER PUBLICATIONS

International Search Report (ISR) issued in PCT/JP2010/002753 (International application) mailed in Jun. 2010 for Examiner consideration.

Primary Examiner — Abbas Abdulselam
Assistant Examiner — Gerald Oliver
(74) Attorney, Agent, or Firm — Chen Yoshimura LLP

(57) ABSTRACT

Provided is an active matrix substrate for use in a liquid crystal display device in which two scan signal lines (16$i$ and 16$j$) are scanned simultaneously; pixel regions including two pixel electrodes each are arranged in the row and column directions when the column direction is the scanning direction; one scan signal line is provided for one pixel region row; and a shielding conductive body (41$p$) is disposed to cover the gap between two adjacent pixel electrodes (17$ib$ and 17$ja$), one of which is a pixel electrode included in a given pixel region (101) and the other is a pixel electrode included in a pixel region (102) adjacent to said given pixel region (101) on the downstream side of the scanning direction. By using the present active matrix substrate, the display quality of a liquid crystal display device in which two scan signal lines are selected simultaneously can be improved.

20 Claims, 46 Drawing Sheets

(56) References Cited

U.S. PATENT DOCUMENTS

| | | |
|---|---|---|
| 2006/0023134 A1 | 2/2006 | Um et al. |
| 2006/0066796 A1 | 3/2006 | Ohashi et al. |
| 2007/0001991 A1* | 1/2007 | Jang et al. .................... 345/100 |
| 2010/0014012 A1 | 1/2010 | Irie et al. |
| 2011/0058110 A1 | 3/2011 | Yamada et al. |

FOREIGN PATENT DOCUMENTS

| | | |
|---|---|---|
| JP | 4-190387 A | 7/1992 |
| JP | 5-53135 A | 3/1993 |
| JP | 5-127195 A | 5/1993 |
| JP | 10-206869 A | 8/1998 |
| JP | 10-213812 A | 8/1998 |
| JP | H10-253987 A | 9/1998 |
| JP | 11-344728 A | 12/1999 |
| JP | 2003-322865 A | 11/2003 |
| JP | 2006-23744 A | 1/2006 |
| JP | 2006-98613 A | 4/2006 |
| WO | 2008/078438 A1 | 7/2008 |
| WO | 2009/139205 A1 | 11/2009 |

* cited by examiner (a)

(b)

ACTIVE MATRIX SUBSTRATE, LIQUID CRYSTAL PANEL, LIQUID CRYSTAL DISPLAY DEVICE, AND TELEVISION RECEIVER

TECHNICAL FIELD

The present invention relates to a liquid crystal display device in which two scan signal lines are simultaneously selected, and also to an active matrix substrate and a liquid crystal panel for use in such a liquid crystal display device.

BACKGROUND ART

Patent Document 1 (see FIG. 49) discloses a liquid crystal display device in which two data lines (a left data line and a right data line) are provided for one pixel column, pixel electrodes of the pixels at the odd numbered positions within the same pixel column are connected to the left data line, pixel electrodes of the pixels at the even numbered positions within the same pixel column are connected to the right data line, and two consecutive scan signal lines (a scan signal line connected to pixels at odd numbered positions and a scan signal line connected to pixels at even numbered positions) are selected simultaneously to refresh the display faster.

RELATED ART DOCUMENTS

Patent Documents

Patent Document 1: Japanese Patent Application Laid-Open Publication No. 10-253987 (published on Sep. 25, 1998)

SUMMARY OF THE INVENTION

Problems to be Solved by the Invention

The inventors of the present invention found that the following problems occur when two scan signal lines are selected simultaneously as discussed above. That is, when two adjacent scan signal lines are selected simultaneously among pixels 1 to 6, which are arranged in a single pixel column, for example, first, pixel 1 and pixel 2 are written simultaneously, and pixel 3 and pixel 4 are written simultaneously next, and then, pixel 5 and pixel 6 are written simultaneously. As a result, due to the parasitic capacitance formed between two neighboring pixels, after the data signal is written on pixel 2, the effective potential of pixel 2 can fluctuate, affected by the writing on pixel 3 (potential polarity reversal of pixel 3), and after the data signal is written on pixel 4, the effective potential of pixel 4 can fluctuate, affected by the writing on pixel 5 (potential polarity reversal of pixel 5). This phenomenon could be shown as horizontal streaks on the display.

The present invention is aiming at improving the display quality of the liquid crystal display device in which two scan signal lines are selected simultaneously.

Means for Solving the Problems

An active matrix substrate of the present invention is for use in a liquid crystal display device in which two scan signal lines are simultaneously scanned at a time, and includes a plurality of scan signal lines and a plurality of data signal lines. The active matrix substrate is configured such that, when the scanning direction is the column direction, pixel regions including pixel electrodes are arranged in the row and column directions, one scan signal line is provided for one pixel region row; and a conductive body is disposed to overlap the gap (or disposed in the gap or under the gap) between two adjacent pixel electrodes, one of which being a pixel electrode included in a pixel region at the even numbered position in a pixel region column and the other being the pixel electrode included in the pixel region adjacent to the aforementioned pixel region at an even numbered position on the downstream side of the scanning direction, or a conductive body is disposed to overlap the gap (or disposed in the gap or under the gap) between two adjacent pixel electrodes, one of which being a pixel electrode included in a pixel region at an odd numbered position in a pixel region column and the other being a pixel electrode included in the pixel region adjacent to the aforementioned pixel region at an odd-numbered position on the downstream side of the scanning direction, or a conductive body is disposed to overlap the gap (or disposed in the gap or under the gap) between two adjacent pixel electrodes, one of which being a pixel electrode included in a given pixel region and the other being a pixel electrode included in the pixel region adjacent to the aforementioned given pixel region on the downstream side of the scanning direction.

Effects of the Invention

In the present active matrix substrate, each of the above-mentioned two adjacent pixel electrodes can be electrically shielded by a conductive body. According to this configuration, a phenomenon in which the effective potential fluctuates on every other line (scan signal line), which can be caused when two scan signal lines are simultaneously scanned at a time, can be suppressed. Consequently, in a liquid crystal display device using the present active matrix substrate, horizontal streaks caused by the above-mentioned phenomenon can be reduced.

DETAILED DESCRIPTION OF EMBODIMENTS

The embodiments of the present invention are described with reference to FIGS. 1 to 48 as follows. In the description below, it is assumed that the direction in which scan signal lines extend is the row direction for convenience. Needless to say, however, when a liquid crystal display device equipped with the present liquid crystal panel (or the active matrix substrate used in the liquid crystal panel) is in use (when viewed), the scan signal line can extend either horizontal or vertical direction. Also, in figures showing the liquid crystal panels, the alignment control structure is omitted when appropriate.

Embodiment 1

Figure 1:
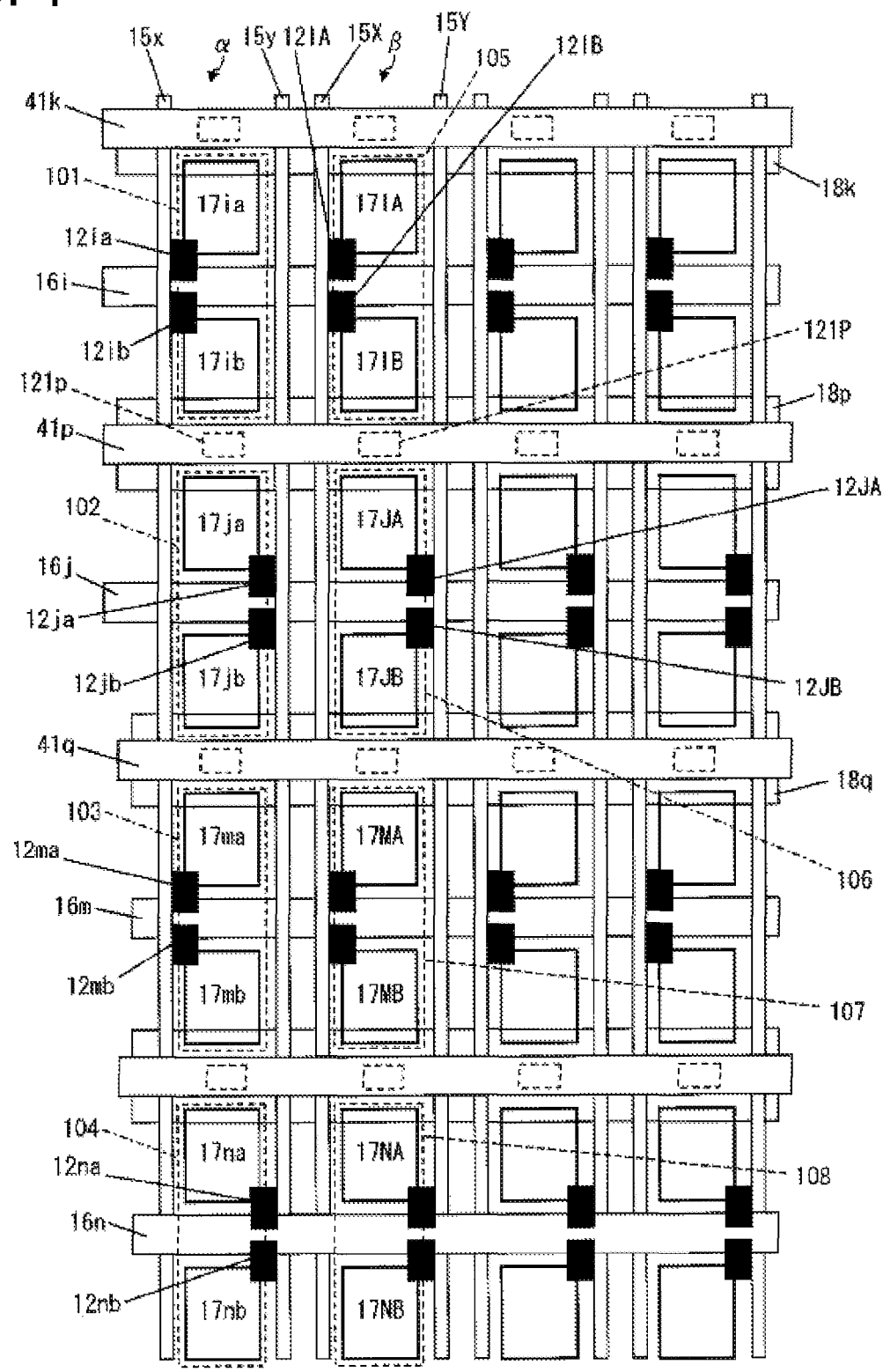
FIG. 1 is a schematic view showing a configuration example of an active matrix substrate according to Embodiment 1.

FIG. 1 is a schematic view showing a portion of an active matrix substrate according to Embodiment 1. As shown in FIG. 1, in the present active matrix substrate, a pixel region column α in which pixel regions 101 to 104 are disposed in the scanning direction in this order, and a pixel region column β in which pixel regions 105 to 108 are disposed in the scanning direction in this order are adjacent to each other. Pixel regions 101 and 105, pixel regions 102 and 106, pixel regions 103 and 107, and pixel regions 104 and 108 each constitute a pixel region row, and one scan signal line is provided for one pixel region row. Specifically, a scan signal line 16$i$ is disposed across the pixel regions 101 and 105, a scan signal line 16$j$ is disposed across the pixel regions 102 and 106, a scan signal line 16$m$ is disposed across pixel regions 103 and 107, and a scan signal line 16$n$ is disposed across pixel regions 104 and 108. Further, for one pixel region column, two data signal lines are provided. Specifically, for a pixel region column α, two data signal lines 15$x$ and 15$y$ are provided, and for a pixel region column β, two data signal lines 15X and 15Y are provided. The data signal lines 15$x$, 15$y$, 15X and 15Y are disposed in this order.

Further, in each pixel region, two pixel electrodes are disposed in the scanning direction. Any given pixel region in a pixel region column includes two pixel electrodes connected to one of the two data signal lines for the pixel region column through transistors, and the pixel region adjacent to this pixel region on the downstream side of the scanning direction includes two pixel electrodes connected to the other of the data signal lines through transistors. Specifically, in the pixel region 101 of the pixel region column α, pixel electrodes 17ia and 17ib are disposed along the scanning direction in this order, and the pixel electrode 17ia is connected to a data signal line 15x through a transistor 12ia tied to a scan signal line 16i and the pixel electrode 17ib is connected to the data signal line 15x through a transistor 12ib tied to the scan signal line 16i. Also, in the pixel region 102, which is adjacent to the pixel region 101 on the downstream side of the scanning direction, pixel electrodes 17ja and 17jb are disposed along the scanning direction in this order, and the pixel electrode 17ja is connected to a data signal line 15y through a transistor 12ja tied to a scan signal line 16j and the pixel electrode 17jb is connected to the data signal line 15y through a transistor 12jb tied to the scan signal line 16j.

Similarly, in the pixel region 105 of the pixel region column β, pixel electrodes 17IA and 17IB are disposed along the scanning direction in this order, and pixel electrode 17IA is connected to a data signal line 15X through a transistor 12IA tied to the scan signal line 16i and a pixel electrode 17IB is connected to the data signal line 15X through a transistor 12IB tied to the scan signal line 16i. Also, in the pixel region 106 adjacent to the pixel region 105 on the downstream side of the scanning direction, pixel electrodes 17JA and 17JB are disposed along the scanning direction in this order, and the pixel electrode 17JA is connected to a data signal line 15Y through a transistor 12JA tied to the scan signal line 16j and the pixel electrode 17JB is connected to the data signal line 15Y through a transistor 12JB tied to the scan signal line 16j.

Also, in the pixel region 103 of the pixel region column α, pixel electrodes 17ma and 17mb are disposed along the scanning direction in this order, and the pixel electrode 17ma is connected to the data signal line 15x through a transistor 12ma tied to a scan signal line 16m and the pixel electrode 17mb is connected to the data signal line 15x through a transistor 12mb tied to the scan signal line 16m. Also, in the pixel region 104, which is adjacent to pixel region 103 on the downstream side of the scanning direction, pixel electrodes 17na and 17nb are disposed along the scanning direction in this order, and the pixel electrode 17na is connected to the data signal line 15y through a transistor 12na tied to a scan signal line 16n and the pixel electrode 17nb is connected to the data signal line 15y through a transistor 12nb tied to the scan signal line 16n.

Here, a linear electrode (shield electrode) is disposed in the gap between two adjacent pixel electrodes, i.e., between a pixel electrode in a given pixel region and a pixel electrode in the pixel region adjacent to the above-mentioned given pixel region on the downstream side of the scanning direction. Also, a storage capacitance wiring is disposed to overlap the gap.

Specifically, the pixel electrode 17ib in the pixel region 101 and the pixel electrode 17ja in the pixel region 102 are adjacent to each other, a linear electrode 41p is disposed in the gap between the pixel electrode 17ib and the pixel electrode 17ja, and a storage capacitance wiring 18p is disposed to overlap this gap. Also, the pixel electrode 17IB in the pixel region 105 and the pixel electrode 17JA in the pixel region 106 are adjacent to each other, the linear electrode 41p is disposed in the gap between the pixel electrode 17IB and the pixel electrode 17JA, and the storage capacitance wiring 18p is disposed to overlap the gap between the pixel electrode 17IB and the pixel electrode 17JA. The storage capacitance wiring 18p and the linear electrode 41p are connected to each other through contact holes. Also, the pixel electrode 17jb of the pixel region 102 and the pixel electrode 17ma of the pixel region 103 are adjacent to each other, the linear electrode 41q is disposed in the gap between the pixel electrode 17jb and the pixel electrode 17ma, and a storage capacitance wiring 18q is disposed to overlap this gap. The storage capacitance wiring 18q and the linear electrode 41q are connected to each other through contact holes.

The scan signal line 16i and the scan signal line 16j are connected inside the panel or outside the panel, for example, and they (16i and 16j) are selected simultaneously (to be described later). Also, the scan signal line 16m and the scan signal line 16n are connected inside the panel or outside the panel, for example, and they (16m and 16n) are selected simultaneously (to be described later).

Figure 2:
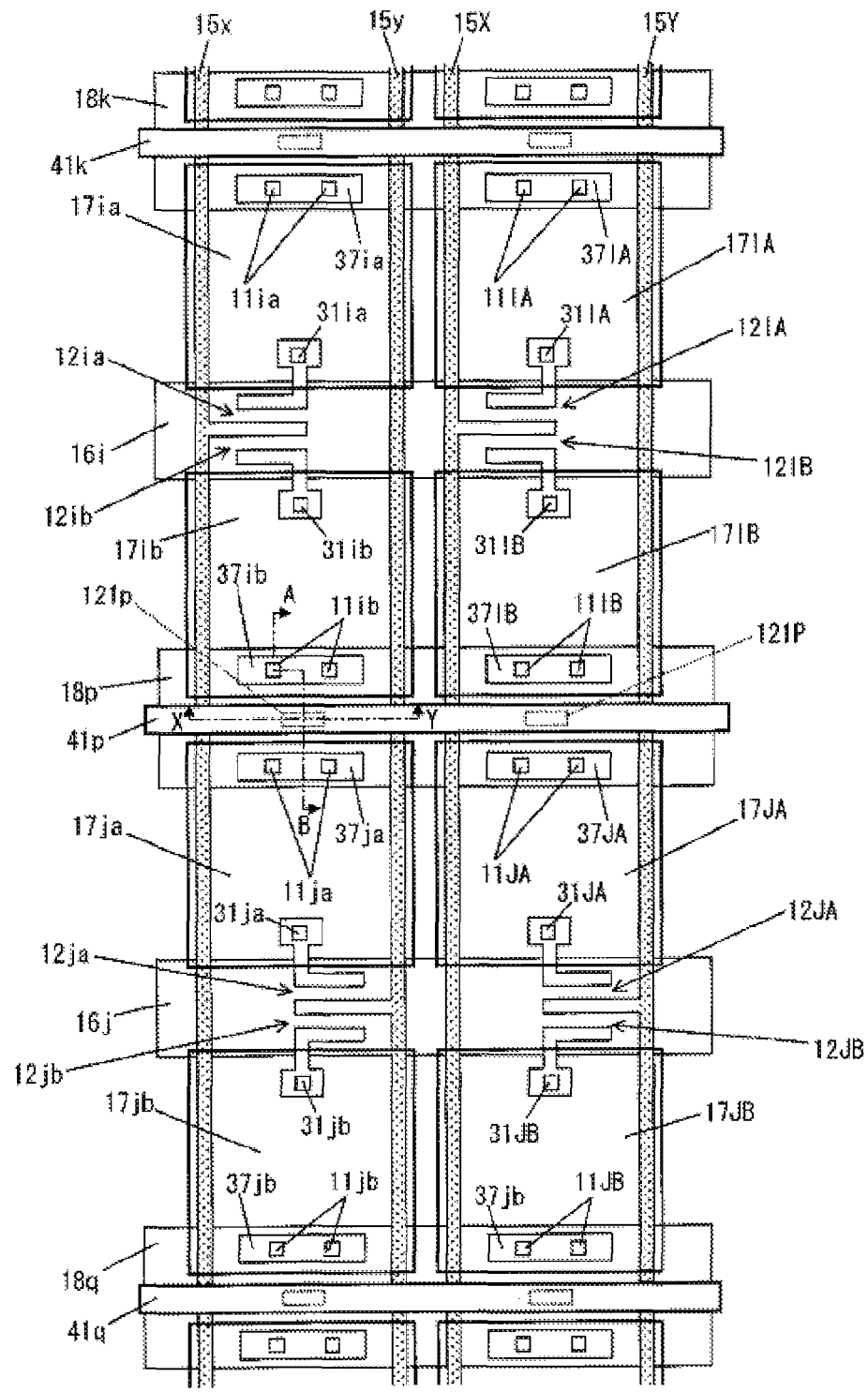
FIG. 2 is a plan view showing a configuration example of a liquid crystal panel equipped with the active matrix substrate of FIG. 1.

FIG. 2 is a plan view showing a portion of a liquid crystal panel equipped with the active matrix substrate of FIG. 1. In FIG. 2, members of the color filter substrate (opposite substrate) are omitted, and only members of the active matrix substrate are illustrated for simplicity.

In the present liquid crystal panel, a pair of data signal lines 15x and 15y and a pair of data signal lines 15X and 15Y are disposed such that the data signal line 15y and the data signal line 15X are adjacent to each other, the scan signal line 16i and the scan signal line 16j are disposed such that they cross the data signal lines at a right angle, transistors 12ia and 12ib are disposed near the intersection of the data signal line 15x and the scan signal line 16i, transistors 12ja and 12jb are disposed near the intersection of the data signal line 15y and the scan signal line 16j, transistors 12IA and 12IB are disposed near the intersection of the data signal line 15X and the scan signal line 16i, and transistors 12JA and 12JB are disposed near the intersection of the data signal line 15Y and the scan signal line 16j.

Also, a pixel electrode 17ia is disposed to overlap the edge of the scan signal line 16i on the upstream side of the scanning direction and the data signal lines 15x and 15y; a pixel electrode 17ib is disposed to overlap the edge of the scan signal line 16i on the downstream side of the scanning direction and the data signal lines 15x and 15y; a pixel electrode 17ja is disposed to overlap the edge of the scan signal line 16j on the upstream side of the scanning direction and the data signal lines 15x and 15y; a pixel electrode 17jb is disposed to overlap the edge of the scan signal line 16j on the downstream side of the scanning direction and the data signal lines 15x and 15y; a pixel electrode 17IA is disposed to overlap the edge of the scan signal line 16i on the upstream side of the scanning direction and the data signal lines 15X and 15Y; a pixel electrode 17IB is disposed to overlap the edge of the scan signal line 16i on the downstream side of the scanning direction and the data signal lines 15X and 15Y; a pixel electrode 17JA is disposed to overlap the edge of the scan signal line 16j on the upstream side of the scanning direction and the data signal lines 15X and 15Y; and a pixel electrode 17JB is disposed to overlap the edge of the scan signal line 16j on the downstream side of the scanning direction and the data signal lines 15X and 15Y.

Here, a linear electrode 41p is disposed in the gap between the pixel electrode 17ib and the pixel electrode 17ja, and a storage capacitance wiring 18p is disposed to overlap this gap. Further, the linear electrode 41p and the storage capacitance wiring 18p are connected to each other through a contact hole 121p provided to overlap the gap between the pixel electrode 17ib and the pixel electrode 17ja. Also, the linear electrode 41p is disposed in the gap between the pixel electrode 17IB and the pixel electrode 17JA, and the storage capacitance wiring 18p is disposed to overlap the gap between the pixel electrode 17IB and the pixel electrode 17JA. The linear electrode 41p and the storage capacitance wiring 18p are connected to each other through a contact hole 121P provided to overlap the gap between the pixel electrode 17IB and the pixel electrode 17JA.

When observed in a plan view, the two edges of the pixel electrode 17ia extending along the column direction are located outside the data signal line 15x and the data signal line 15y; the two edges of the pixel electrode 17ib extending along the column direction are located outside the data signal line 15x and the data signal line 15y; the two edges of the pixel electrode 17ja extending along the column direction are located outside the data signal line 15x and the data signal line 15y; the two edges of the pixel electrode 17jb extending along the column direction are located outside the data signal line 15x and the data signal line 15y; the two edges of the pixel electrode 17IA extending along the column direction are located outside the data signal line 15X and the data signal line 15Y; the two edges of the pixel electrode 17IB extending along the column direction are located outside the data signal line 15X and the data signal line 15Y; the two edges of the pixel electrode 17JA extending along the column direction are located outside the data signal line 15X and the data signal line 15Y; and the two edges of the pixel electrode 17JB extending along the column direction are located along the data signal line 15X and the data signal line 15Y.

The scan signal line 16i functions as the gate electrode of the transistor 12ia, the source electrode of the transistor 12ia is connected to the data signal line 15x, and the drain electrode is connected to the pixel electrode 17ia through a contact hole 31ia. The capacitance electrode 37ia is located over the storage capacitance wiring 18k, and is connected to the pixel electrode 17ia through two contact holes 11ia. The scan signal line 16i functions as the gate electrode of the transistor 12ib, the source electrode of the transistor 12ib is connected to the data signal line 15x, and the drain electrode is connected to the pixel electrode 17ib through a contact hole 31ib. The capacitance electrode 37ib is located over the storage capacitance wiring 18p, and is connected to the pixel electrode 17ib through two contact holes 11ib. Also, the scan signal line 16j functions as the gate electrode of the transistor 12ja, the source electrode of the transistor 12ja is connected to the data signal line 15y, and the drain electrode is connected to the pixel electrode 17ja through a contact hole 31ja. The capacitance electrode 37ja is located over the storage capacitance wiring 18p, and is connected to the pixel electrode 17ja through two contact holes 11ja. Also, the scan signal line 16j functions as the gate electrode of the transistor 12jb, the source electrode of the transistor 12jb is connected to the data signal line 15y, and the drain electrode is connected to the pixel electrode 17jb through a contact hole 31jb. The capacitance electrode 37jb is located over the storage capacitance wiring 18q, and is connected to the pixel electrode 17jb through two contact holes 11jb.

Similarly, the scan signal line 16i functions as the gate electrode of the transistor 12IA, the source electrode of the transistor 12IA is connected to the data signal line 15X, and the drain electrode is connected to the pixel electrode 17IA through a contact hole 31IA. The capacitance electrode 37IA is located over the storage capacitance wiring 18k, and is connected to the pixel electrode 17IA through two contact holes 11IA. Also, the scan signal line 16i functions as the gate electrode of the transistor 12IB, the source electrode of the transistor 12IB is connected to the data signal line 15X, and the drain electrode is connected to the pixel electrode 17IB through a contact hole 31IB. The capacitance electrode 37IB is located over the storage capacitance wiring 18p, and is connected to the pixel electrode 17IB through two contact holes 11IB. Also, the scan signal line 16j functions as the gate electrode of the transistor 12JA, the source electrode of the transistor 12JA is connected to the data signal line 15Y, and the drain electrode is connected to the pixel electrode 17JA through a contact hole 31JA. The capacitance electrode 37JA is located over the storage capacitance wiring 18p, and is connected to the pixel electrode 17JA through two contact holes 11JA. Also, the scan signal line 16j functions as the gate electrode of the transistor 12JB, the source electrode of the transistor 12JB is connected to the data signal line 15Y, and the drain electrode is connected to the pixel electrode 17JB through a contact hole 31JB. The capacitance electrode 37JB is located over the storage capacitance wiring 18q, and is connected to the pixel electrode 17JB through two contact holes 11JB.

In the present liquid crystal panel, storage capacitances are formed at locations where the storage capacitance wiring 18k and the capacitance electrode 37ia overlap through the gate insulating film, where the storage capacitance wiring 18p and the capacitance electrode 37ib overlap through the gate insulating film, where the storage capacitance wiring 18p and the capacitance electrode 37ja overlap through the gate insulating film, where the storage capacitance wiring 18q and the capacitance electrode 37jb overlap through the gate insulating film, where the storage capacitance wiring 18k and the capacitance electrode 37IA overlap through the gate insulating film, where the storage capacitance wiring 18p and the capacitance electrode 37IB overlap through the gate insulating film, where the storage capacitance wiring 18p and the capacitance electrode 37JA overlap through the gate insulating film, and where the storage capacitance wiring 18q and the capacitance electrode 37JB overlap through the gate insulating film.

Figure 3:
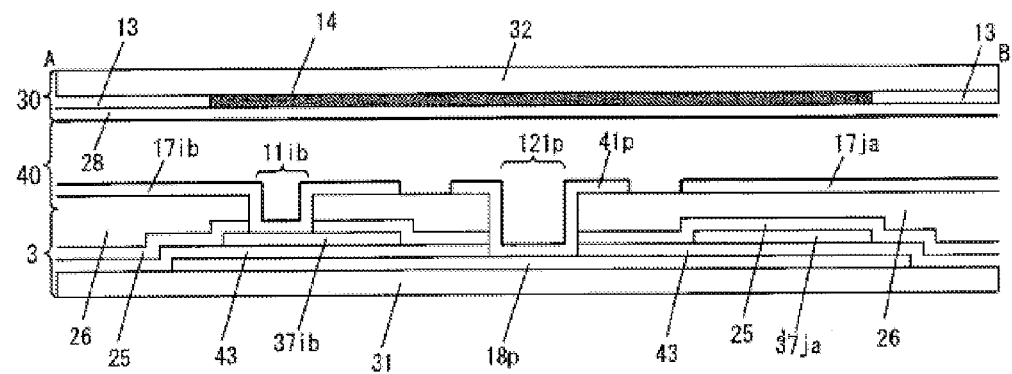
FIG. 3 is a cross-sectional arrow view of the liquid crystal panel of FIG. 2, taken along the line A-B.
Figure 4:
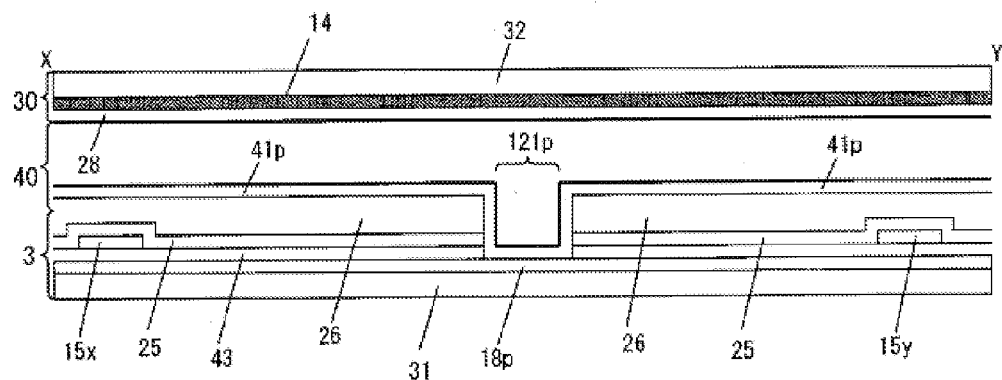
FIG. 4 is a cross-sectional arrow view of the liquid crystal panel of FIG. 2, taken along the line X-Y.

FIG. 3 is a cross-sectional arrow view taken along the line A-B of FIG. 2, and FIG. 4 is a cross-sectional arrow view taken along the line X-Y of FIG. 2. As shown in FIGS. 3 and 4, the present liquid crystal panel includes an active matrix substrate 3, a color filter substrate 30 facing the active matrix substrate 3, and a liquid crystal layer 40 interposed between the substrates (3 and 30). Referring to the active matrix substrate 3, a storage capacitance wiring 18p is formed on a glass substrate 31, and a gate insulating film 43 is formed to cover the storage capacitance wiring 18p. Although not included in the cross section, scan signal lines are formed on the glass substrate 31. On the gate insulating film 43, capacitance electrodes 37ib and 37ja and data signal lines 15x and 15y are formed. Although not included in the cross section, on the gate insulating film 43, transistors' semiconductor layers (i layer and n+ layer), and source electrodes and drain electrodes in contact with the n+ layer are formed. Further, an inorganic interlayer insulating film 25 is formed to cover the metal layer including the source and drain electrodes of transistors, and on the interlayer insulating film 25, an organic interlayer insulating film 26, which is thicker than the inorganic interlayer insulating film 25, is formed. On the organic interlayer insulating film 26, pixel electrodes 17ib and 17ja and a linear electrode 41p are formed, and further, an alignment film (not shown) is formed, covering these pixel electrodes. Also, at the locations where contact holes 11ib are formed, an inorganic interlayer insulating film 25 and an organic interlayer insulating film 26 are removed and the pixel electrode 17ib and the capacitance electrode 37ib are in contact with each other. Also, at the location where a contact hole 121p is formed, the gate insulating film 43, inorganic interlayer insulating film 25, and organic interlayer insulating film 26 are removed, and the linear electrode 41$p$ and the storage capacitance wiring 18$p$ are in contact with each other. Also, as described above, a storage capacitance is formed at a location where the storage capacitance wiring 18$p$ and the capacitance electrode 37$ib$ overlap with each other through the gate insulating film 43, and a storage capacitance is formed where the storage capacitance wiring 18$p$ and the capacitance electrode 37$ja$ overlap with each other through the gate insulating film 43.

On the other hand, referring to the color filter substrate 30, a black matrix 13 and a colored layer (color filter layer) 14 are formed on a glass substrate 32, over which a common electrode (com) 28 is formed, and, furthermore, over which an alignment film (not shown) is formed.

Next, a method for manufacturing the present liquid crystal panel is described. The method for manufacturing the liquid crystal panel includes the steps of: manufacturing the active matrix substrate, manufacturing the color filter substrate, and assembling the substrates in which the substrates are bonded together and the liquid crystal is filled.

First, over a substrate made of glass, plastic, or the like, a metal film of titanium, chrome, aluminum, molybdenum, tantalum, tungsten, copper, or the like, an alloy film of such metals, or a layered film (thickness: 1000 Å-3000 Å) of such metals are deposited by sputtering. Then, patterning is conducted by a photolithographic technology (Photo Engraving Process; hereinafter referred to as "PEP technology" and is assumed to include the etching process) to form scan signal lines (gate electrodes of transistors) and storage capacitance wirings.

Next, over the entire substrate with the scan signal lines formed thereon, an inorganic insulating film (thickness: approx. 3000 Å-5000 Å) made of silicon nitride, silicon oxide, or the like is deposited by CVD (Chemical Vapor Deposition), and a gate insulating film is formed.

Subsequently, an intrinsic amorphous silicon film (thickness: 1000 Å-3000 Å) and an n+ amorphous silicon film (thickness: 400 Å-700 Å) doped with phosphorus are continuously deposited over the gate insulating film (over the entire substrate) by CVD. Then, the films are patterned and the photoresist is removed by PEP technology to form an island-shaped multi-layered body of silicon composed of the intrinsic amorphous silicon layer and the n+ amorphous silicon layer on the gate electrode.

Next, over the entire substrate with the multi-layered body of silicon formed thereon, a metal film of titanium, chrome, aluminum, molybdenum, tantalum, tungsten, copper, or the like, an alloy film of such metals, or a layered film (thickness: 1000 Å-3000 Å) of such metals is deposited by sputtering. Then, patterning is conducted by the PEP technology to form data signal lines, source electrodes and drain electrodes of transistors, and capacitance electrodes (metal layer formation). Here, resist is removed as necessary.

Further, using the photoresist used for the metal wirings formation or using the source electrode and the drain electrode as a mask, the n+ amorphous silicon layer constituting the multi-layered body of silicon is etched away and the photoresist is removed to form a transistor channel. Here, although the semiconductor layer may be formed of amorphous silicon film as described above, a polysilicon film may alternatively be deposited. Also, the amorphous silicon film or the polysilicon film may optionally be subjected to a laser annealing treatment for improved crystallinity. This treatment makes the electrons in the semiconductor layer move faster, and therefore improves the characteristics of the transistor (TFT).

Next, an interlayer insulating film is formed over the entire substrate on which data signal lines and the like have been formed. Specifically, a mixed gas of $SiH_4$, $NH_3$, and $N_2$ is used to form an inorganic interlayer insulating film (passivation film) made of SiNx with CVD to the thickness of approx. 3000 Å to cover the entire substrate, and further, an organic interlayer insulating film made of positive photosensitive acrylic resin having a thickness of approx. 3 μm is formed with the spin coating or die coating.

Subsequently, with the PEP technology, the organic interlayer insulating film is patterned for contact holes, and then the organic interlayer insulating film is baked. Further, using the pattern of the organic interlayer insulating film, the inorganic interlayer insulating film or the inorganic interlayer insulating film and the gate insulating film are etched away to form contact holes.

Then, over the interlayer insulating film on the entire substrate with contact holes formed therein, a transparent conductive film made of ITO (Indium Tin Oxide), IZO (Indium Zinc Oxide), zinc oxide, tin oxide, or the like (thickness: 1000 Å-2000 Å) is formed by sputtering. Then, patterning is conducted and a resist is removed using the PEP technology to form pixel electrodes and linear electrodes (shield electrodes).

Lastly, a polyimide resin is printed to a thickness of 500 Å to 1000 Å over the entire substrate with the pixel electrodes formed thereon. Then, through baking and a unidirectional rubbing treatment using a rotating cloth, an alignment film is formed. The active matrix substrate is manufactured in this manner.

Below, the process of manufacturing the color filter substrate is described.

First, over a substrate made of glass, plastic, or the like (over the entire substrate), a chrome thin film or a resin containing a black pigment is deposited. Then, using the PEP technology, the film is patterned to form a black matrix. Next, in openings in the black matrix, a color filter layer (thickness: approx. 2 μm) of red, green, and blue is formed by patterning using a pigment dispersing method or the like.

Next, on the color filter layer over the entire substrate, a transparent conductive film (thickness: approx. 1000 Å) made of ITO, IZO, zinc oxide, tin oxide, or the like is deposited to form a common electrode (com).

Lastly, a polyimide resin is printed to a thickness of 500 Å to 1000 Å over the entire substrate with the common electrode formed thereon. Then, through baking and a unidirectional rubbing treatment using a rotating cloth, an alignment film is formed. The color filter substrate can be manufactured in this manner.

Below, an assembly process is described.

First, a sealing material made of a thermosetting epoxy resin or the like is applied on either the active matrix substrate or the color filter substrate by screen printing in a frame-like pattern having an opening, which will be the inlet for the liquid crystal. On the other substrate, ball-shaped spacers made of plastic or silica and having a diameter equivalent to the thickness of the liquid crystal layer are dispersed. Instead of dispersing spacers, spacers may be formed on BM of CF substrate or on metal wirings of the active matrix substrate using the PEP technology.

Next, the active matrix substrate and the color filter substrate are bonded together, and the sealing material is cured.

Lastly, the liquid crystal material is introduced into the space surrounded by the active matrix substrate, the color filter substrate, and the sealing material by a decompression procedure. Then, a UV-curable resin is applied to the inlet for the liquid crystal and is subjected to UV radiation to seal in the liquid crystal material and thereby to form a liquid crystal layer. The liquid crystal panel is manufactured in this manner.

Figure 5:
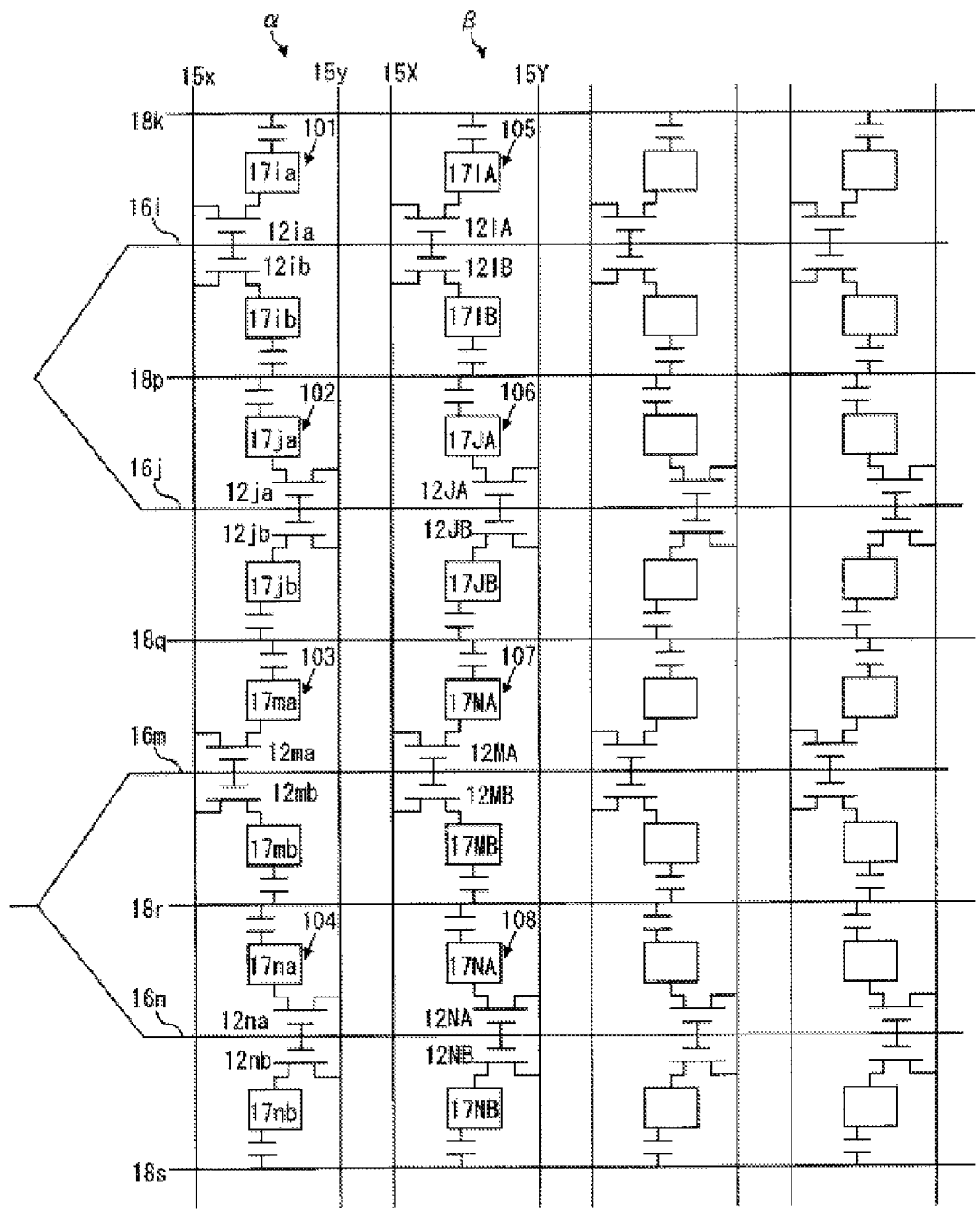
FIG. 5 is an equivalent circuit diagram of the active matrix substrate of FIG. 1.
Figure 6:
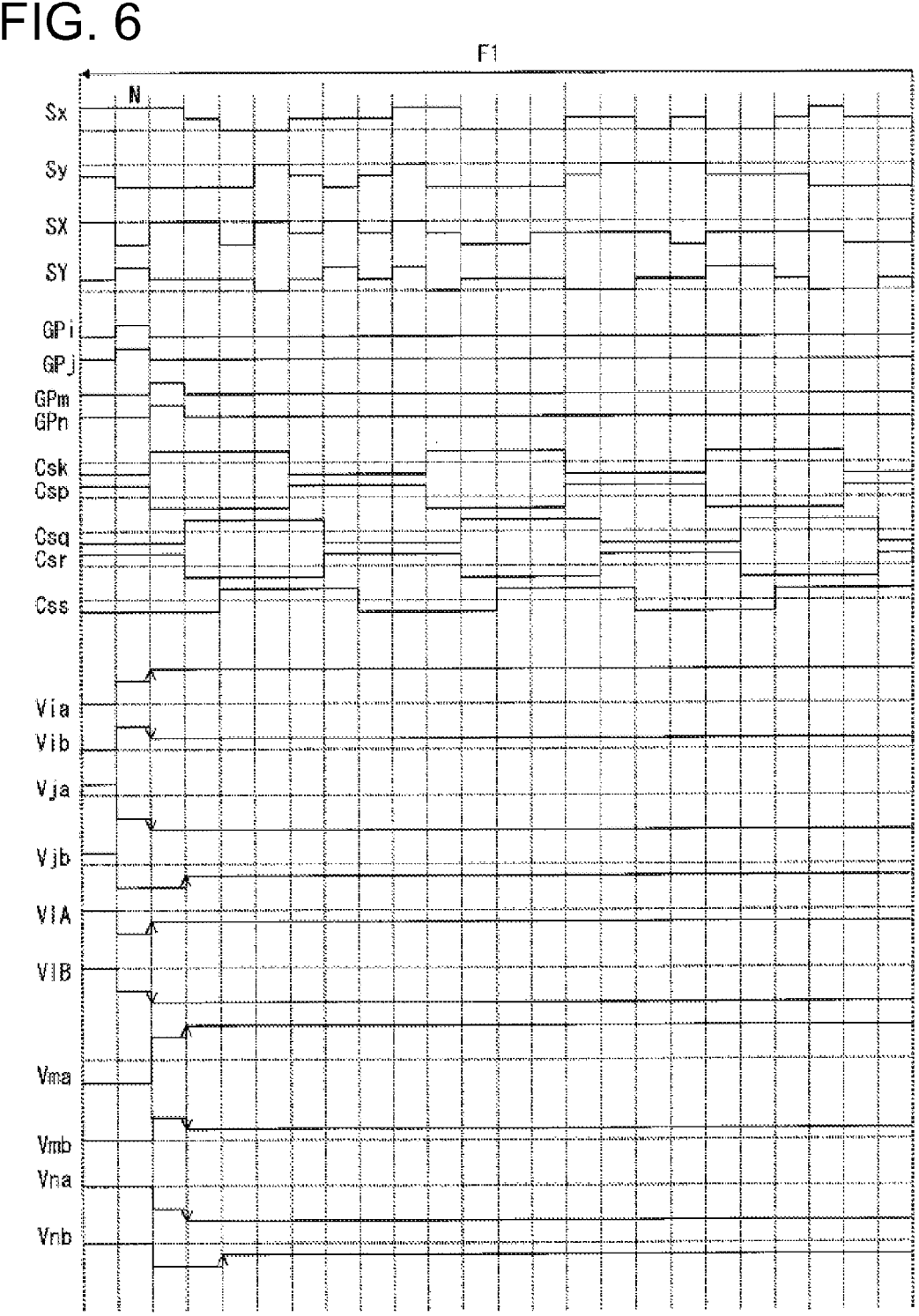
FIG. 6 is a timing chart showing a driving method (frame 1) of a liquid crystal panel equipped with the active matrix substrate of FIG. 5.

FIG. 5 is an equivalent circuit diagram of the active matrix substrate of FIG. 1, and FIG. 6 is a timing chart illustrating a driving method (normally black mode) of the liquid crystal panel equipped with the active matrix substrate of FIG. 1 (FIG. 5).

Sx, Sy, SX, and SY denote data signals (data signals) supplied to data signal lines 15x, 15y, 15X, and 15Y, respectively. GPi, GPj, GPm, and GPn denote gate signals supplied to scan signal lines 16i, 16j, 16m, and 16n, respectively. Csk, Csp, Csq, Csr, and Css denote storage capacitance wiring signals (Cs signals) supplied to storage capacitance wirings 18k, 18p, 18q, 18r, and 18s, respectively. Via, Vib, Vja, Vjb, VIA, VIB, Vma, Vmb, Vna, and Vnb denote potentials of pixel electrodes 17ia, 17ib, 17ja, 17jb, 17IA, 17IB, 17ma, 17mb, 17na, and 17nb, respectively. Although the potentials of the pixel electrodes fluctuate periodically after the data signals are written, they are shown as effective values (constant value) in this timing chart.

In the present driving method, as shown in FIG. 6, two scan signal lines are simultaneously selected at a time, the polarity of the data signals supplied to the data signal lines are reversed in every frame period (1V), and in the same vertical scanning period, data signals of opposite polarities are supplied to the two data signal lines for the same pixel region column (15x and 15y or 15X and 15Y). To the storage capacitance wirings, storage capacitance signals whose polarities change for every horizontal scanning period are supplied.

Specifically, in F1 of consecutive frames F1 and F2, to the data signal line 15x and the data signal line 15Y, data signals of positive polarity are supplied during the Nth horizontal scanning period (including the scanning period of scan signal lines 16i and 16j), and data signals of positive polarity are supplied also during the (N+1)th horizontal scanning period (including the scanning period of the scan signal lines 16m and 16n); to the data signal line 15y and the data signal line 15X, data signals of negative polarity are supplied during the Nth horizontal scanning period (including the scanning period of the scan signal lines 16i and 16j), and data signals of negative polarity are supplied also during the (N+1)th horizontal scanning period (including the scanning period of the scan signal lines 16m and 16n). To the storage capacitance wiring 18k, a storage capacitance wiring signal whose polarity reverses every 4H and reverses from negative to positive at the end of the Nth horizontal scanning period is supplied. To the storage capacitance wiring 18p, a storage capacitance wiring signal whose polarity reverses every 4H and reverses from positive to negative at the end of the Nth horizontal scanning period is supplied. To the storage capacitance wiring 18q, a storage capacitance wiring signal whose polarity reverses every 4H and reverses from negative to positive at the end of the (N+1)th horizontal scanning period is supplied. To the storage capacitance wiring 18r, a storage capacitance wiring signal whose polarity reverses every 4H and reverses from positive to negative at the end of the (N+1)th horizontal scan period is supplied. To the storage capacitance wiring 18s, a storage capacitance wiring signal whose polarity reverses every 4H and reverses from negative to positive at the end of the (N+2)th horizontal scanning period is supplied.

As a result, as shown in FIG. 6, because the potential of the pixel electrode 17ia has a positive polarity and the potential of the storage capacitance wiring 18k initially shifts to the positive direction after the data signal is written, its effective potential becomes higher than the potential of the data signal written (absolute value of the effective potential where Vcom is the reference>absolute value of the data signal where Vcom is the reference). Also, because the potential of the pixel electrode 17ib has a positive polarity and the potential of the storage capacitance wiring 18p initially shifts to the negative direction after the data signal is written, its effective potential becomes lower than the potential of the data signal written (absolute value of the effective potential<absolute value of the data signal). Also, because the potential of the pixel electrode 17ja has a negative polarity and the potential of the storage capacitance wiring 18p initially shifts to the negative direction after the data signal is written, the effective potential becomes lower than the potential of the data signal written (absolute value of the effective potential>absolute value of the data signal). Also, because the potential of the pixel electrode 17jb has a negative polarity and the potential of the storage capacitance wiring 18q initially shifts to the positive direction after the data signal is written, the effective potential becomes higher than the potential of the data signal written (absolute value of the effective potential<absolute value of the data signal). Also, because the potential of the pixel electrode 17IA has a negative polarity and the potential of the storage capacitance wiring 18k initially shifts to the positive direction after the data signal is written, the effective potential becomes higher than the potential of the data signal written (absolute value of the effective potential<absolute value of the data signal). Also, because the potential of the pixel electrode 17IB has a negative polarity and the potential of the storage capacitance wiring 18p initially shifts to the negative direction after the data signal is written, the effective potential becomes lower than the potential of the data signal written (absolute value of the effective potential>absolute value of the data signal). Because the potential of the pixel electrode 17ma has a positive polarity and the potential of the storage capacitance wiring 18q shifts to the positive direction after the data signal is written, the effective potential becomes higher than the potential of the data signal written (absolute value of the effective potential>absolute value of the data signal). Also, because the potential of the pixel electrode 17mb has a positive polarity and the potential of the storage capacitance wiring 18r initially shifts to the negative direction after the data signal is written, the effective potential becomes lower than the potential of the data signal written (absolute value of the effective potential<absolute value of the data signal). Also, because the potential of the pixel electrode 17na has a negative polarity and the potential of the storage capacitance wiring 18r initially shifts to the negative direction after the data signal is written, the effective potential becomes lower than the potential of the data signal written (absolute value of the effective potential>absolute value of the data signal). Also, because the potential of the pixel electrode 17nb has a negative polarity and the potential of the storage capacitance wiring 18s initially shifts to the positive direction after the data signal is written, the effective potential becomes higher than the potential of the data signal written (absolute value of the effective potential<absolute value of the data signal).

Figure 7:
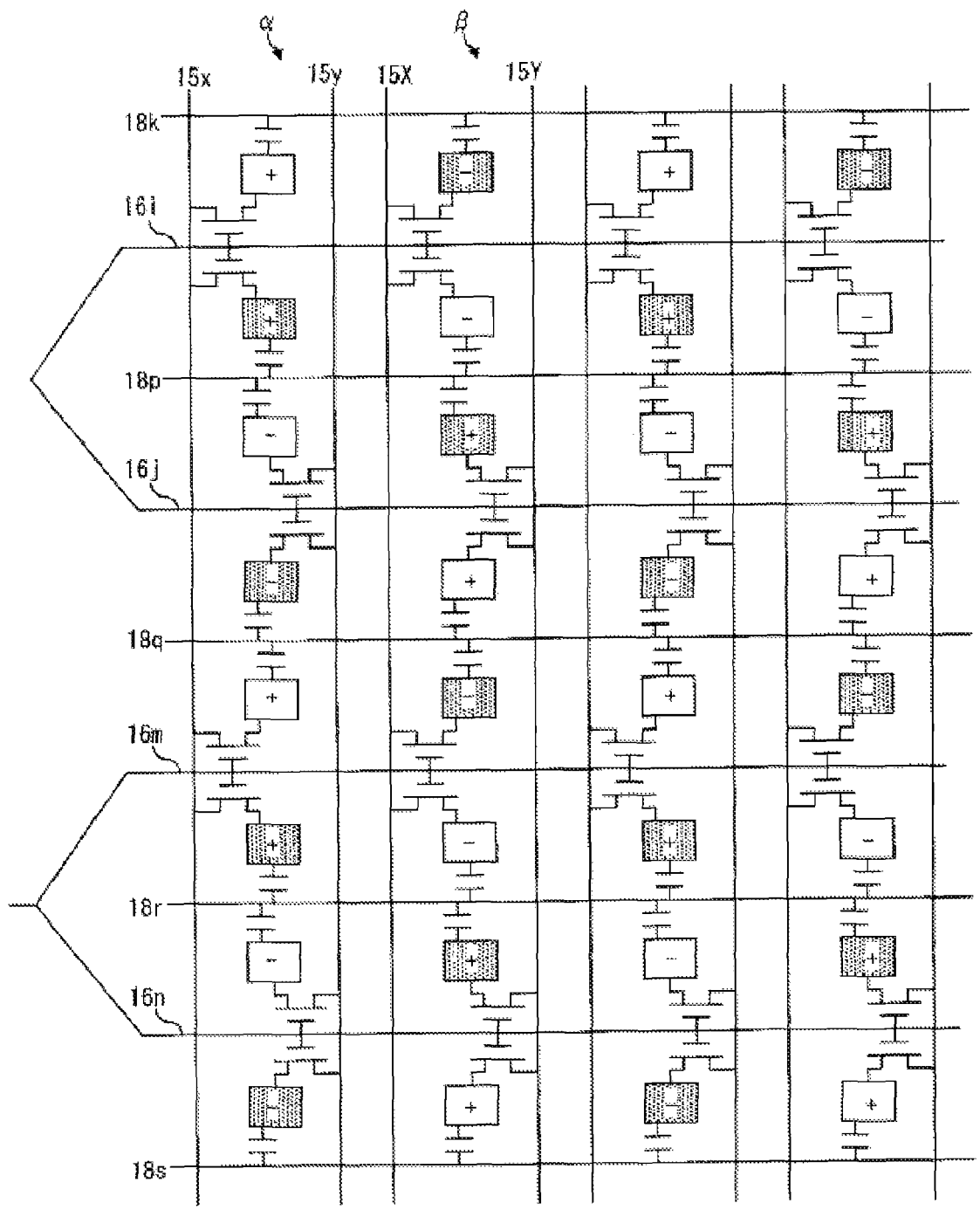
FIG. 7 is a schematic view showing a display state of a liquid crystal panel according to the driving method of FIG. 6.

Thus, in F1, as shown in FIG. 7, the sub-pixel including the pixel electrode 17ia becomes a bright sub-pixel of positive polarity, the sub-pixel including the pixel electrode 17ib becomes a dark sub-pixel of positive polarity, the sub-pixel including the pixel electrode 17ja becomes a bright sub-pixel of negative polarity, the sub-pixel including the pixel electrode 17jb becomes a dark sub-pixel of negative polarity, the sub-pixel including the pixel electrode 17ma becomes a bright sub-pixel of positive polarity, the sub-pixel including the pixel electrode 17mb becomes a dark sub-pixel of positive polarity, the sub-pixel including the pixel electrode 17na becomes a bright sub-pixel of negative polarity, the sub-pixel including the pixel electrode 17nb becomes a dark sub-pixel of negative polarity, the sub-pixel including the pixel electrode 17IA becomes a dark sub-pixel of negative polarity, and the sub-pixel including the pixel electrode 17IB becomes a bright sub-pixel of negative polarity. That is, in F1, the dot inversion drive and the bright/dark checkered pattern display (display in which bright sub-pixels and dark sub-pixels are arranged alternately in both the row and column directions) are implemented.

Figure 8:
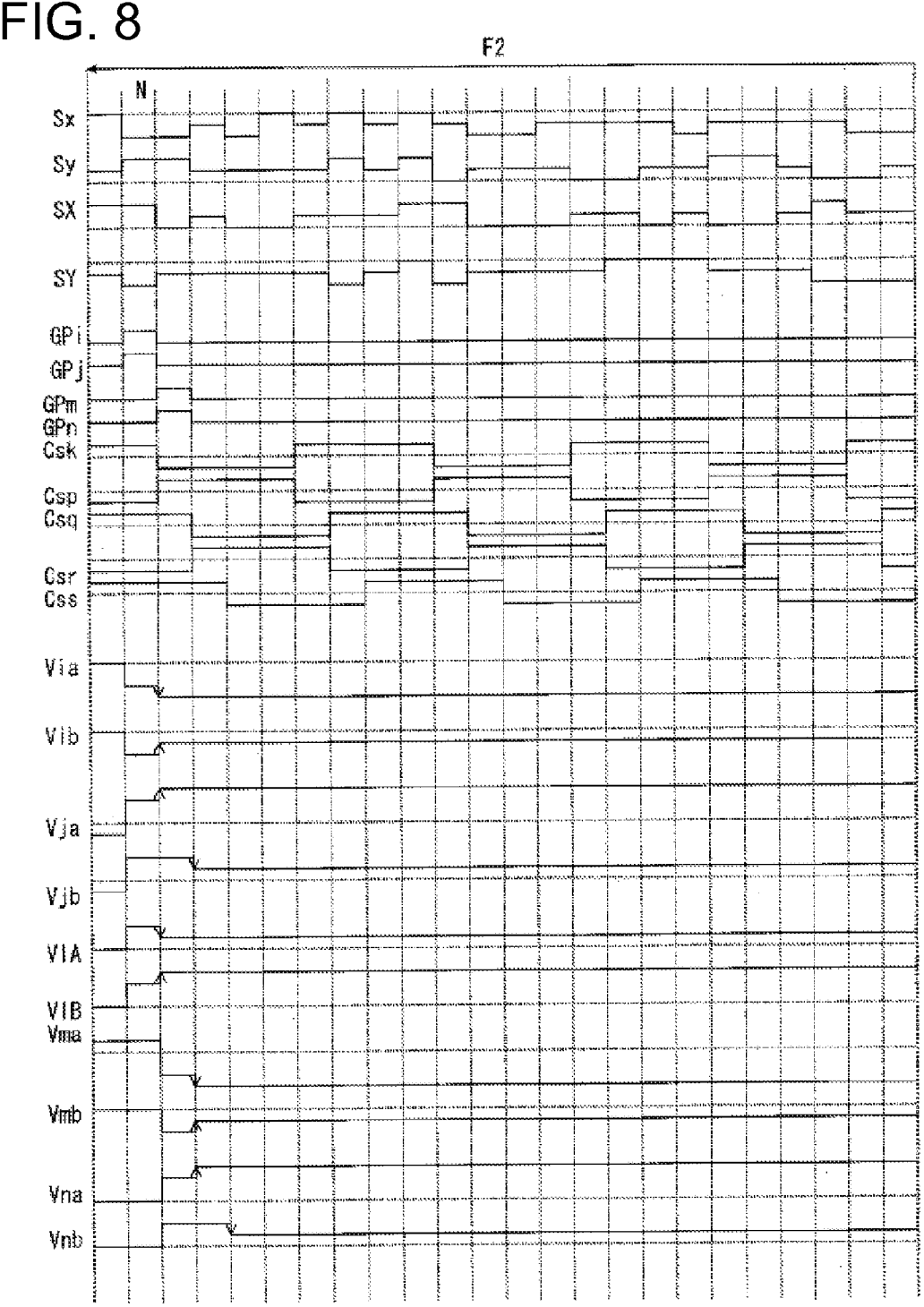
FIG. 8 is a timing chart showing a driving method (frame 2) of a liquid crystal panel equipped with the active matrix substrate of FIG. 5.
Figure 9:
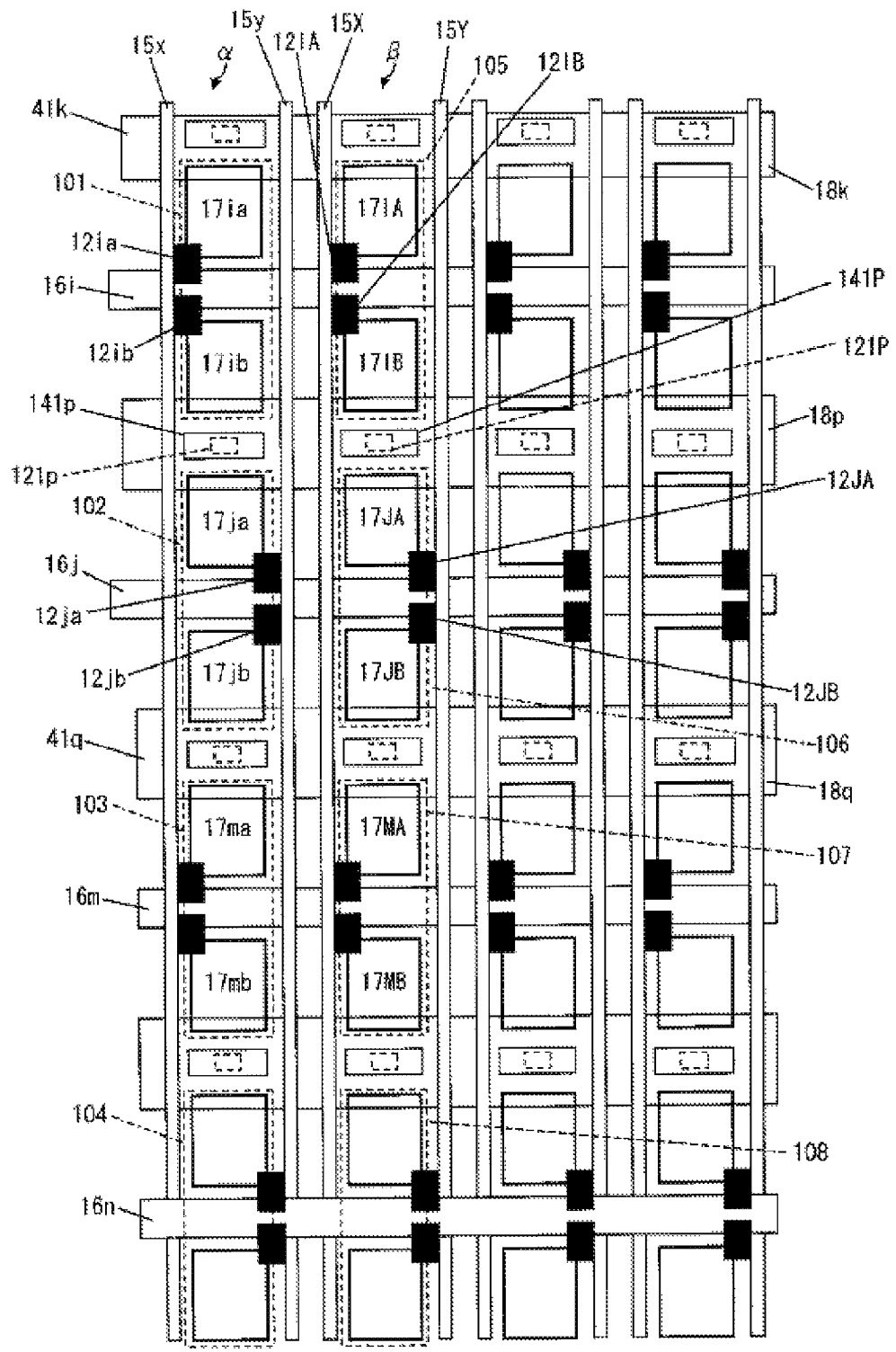
FIG. 9 is a schematic view showing a modification example of the active matrix substrate of FIG. 1.

In frame F2, as shown in FIG. 8, to the data signal line 15x and the data signal line 15Y, data signals of negative polarity are supplied in the Nth horizontal scanning period (including the scanning period of the scan signal lines 16i and 16j), and data signals of negative polarity are supplied also in the (N+1)th horizontal scanning period (including the scanning period of the scan signal lines 16m and 16n); to the data signal line 15y and the data signal line 15X, data signals of positive polarity are supplied in the Nth horizontal scanning period (including the scanning period of the scan signal lines 16i and 16j), and data signals of positive polarity are supplied also in the (N+1)th horizontal scanning period (including the scanning period of the scan signal lines 16m and 16n). Also, to the storage capacitance wiring 18k, a storage capacitance wiring signal whose polarity reverses every 4H and reverses from positive to negative at the end of the Nth horizontal scanning period is supplied. To the storage capacitance wiring 18p, a storage capacitance wiring signal whose polarity reverses every 4H and reverses from negative to positive at the end of the Nth horizontal scanning period is supplied. To the storage capacitance wiring 18q, a storage capacitance wiring signal whose polarity reverses every 4H and reverses from positive to negative at the end of the (N+1)th horizontal scanning period is supplied. To the storage capacitance wiring 18r, a storage capacitance wiring signal whose polarity reverses every 4H and reverses from negative to positive at the end of the (N+1)th horizontal scanning period is supplied. To the storage capacitance wiring 18s, a storage capacitance wiring signal whose polarity reverses every 4H and reverses from positive to negative at the end of the (N+2)th horizontal scanning period is supplied.

In F2, therefore, the sub-pixel including the pixel electrode 17ia becomes a bright sub-pixel of negative polarity; the sub-pixel including the pixel electrode 17ib becomes a dark sub-pixel of negative polarity; the sub-pixel including the pixel electrode 17ja becomes a bright sub-pixel of positive polarity; the sub-pixel including the pixel electrode 17jb becomes a dark sub-pixel of positive polarity; the sub-pixel including the pixel electrode 17IA becomes a dark sub-pixel of positive polarity; the sub-pixel including the pixel electrode 17IB becomes a bright sub-pixel of positive polarity; the sub-pixel including the pixel electrode 17ma becomes a bright sub-pixel of negative polarity; the sub-pixel including the pixel electrode 17mb becomes a dark sub-pixel of negative polarity; the sub-pixel including the pixel electrode 17na becomes a bright sub-pixel of positive polarity; and the sub-pixel including the pixel electrode 17nb becomes a dark sub-pixel of positive polarity. That is, in F2, the dot inversion drive and the bright/dark checkered pattern (display in which bright sub-pixels and dark sub-pixels are arranged alternately in both the row and column directions) are implemented.

In the present liquid crystal panel, because two scan signal lines can be selected simultaneously, the display writing time can be shortened by half without changing the writing time of each pixel. That is, the present liquid crystal panel is suitable for a high-speed drive such as a double-speed drive (120 Hz drive). It can also display halftones using bright and dark sub-pixels, and therefore can improve the viewing angle characteristics. Also, the bright/dark checkered pattern display suppresses uneven streaks that can be caused when more than one bright sub-pixel or more than one dark sub-pixel are arranged consecutively.

Additionally, a linear electrode (shield electrode) is disposed in the gap between two pixel electrodes, one of which being the pixel electrode included in a given pixel region and the other being the pixel electrode included in the pixel region adjacent to the given pixel region on the downstream side of the scanning direction. As a result, each of the aforementioned pixel electrodes that are adjacent to each other are electrically shielded with the linear electrode, and the phenomenon that the effective potential of the scan signal lines fluctuate for every other line (scan signal line) when two scan signal lines are scanned at a time can be suppressed. Consequently, the horizontal streaks caused by this phenomenon can be reduced.

Also, because the linear electrode and the storage capacitance wiring are formed to overlap one another and are connected together through a plurality of contact holes, one of them can be used as a redundancy line in case of line breakage.

Additionally, in the present liquid crystal panel, because pixel electrodes in a pixel region column are connected in an alternating fashion to two data signal lines provided for the pixel region column, pixel polarity distribution can be dot-inverted while data signals of the same polarity are supplied to the respective data signal lines during one vertical scanning period. This configuration makes the present liquid crystal panel suitable for size increase and faster driving as well as lower power consumption.

In FIG. 1, a linear electrode (shield electrode) is disposed in the gap between two adjacent pixel electrodes, one of them being a pixel electrode included in a given pixel region and the other being a pixel electrode included in a pixel region adjacent to the given pixel region on the downstream side of the scanning direction. However, as shown in the schematic view of FIG. 9 and the plan view of FIG. 10, an island-shaped electrode (formed in the same layer with the pixel electrodes) may be provided in the gap, and the island-shaped electrode and the storage capacitance wiring may be connected together through a contact hole. Specifically, in the gap between the pixel electrode 17ib and the pixel electrode 17ja, an island-shaped electrode 141p is disposed and the island-shaped electrode 141p and the storage capacitance wiring 18p are connected together through a contact hole 121p. Also, in the gap between the pixel electrode 17IB and the pixel electrode 17JA, an island-shaped electrode 141P is disposed and the island-shaped electrode 141P and the storage capacitance wiring 18p are connected together through a contact hole 121P. In the configuration shown in FIGS. 9 and 10, the island-shaped electrode and the data signal line do not cross each other. As a result, the data signal waveform deformation can be suppressed.

Figure 10:
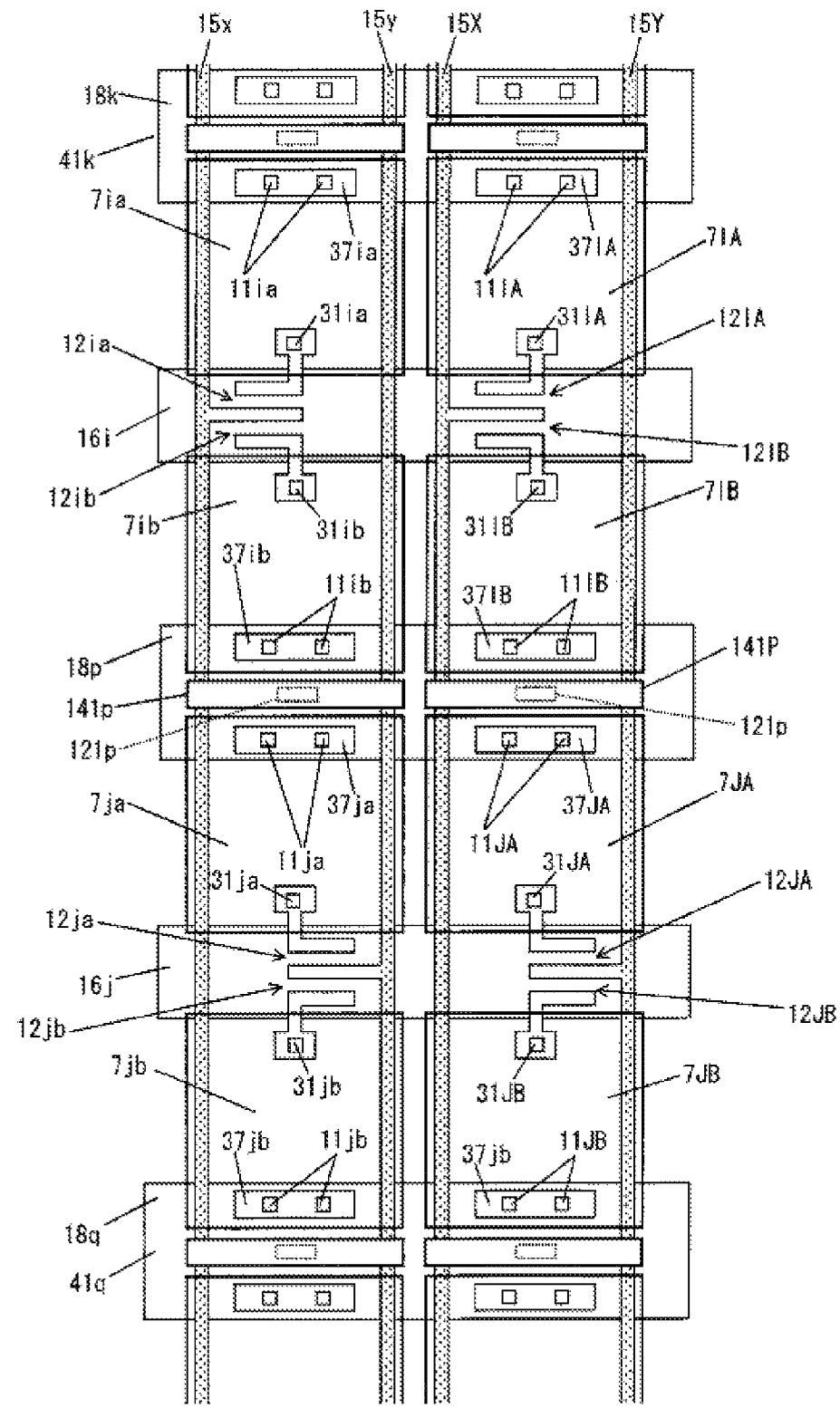
FIG. 10 is a plan view showing a configuration example of a liquid crystal panel equipped with the active matrix substrate of FIG. 9.
Figure 11:
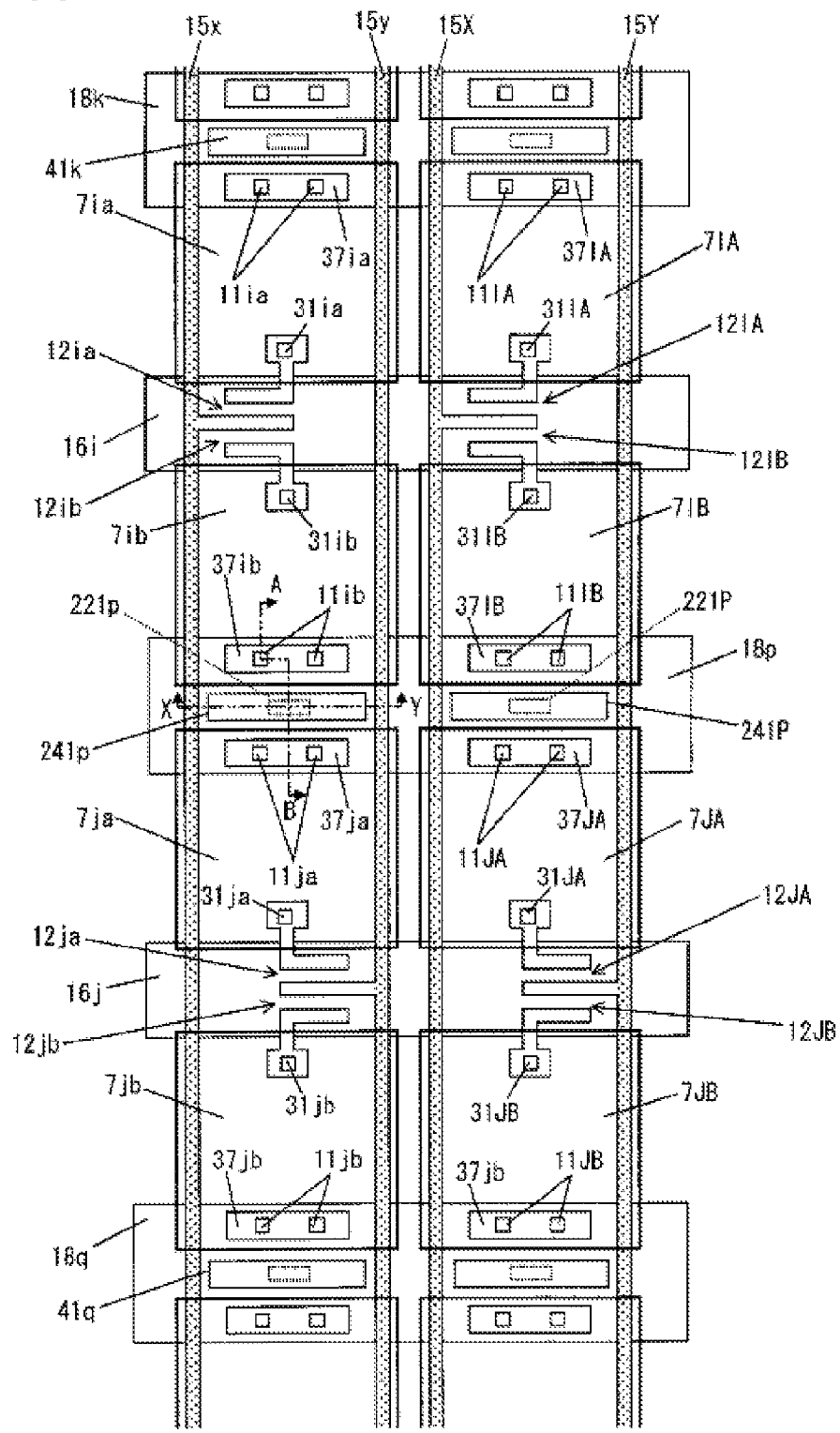
FIG. 11 is a plan view showing a modification example of the liquid crystal panel of FIG. 10.
Figure 12:
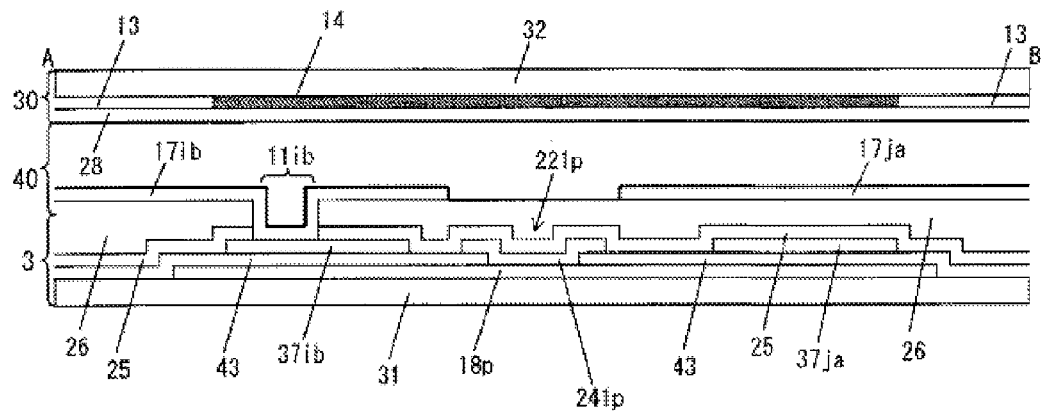
FIG. 12 is a cross-sectional arrow view of the liquid crystal panel of FIG. 11, taken along the line A-B.
Figure 13:
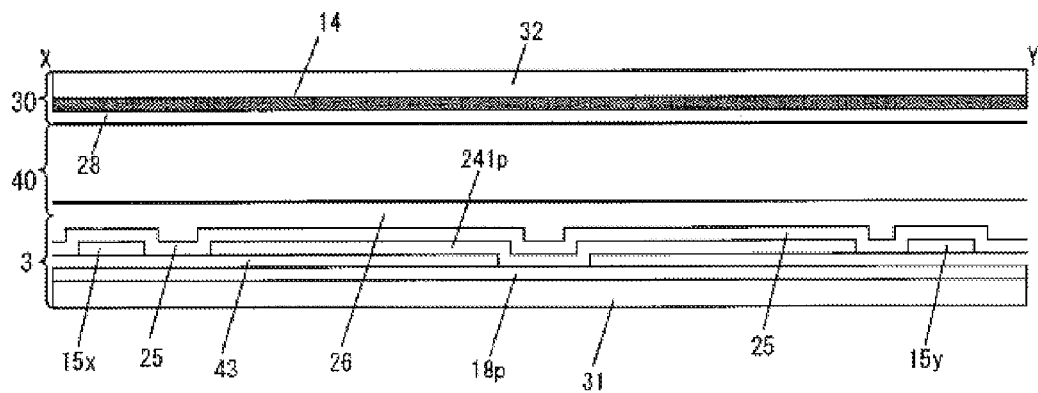
FIG. 13 is a cross-sectional arrow view of the liquid crystal panel of FIG. 11, taken along the line X-Y.

In FIG. 10, the island-shaped electrode is formed in the same layer as the pixel electrodes. However, as shown in the plan view of FIG. 11, an island-shaped electrode may be formed in the same layer as the data signal lines. Specifically, an island-shaped electrode 241p is disposed under the gap between the pixel electrode 17ib and the pixel electrode 17ja, and the island-shaped electrode 241p and the storage capacitance wiring 18p are connected to each other through a contact hole 221p. Also, an island-shaped electrode 241P is disposed under the gap between the pixel electrode 17IB and the pixel electrode 17JA, and the island-shaped electrode 241P and the storage capacitance wiring 18p are connected to each other through a contact hole 221P. FIG. 12 is a cross-sectional arrow view taken along the line A-B of FIG. 11, and FIG. 13 is a cross-sectional arrow view taken along the line X-Y of FIG. 12. As shown in FIGS. 12 and 13, on the gate insulating film 43, capacitance electrodes 37ib and 37ja, island-shaped electrode 241p, and data signal lines 15x and 15y are formed. At the location where the contact hole 221p is formed, the inorganic interlayer insulating film 25 and the organic interlayer insulating film 26 are removed and the island-shaped electrode 241p and the storage capacitance wiring 18p are in contact with each other. Also, as described above, a storage capacitance is formed at a location where the storage capacitance wiring 18p and the capacitance electrode 37ib overlap with each other through the gate insulating film 43, and a storage capacitance is formed where the storage capacitance wiring 18p and the capacitance electrode 37ja overlap with each other through the gate insulating film 43. According to the configuration shown in FIG. 11, deformation of the data signal waveform can be suppressed, and because the island-shaped electrode and the pixel electrodes are formed in different layers, short-circuiting between them can be prevented.

Figure 43:
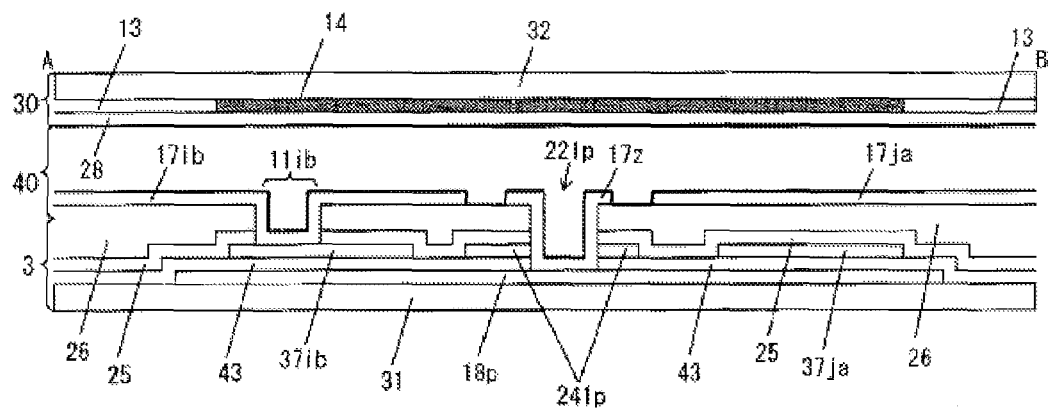
FIG. 43 is a cross-sectional arrow view of a modification example of the liquid crystal panel of FIG. 11, taken along the line A-B.
Figure 44:
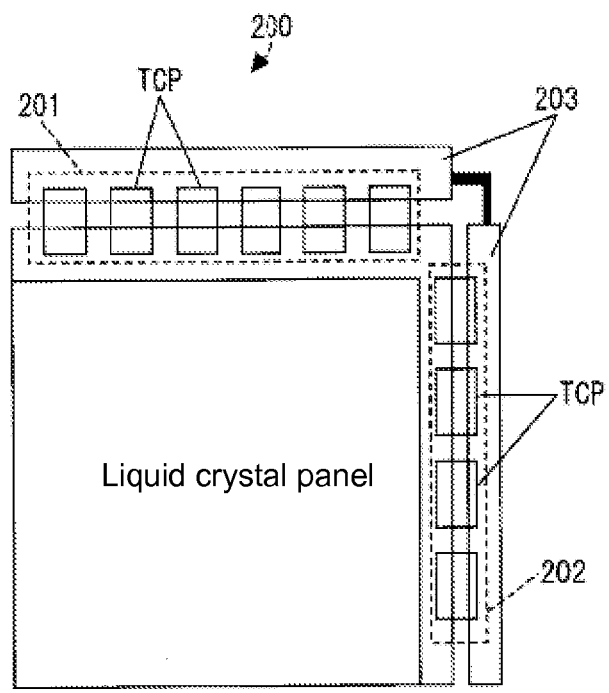
FIG. 44($a$) is a schematic view showing a configuration of a liquid crystal display unit according to the present invention, and FIG. 44($b$) is a schematic view showing a configuration of a liquid crystal display device according to the present invention.
Figure 44:
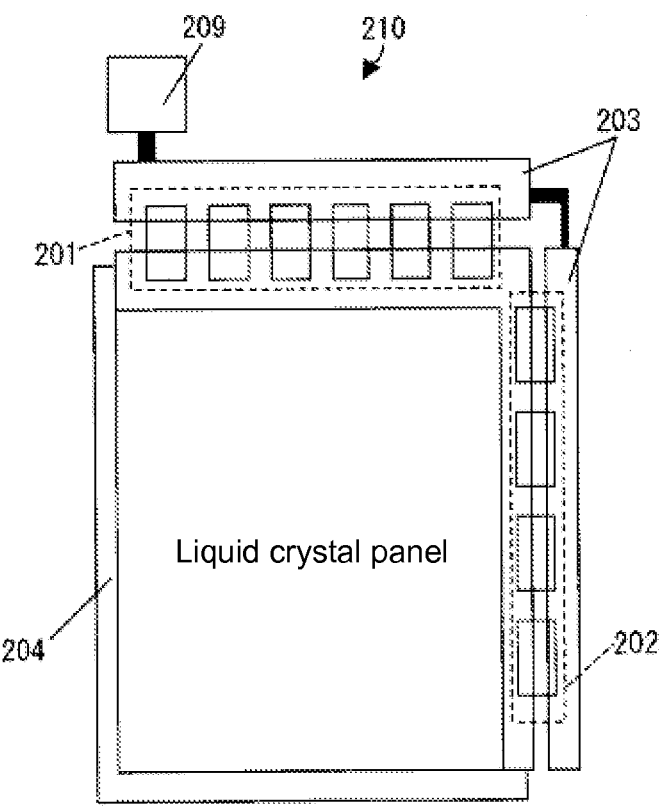

The contact hole 221p shown in FIG. 12 may also be configured as shown in FIG. 43. That is, an opening overlapping the contact hole 221p is formed in the island-shaped electrode 241p so that when the inorganic interlayer insulating film 25 and the organic interlayer insulating film 26 are etched, the gate insulating film 43 under the opening is also etched. Further, a transparent electrode (ITO) 17z, which is at the location of the contact hole 221p, is reserved (not etched away). This way, without increasing the number of the masks, the island-shaped electrode 241p (which is in the same layer as the data signal lines) and the storage capacitance wiring 18p can be connected together through the transparent electrode 17z, which is in contact with both of them.

Figure 14:
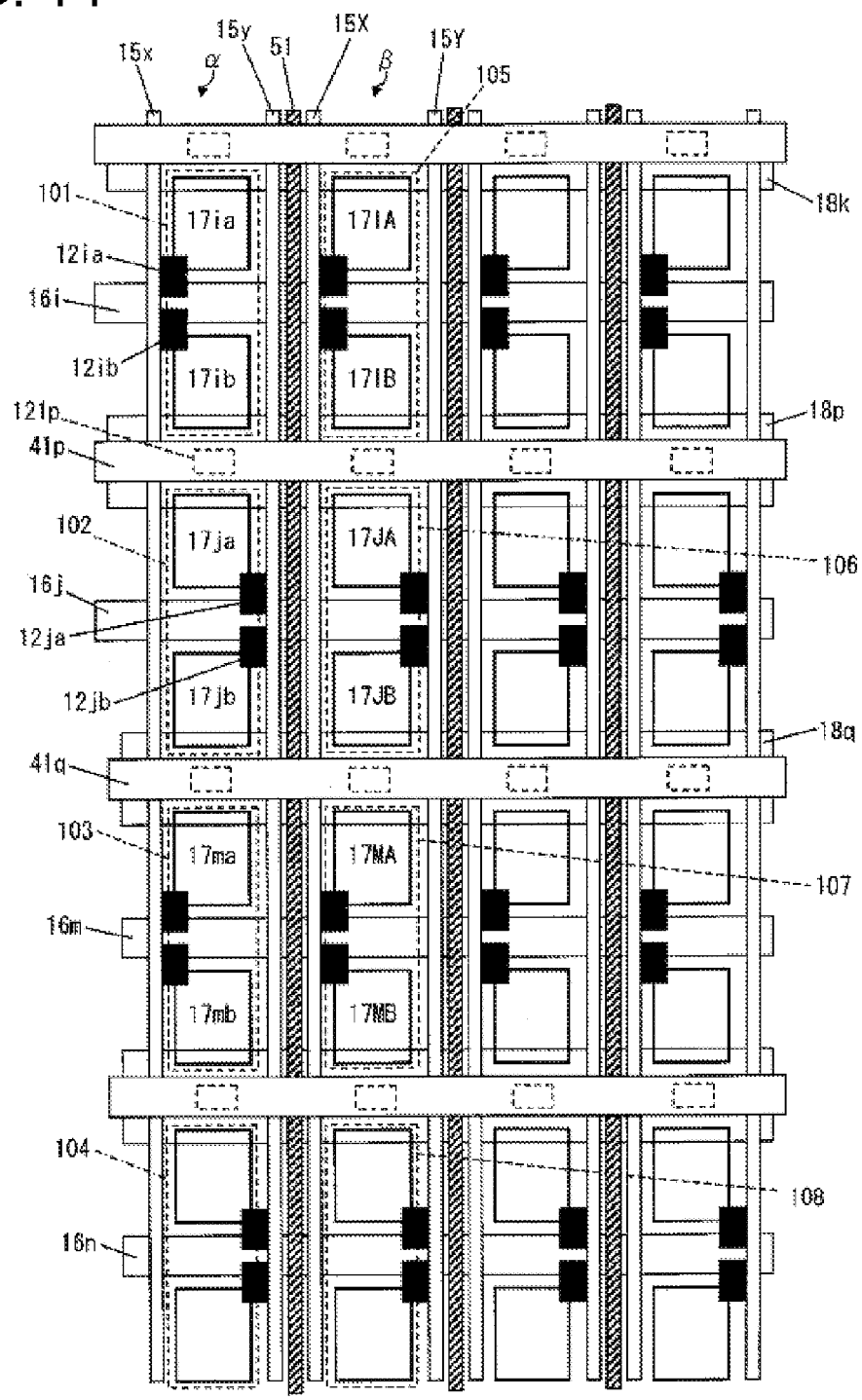
FIG. 14 is a schematic view showing a modification example of the active matrix substrate of FIG. 1.
Figure 15:
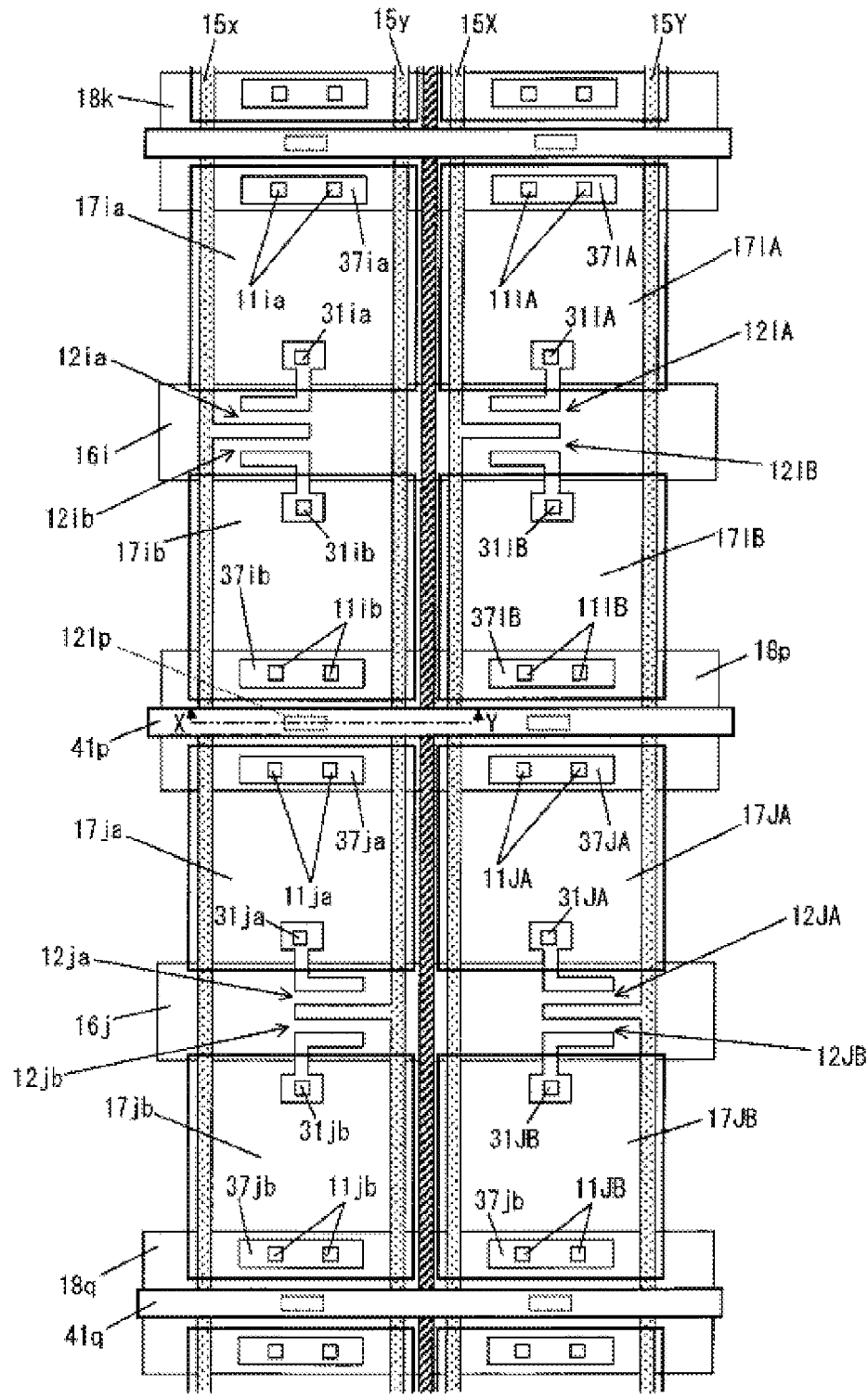
FIG. 15 is a plan view showing a configuration example of a liquid crystal panel equipped with the active matrix substrate of FIG. 14.
Figure 16:
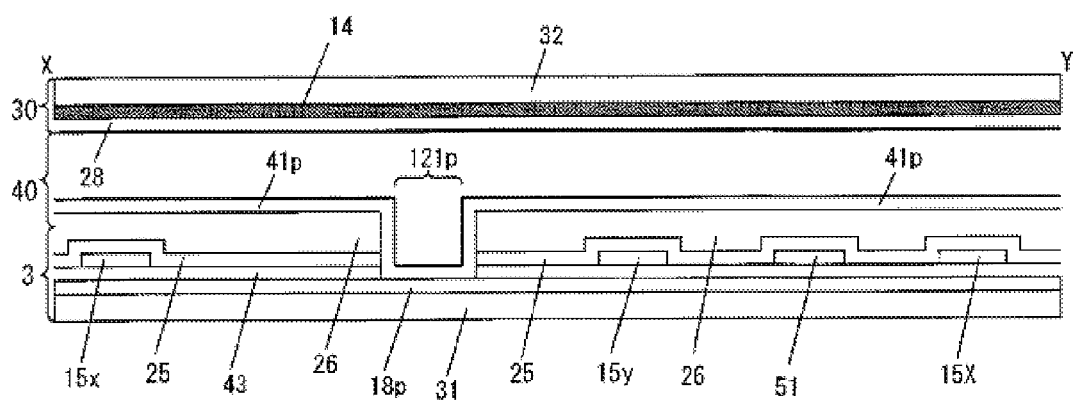
FIG. 16 is a cross-sectional arrow view of the liquid crystal panel of FIG. 15, taken along the line X-Y.

The active matrix substrate of FIG. 1 can also be configured as shown in FIG. 14. That is, an inter-wiring is disposed in the gap between two adjacent data signal lines, one of which being the data signal line provided for a given pixel region column and the other being the data signal line provided for the pixel region column adjacent to the aforementioned given pixel region column. Specifically, as shown in FIG. 14, the data signal line 15y for the pixel region column α and the data signal line 15X for the pixel region column β are adjacent to each other, and an inter-wiring 51 is disposed in the gap between the data signal line 15y and the data signal line 15X. The inter-wiring 51 extends under the gap between the pixel electrode 17ia and the pixel electrode 17Ia, under the gap between the pixel electrode 17ib and the pixel electrode 17IB, under the gap between the pixel electrode 17ja and the pixel electrode 17JA, and under the gap between the pixel electrode 17jb and the pixel electrode 17JB. FIG. 15 is a plan view showing a portion of the liquid crystal panel equipped with the active matrix substrate of FIG. 14, and FIG. 16 is a cross-sectional arrow view taken along the line X-Y of FIG. 15. As shown in FIGS. 15 and 16, on the gate insulating film 43, the data signal lines 15x, 15y, and 15X and the inter-wiring 51 are formed, and over these signal lines and the inter-wiring, an inorganic interlayer insulating film 25 and an organic interlayer insulating film 26 are formed. A linear electrode 41p is formed over the organic interlayer insulating film 26.

Here, the inter-wiring may be made independent of the storage capacitance wiring, and a constant potential signal (Vcom signal, for example) may be supplied to the inter-wiring. Also, the inter-wiring may be connected to the storage capacitance wiring to which the storage capacitance wiring signal having the same phase is supplied.

Figure 40:
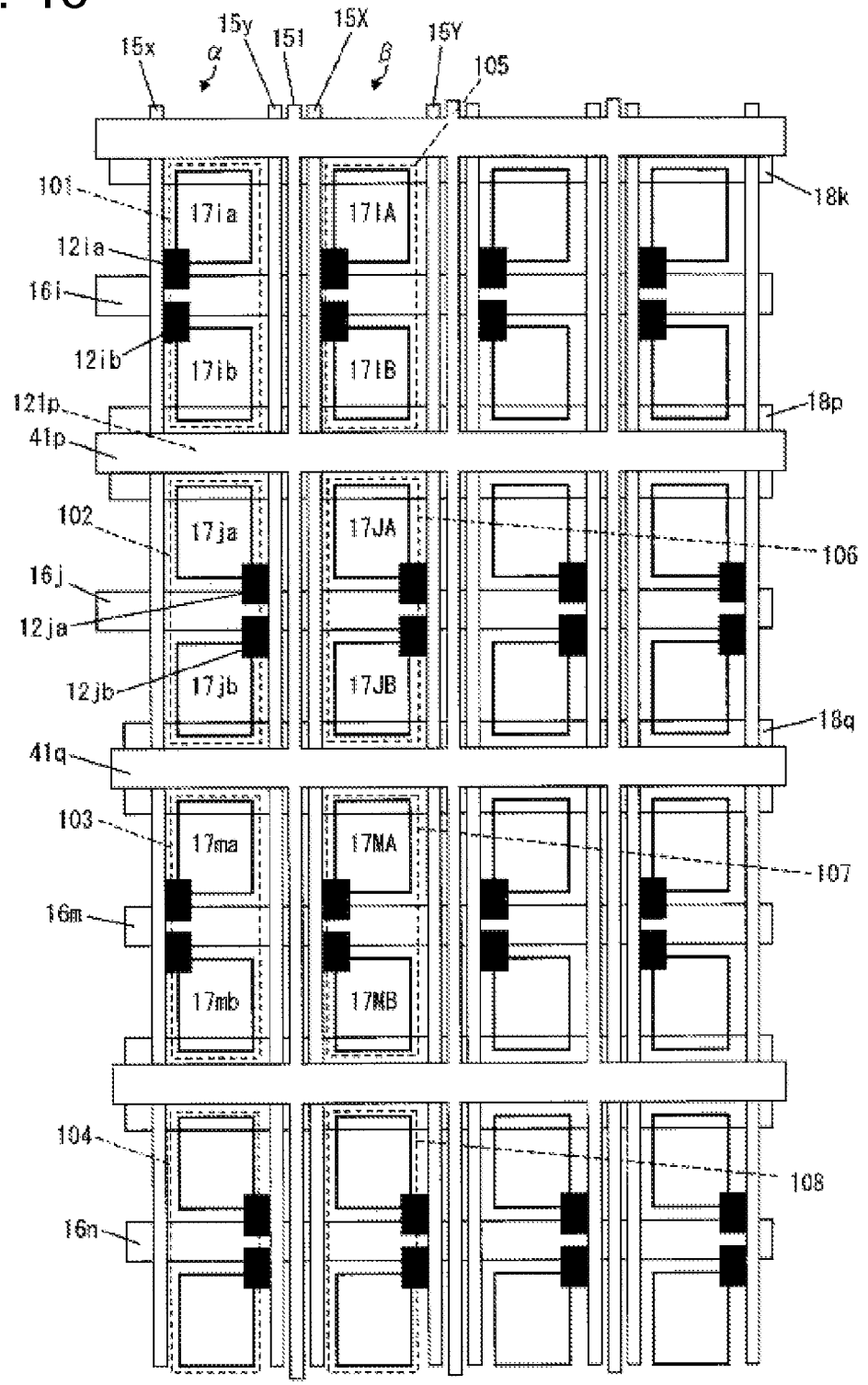
FIG. 40 is a schematic view showing yet another modification example of the active matrix substrate shown in FIG. 1.

Also, as shown in FIG. 40, an inter-wiring may be provided over the gap between the two adjacent data signal lines (in the same layer as the pixel electrode) to form the inter-wiring and the linear electrode as a unit. Specifically, an inter-wiring 151 is disposed over the gap between the data signal line 15y and the data signal line 15X (in the same layer as the pixel electrodes 17ia and 17IA), and the inter-wiring 151 and the linear electrode 41p are connected to each other in the same layer. In this configuration, the linear electrode and the storage capacitance wiring are independent. A constant potential signal (Vcom signal, for example), therefore, can be supplied to the linear electrode.

In a liquid crystal display device equipped with the active matrix substrate shown in FIG. 14 and FIG. 40, the crosstalk caused by the parasitic capacitance between each of the pixel electrodes in the pixel region column α and the data signal line 15X, and the crosstalk caused by the parasitic capacitance between each of the pixel electrodes in the pixel region column β and the data signal line 15y can significantly be reduced, and the vertical shadow generated due to the crosstalk can therefore be suppressed.

Figure 17:
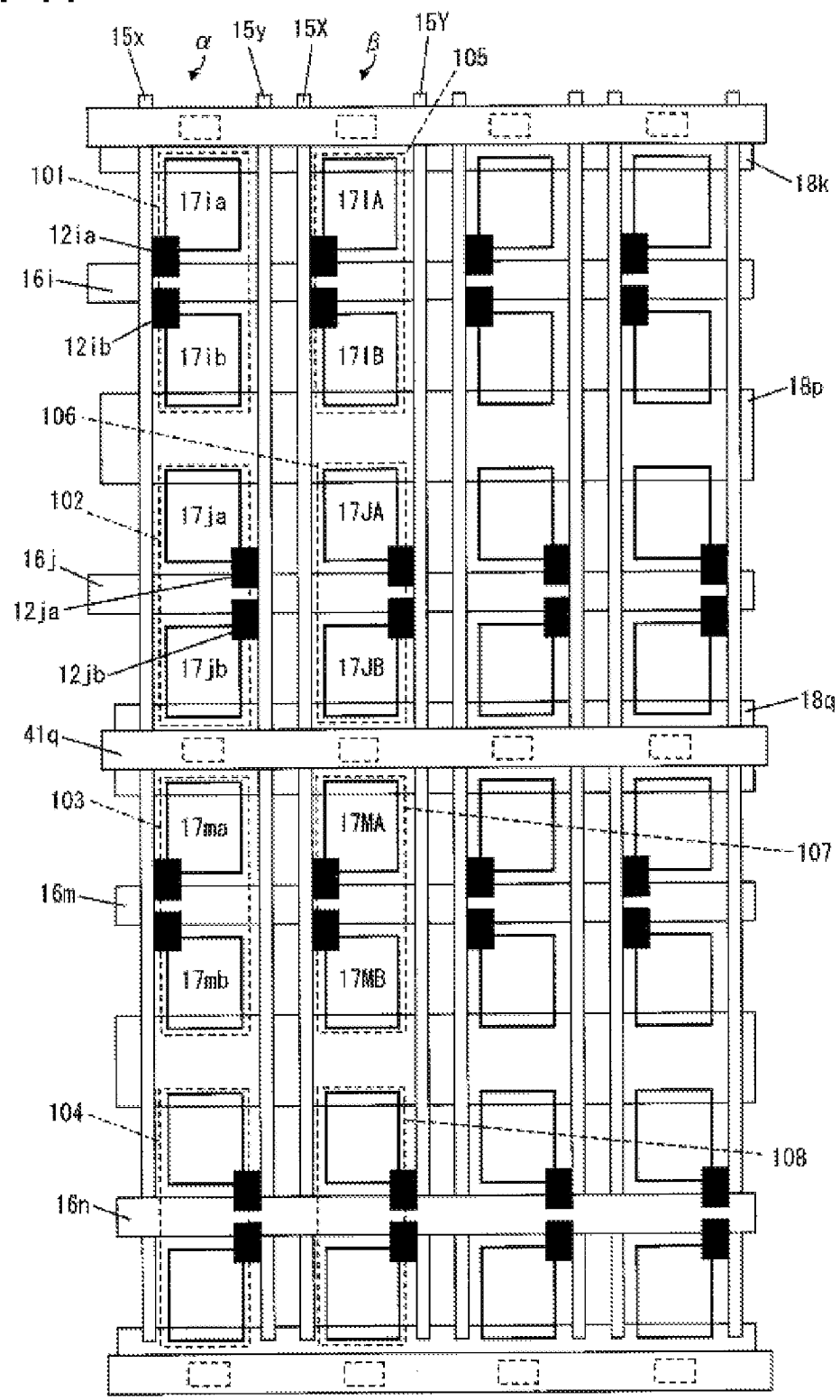
FIG. 17 is a schematic view showing a modification example of the active matrix substrate of FIG. 1.

The active matrix substrate of FIG. 1 may also be configured as shown in FIG. 17. That is, a linear electrode (shield electrode) is disposed only in the gap between two adjacent pixel electrodes, one of them being the pixel electrode included in a pixel region at an even numbered position within a pixel region column and the other being the pixel electrode included in the pixel region adjacent to the aforementioned pixel region at the even numbered position on the downstream side of the scanning direction. Specifically, the pixel electrode 17jb included in the second pixel region 102 in the pixel region column α and the pixel electrode 17ma included in the pixel region 103, which is adjacent to the pixel region 102 on the downstream side of the scanning direction, are adjacent to each other, and a linear electrode 41q is disposed in the gap between the pixel electrode 17jb and the pixel electrode 17ma. On the other hand, the pixel electrode 17ib included in the first pixel region 101 in the pixel region column α and the pixel electrode 17ja included in the pixel region 102, which is adjacent to the pixel region 101 on the downstream side of the scanning direction, are adjacent to each other, but no linear electrode is disposed in the gap between the pixel electrode 17ib and the pixel electrode 17ja. When a liquid crystal panel including the active matrix substrate of FIG. 17 is driven, the scan signal lines 16i and 16j are selected simultaneously as shown in FIG. 5, and then the scan signal lines 16m and 16n are selected simultaneously.

Figure 38:
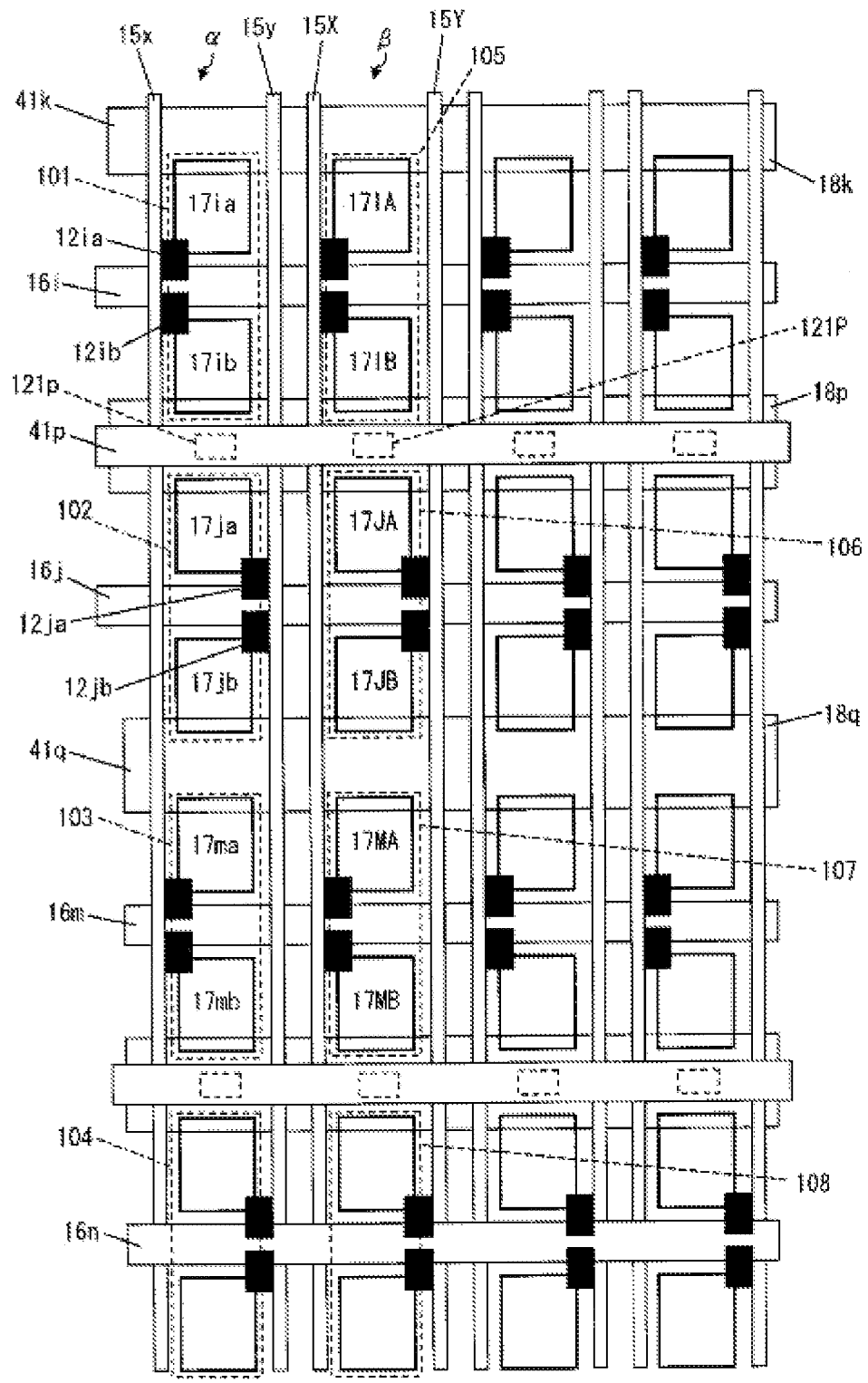
FIG. 38 is a schematic view showing a modification example of the active matrix substrate of FIG. 1.
Figure 39:
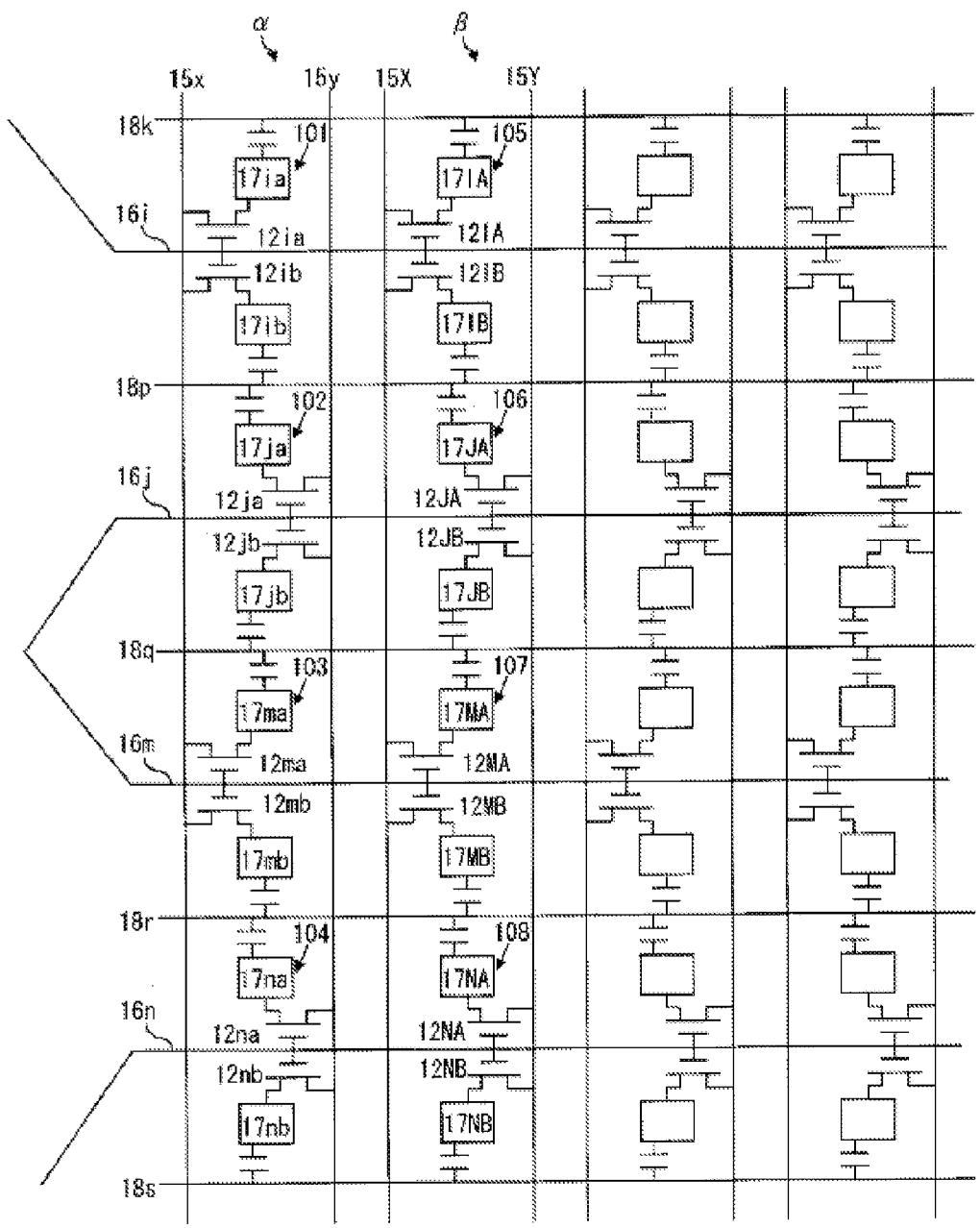
FIG. 39 is an equivalent circuit showing a group of scan signal lines selected simultaneously on the active matrix substrate of FIG. 38.

The active matrix substrate of FIG. 1 may also be configured as shown in FIG. 38. That is, a linear electrode (shield electrode) is disposed only in the gap between two adjacent pixel electrodes, one of them being the pixel electrode included in the pixel region at an odd numbered position in a pixel region column and the other being the pixel electrode included in the pixel region adjacent to the aforementioned pixel region at the odd-numbered position on the downstream side of the scanning direction. Specifically, the pixel electrode 17ib included in the first pixel region 101 in the pixel region column α and the pixel electrode 17ja included in the pixel region 102 adjacent to the pixel region 101 on the downstream side of the scanning direction are adjacent to each other, and a linear electrode 41p is disposed in the gap between the pixel electrode 17ib and the pixel electrode 17ja. On the other hand, the pixel electrode 17jb included in the second pixel region 102 in the pixel region column α and the pixel electrode 17ma included in the pixel region 103, which is adjacent to the pixel region 102 on the downstream side of the scanning direction, are adjacent to each other, but no linear electrode is disposed in the gap between the pixel electrode 17*jb* and the pixel electrode 17*ma*. When a liquid crystal panel including the active matrix substrate of FIG. 38 is driven, as shown in FIG. 39, the scan signal line 16*i* and the scan signal line that is adjacent to the scan signal line 16*i* on the upstream side of the scanning direction are selected simultaneously, and then, the scan signal lines 16*j* and 16*m* are selected simultaneously.

In a liquid crystal display device equipped with the active matrix substrate of FIG. 17 and FIG. 38, the number of intersections of linear electrodes and data signal lines can be reduced, and deformation of the data signal waveform can be suppressed. Also, by replacing the linear electrodes in FIG. 17 and FIG. 38 with island-shaped electrodes such as those illustrated in FIG. 9, deformation of the data signal waveform can further be suppressed.

In the description of the present embodiment, the case where the polarity distribution of the data signal written on the pixels are dot-inverted (dots are inverted for every pixel in the row and column directions) is discussed (see FIG. 7). However, the polarity distribution of the data signal is not limited to such. This polarity distribution may be an H-line inversion (dots are not inverted in the row direction, but inverted in the column direction for every pixel) or a V-line inversion (dots are inverted in the row direction for every pixel, but are not inverted in the column direction). The polarity distribution may also be a block inversion in which dots are inverted in the row direction for every pixel, and are inverted in the column direction for every plurality of pixels. Also, the polarity of data signals written on the same pixel may be inverted for every frame or every plurality of frames.

Embodiment 2

Figure 18:
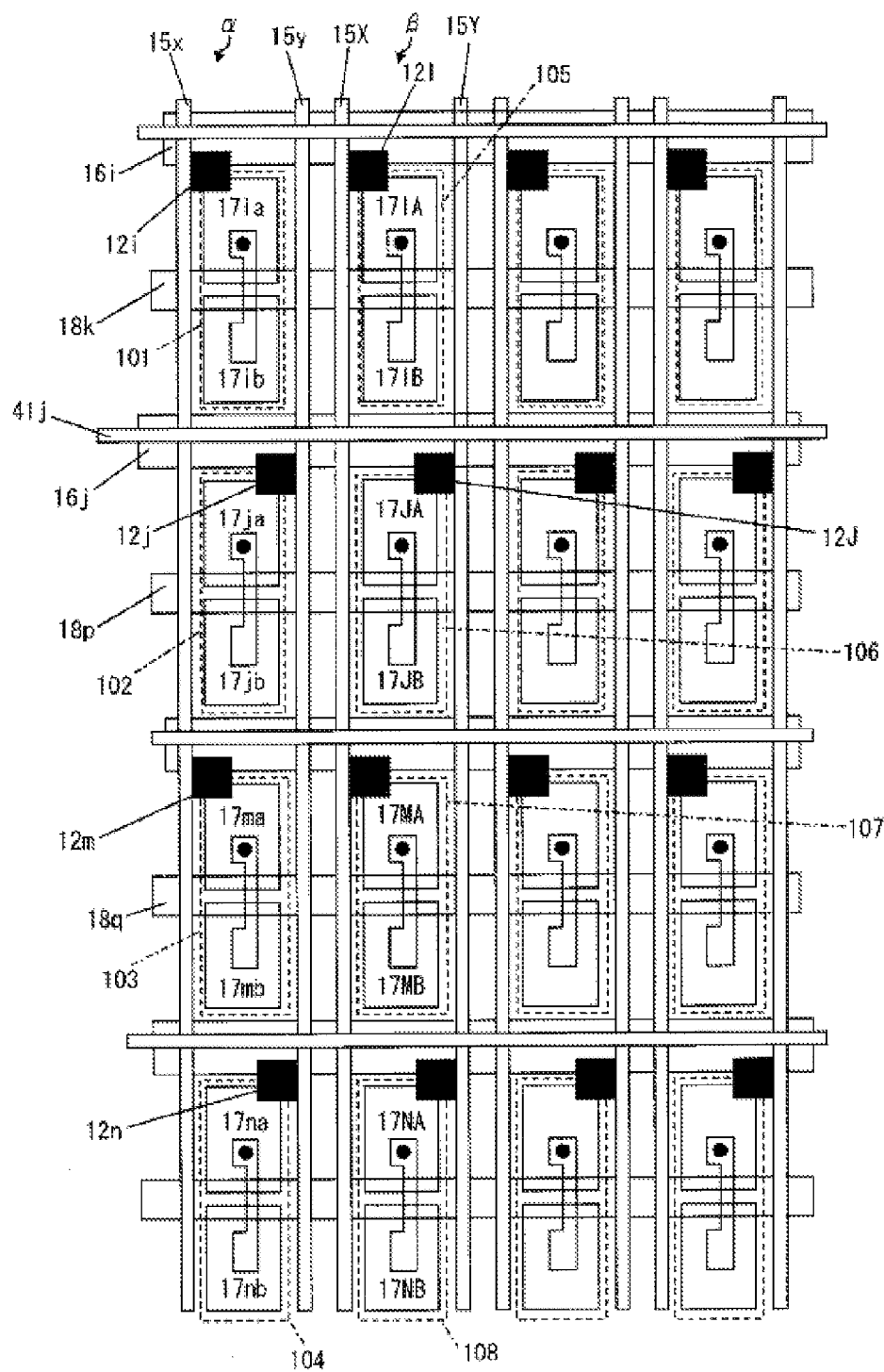
FIG. 18 is a schematic view showing a configuration example of an active matrix substrate according to Embodiment 2.

FIG. 18 is a schematic view showing a portion of an active matrix substrate according to Embodiment 2. The arrangements of the pixel regions, pixel electrodes, and data signal lines on the active matrix substrate of FIG. 18 are the same as those of FIG. 1. Also, one scan signal line is provided for one pixel region row. Specifically, a scan signal line 16*i* is disposed for the pixel regions 101 and 105 along their edges on the upstream side of the scanning direction; and a scan signal line 16*j* is disposed for the pixel regions 102 and 106 along their edges on the upstream side of the scanning direction; a scan signal line 16*m* is disposed for the pixel regions 103 and 107 along their edges on the upstream side of the scanning direction; and a scan signal line 16*n* is disposed for pixel regions 104 and 108 along their edges on the upstream side of the scanning direction.

Further, in a given pixel region included in one pixel region column, one pixel electrode connected to one of the two data signal lines for this pixel region column through a transistor is disposed, and in the pixel region adjacent to the aforementioned given pixel region on the downstream side of the scanning direction, one pixel electrode connected to the other of the two data signal lines through a transistor is disposed. Specifically, in the pixel region 101 in the pixel region column α, pixel electrodes 17*ia* and 17*ib* are disposed along the scanning direction in this order, the pixel electrode 17*ia* is connected to the data signal line 15*x* through a transistor 12*i* tied to the scan signal line 16*i*, and the pixel electrode 17*ib* is connected to the pixel electrode 17*ia* through a capacitance. Also, in the pixel region 102, which is adjacent to the pixel region 101 on the downstream side of the scanning direction, pixel electrodes 17*ja* and 17*jb* are arranged along the scanning direction in this order, the pixel electrode 17*ja* is connected to the data signal line 15*y* through a transistor 12*j* tied to the scan signal line 16*j*, and the pixel electrode 17*jb* is connected to the pixel electrode 17*ja* through a capacitance.

Similarly, in the pixel region 105 of the pixel region column β, pixel electrodes 17IA and 17IB are arranged along the scanning direction in this order, the pixel electrode 17IA is connected to the data signal line 15X through a transistor 12I tied to the scan signal line 16*i*, and the pixel electrode 17IB is connected to the pixel electrode 17IA through a capacitance. Also, in the pixel region 106, which is adjacent to the pixel region 105 on the downstream side of the scanning direction, pixel electrodes 17JA and 17JB are arranged along the scanning direction in this order, the pixel electrode 17JA is connected to the data signal line 15Y through a transistor 12J tied to the scan signal line 16*j*, and the pixel electrode 17JB is connected to the pixel electrode 17JA through a capacitance.

Also, in the pixel region 103 of the pixel region column α, pixel electrodes 17*ma* and 17*mb* are disposed along the scanning direction in this order, the pixel electrode 17*ma* is connected to the data signal line 15*x* through a transistor 12*m* tied to the scan signal line 16*m*, and the pixel electrode 17*mb* is connected to the pixel electrode 17*ma* through a capacitance. Also, in the pixel region 104, which is adjacent to the pixel region 103 on the downstream side of the scanning direction, pixel electrodes 17*na* and 17*nb* are disposed along the scanning direction in this order, the pixel electrode 17*na* is connected to the data signal line 15*y* through a transistor 12*n* tied to the scan signal line 16*n*, and the pixel electrode 17*nb* is connected to the pixel electrode 17*na* through a capacitance.

Here, a linear electrode (shield electrode) is disposed in the gap between two adjacent pixel electrodes, one of them being a pixel electrode included in a given pixel region and the other being the pixel electrode included in the pixel region adjacent to the aforementioned given pixel region on the downstream side of the scanning direction, and a storage capacitance wiring is disposed such that it overlaps the gap between two pixel electrodes disposed in the same pixel region.

Specifically, the pixel electrode 17*ib* of the pixel region 101 and the pixel electrode 17*ja* of the pixel region 102 are adjacent to each other, and a linear electrode 41*j* is disposed such that it overlaps the gap between the pixel electrode 17*ib* and the pixel electrode 17*ja* (such that it overlaps the scan signal line 16*j*), and a storage capacitance wiring 18*p* is disposed such that it overlaps the gap between the pixel electrode 17*ja* and the pixel electrode 17*jb*, which are in the pixel region 102. Also, the pixel electrode 17IB of the pixel region 105 and the pixel electrode 17JA of the pixel region 106 are adjacent to each other, the linear electrode 41*j* extends through the gap between the pixel electrode 17IB and the pixel electrode 17JA, and the storage capacitance wiring 18*p* overlaps the gap between the pixel electrode 17JA and the pixel electrode 17JB. Also, the pixel electrode 17*jb* of the pixel region 102 and the pixel electrode 17*ma* of the pixel region 103 are adjacent to each other, a linear electrode 41*m* is disposed in the gap between the pixel electrode 17*jb* and the pixel electrode 17*ma* (such that it overlaps the scan signal line 16*j*), and a storage capacitance wiring 18*q* is disposed in the gap between the pixel electrode 17*ma* and the pixel electrode 17*mb*, which are in the pixel region 103.

Figure 19:
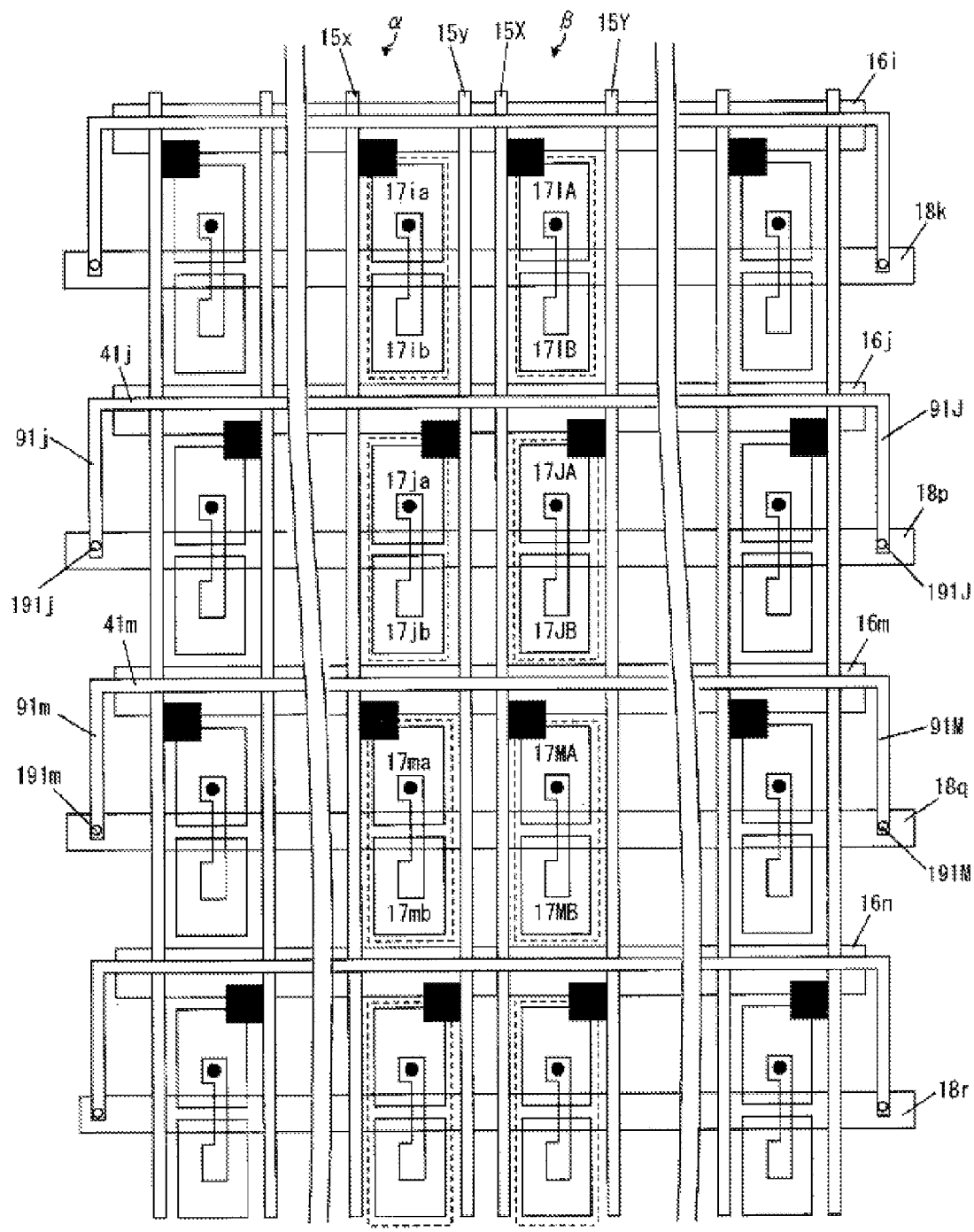
FIG. 19 is a schematic view showing end portions of the active matrix substrate of FIG. 18.

Also, as shown in FIG. 19, one end of the linear electrode 41*j* is connected to one end of the storage capacitance wiring 18*p* through a connection electrode 91*j* and a contact hole 191*j* formed in the frame region of the display section; and the other end of the linear electrode 41*j* is connected to the other end of the storage capacitance wiring 18*p* through a connection electrode 91J and a contact hole 191J formed in the frame region of the display section. Also, one end of the linear electrode 41*m* is connected to one end of the storage capacitance wiring 18q through a connection electrode 91m and a contact hole 191m formed in the frame region of the display section; and the other end of the linear electrode 41m is connected to the other end of the storage capacitance wiring 18q through a connection electrode 91M and a contact hole 191M formed in the frame region of the display section. This way, unlike the case in which a trunk wiring to which storage capacitance wirings are connected is disposed in the non-display region, the frame region can be made narrow.

Also, the scan signal line 16i and the scan signal line 16j are connected inside the panel or outside the panel, for example, and they (16i and 16j) are selected simultaneously (to be described later). Also, the scan signal line 16m and the scan signal line 16n are connected inside the panel or outside the panel, for example, and they (16m and 16n) are selected simultaneously (to be described later).

Figure 20:
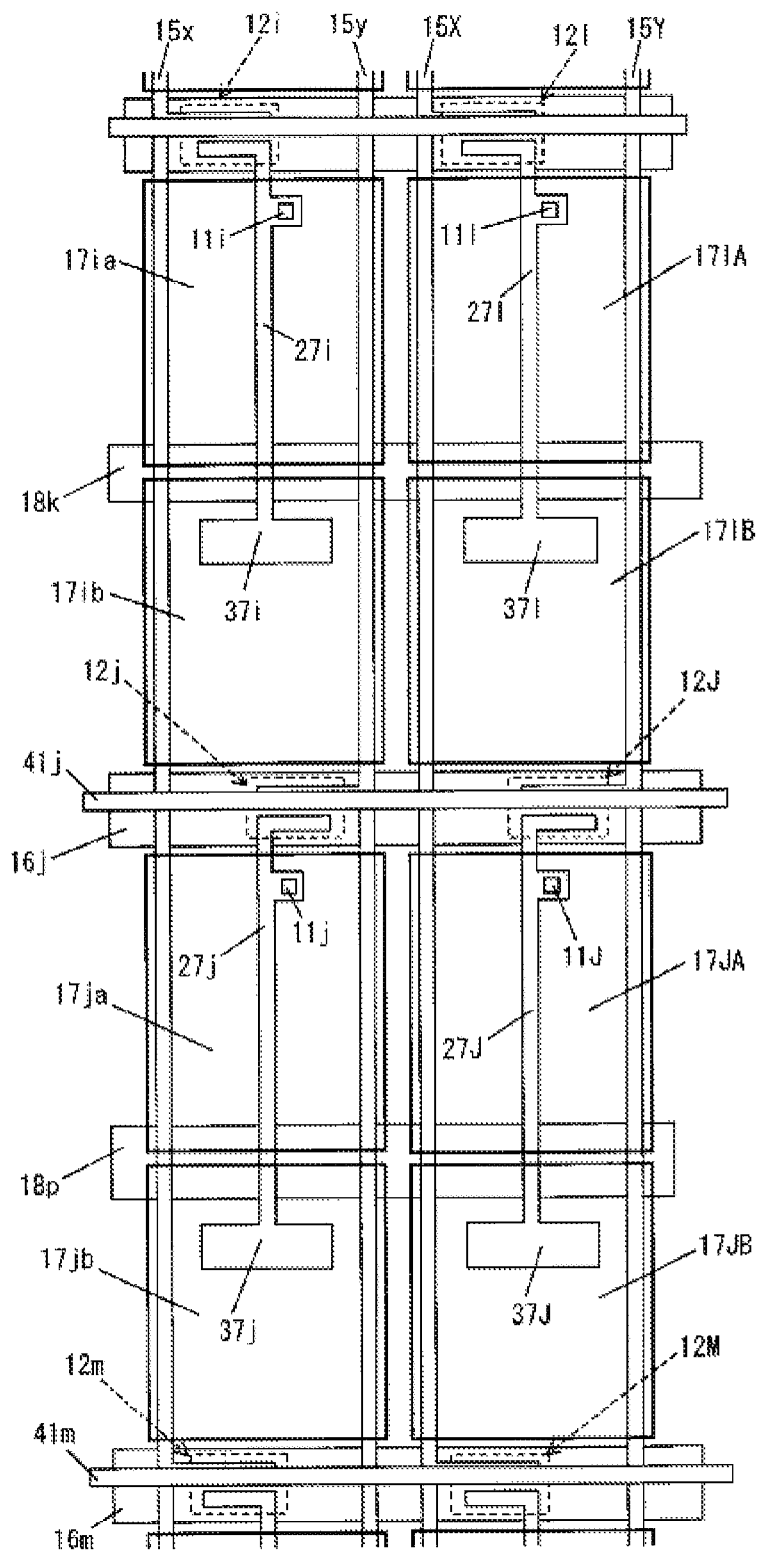
FIG. 20 is a plan view showing a configuration example of a liquid crystal panel equipped with the active matrix substrate of FIG. 18.

FIG. 20 is a plan view showing a portion of a liquid crystal panel equipped with the active matrix substrate of FIG. 18. In FIG. 20, members of the color filter substrate (opposite substrate) are omitted, and only members of the active matrix substrate are illustrated for simplicity.

For the present liquid crystal panel, a pair of (two) data signal lines 15x and 15y and a pair of (two) data signal lines 15X and 15Y are disposed such that the data signal line 15y and the data signal line 15X are adjacent to each other; the scan signal line 16i and the scan signal line 16j are disposed such that they cross the data signal lines at a right angle; a transistor 12i is provided near the intersection of the data signal line 15x and the scan signal line 16i; a transistor 12j is provided near the intersection of the data signal line 15y and the scan signal line 16j; a transistor 12I is provided near the intersection of the data signal line 15X and the scan signal line 16i; and a transistor 12J is provided near the intersection of the data signal line 15Y and the scan signal line 16j.

Also, the pixel electrodes 17ia and 17ib are arranged in the column direction between the scan signal lines 16i and 16j such that they overlap the data signal lines 15x and 15y, and the pixel electrodes 17IA and 17IB are arranged in the column direction such that they overlap the data signal lines 15X and 15Y. Between the scan signal lines 16j and 16m, pixel electrodes 17ja and 17jb are disposed in the column direction such that they overlap the data signal lines 15x and 15y, and pixel electrodes 17JA and 17JB are disposed in the column direction such that they overlap the data signal lines 15X and 15Y.

Here, a linear electrode 41j is disposed in the gap between the pixel electrode 17ib and the pixel electrode 17ja, and a storage capacitance wiring 18k is disposed such that it overlaps the gap between the pixel electrodes 17ia and 17ib. The linear electrode 41j extends through the gap between the pixel electrode 17IB and the pixel electrode 17JA, and the storage capacitance wiring 18k overlaps the gap between the pixel electrodes 17IA and 17IB. Also, a storage capacitance wiring 18p is disposed such that it overlaps the gap between the pixel electrodes 17ja and 17ib.

When observed in a plan view, the two edges of the pixel electrode 17ia extending along the column direction are located outside the data signal line 15x and the data signal line 15y, the two edges of the pixel electrode 17ib extending along the column direction are located outside the data signal line 15x and the data signal line 15y, the two edges of the pixel electrode 17ja extending along the column direction are located outside the data signal line 15x and the data signal line 15y, the two edges of the pixel electrode 17jb extending along the column direction are located outside the data signal line 15x and the data signal line 15y, the two edges of the pixel electrode 17IA extending along the column direction are located outside the data signal line 15X and the data signal line 15Y, the two edges of the pixel electrode 17IB extending along the column direction are located outside the data signal line 15X and the data signal line 15Y, two edges of the pixel electrode 17JA extending along the column direction are located outside the data signal line 15X and the data signal line 15Y, and the two edges of the pixel electrode 17JB extending along the column direction are located outside the data signal line 15X and the data signal line 15Y.

The scan signal line 16i functions as the gate electrode of the transistor 12i, the source electrode of the transistor 12i is connected to the data signal line 15x, and the drain electrode is connected to the pixel electrode 17ia through a contact hole 11i. The drain electrode of the transistor 12i is connected to the capacitance electrode 37i through the drain lead-out electrode 27i, and the capacitance electrode 37i overlaps the pixel electrode 17ib. Also, the scan signal line 16j functions as the gate electrode of the transistor 12j, the source electrode of the transistor 12j is connected to the data signal line 15y, and the drain electrode is connected to the pixel electrode 17ja through a contact hole 11j. The drain electrode of the transistor 12j is connected to the capacitance electrode 37j through the drain lead-out electrode 27j, and the capacitance electrode 37j overlaps the pixel electrode 17jb.

Similarly, the scan signal line 16i functions as the gate electrode of the transistor 12I, the source electrode of the transistor 12I is connected to the data signal line 15X, and the drain electrode is connected to the pixel electrode 17IA through a contact hole 11I. The drain electrode of the transistor 12I is connected to the capacitance electrode 37I through the drain lead-out electrode 27I, and the capacitance electrode 37I overlaps the pixel electrode 17IB. Also, the scan signal line 16j functions as the gate electrode of the transistor 12J, the source electrode of the transistor 12J is connected to the data signal line 15Y, and the drain electrode is connected to the pixel electrode 17JA through a contact hole 11J. The drain electrode of the transistor 12J is connected to the capacitance electrode 37J through the drain lead-out electrode 27J, and the capacitance electrode 37J overlaps the pixel electrode 17JB.

In the present liquid crystal panel, storage capacitances are formed at locations where the storage capacitance wiring 18k and the pixel electrode 17ia, and the pixel electrode 17ib overlap through a gate insulating film and an interlayer insulating film (preferably constituted only of the inorganic interlayer insulating film), where the storage capacitance wiring 18k and the pixel electrode 17IA, and the pixel electrode 17IB overlap through the gate insulating film and the interlayer insulating film, where the storage capacitance wiring 18p and the pixel electrode 17ja, the pixel electrode 17jb overlap through the gate insulating film and the interlayer insulating film, and where the storage capacitance wiring 18p and the pixel electrode 17JA, and the pixel electrode 17JB overlap through the gate insulating film and the interlayer insulating film.

Also, coupling capacitances between pixel electrodes are formed at locations where the capacitance electrode 37i and the pixel electrode 17ib overlap through an interlayer insulating film (preferably constituted only of an inorganic interlayer insulating film), where the capacitance electrode 37I and the pixel electrode 17IB overlap through the interlayer insulating film, where the capacitance electrode 37j and the pixel electrode 17jb overlap through the interlayer insulating film (an inorganic interlayer insulating film and an organic interlayer insulating film), and where the capacitance electrode 37J and the pixel electrode 17JB overlap through the interlayer insulating film.

Figure 21:
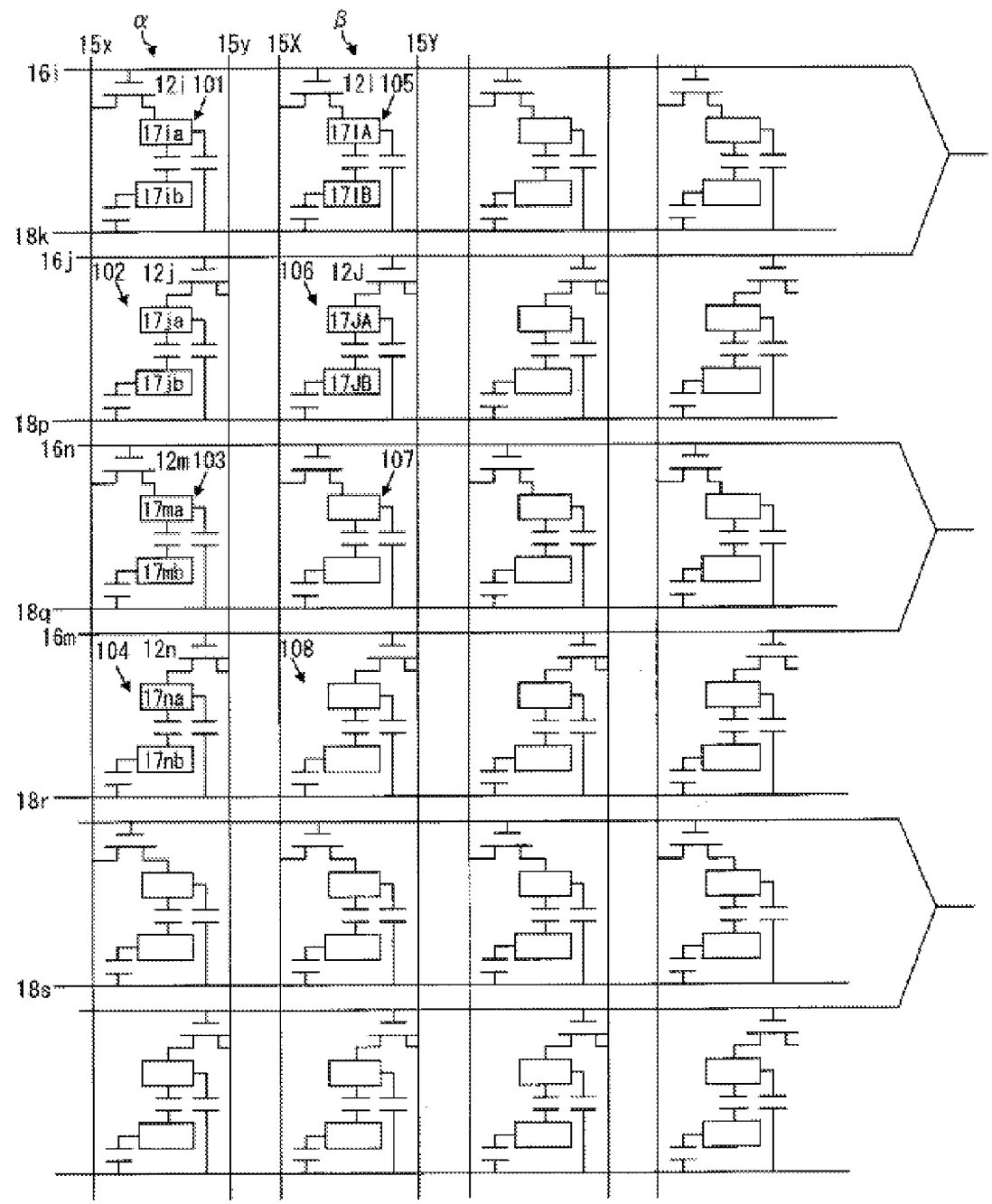
FIG. 21 is an equivalent circuit diagram of the active matrix substrate of FIG. 18.
Figure 22:
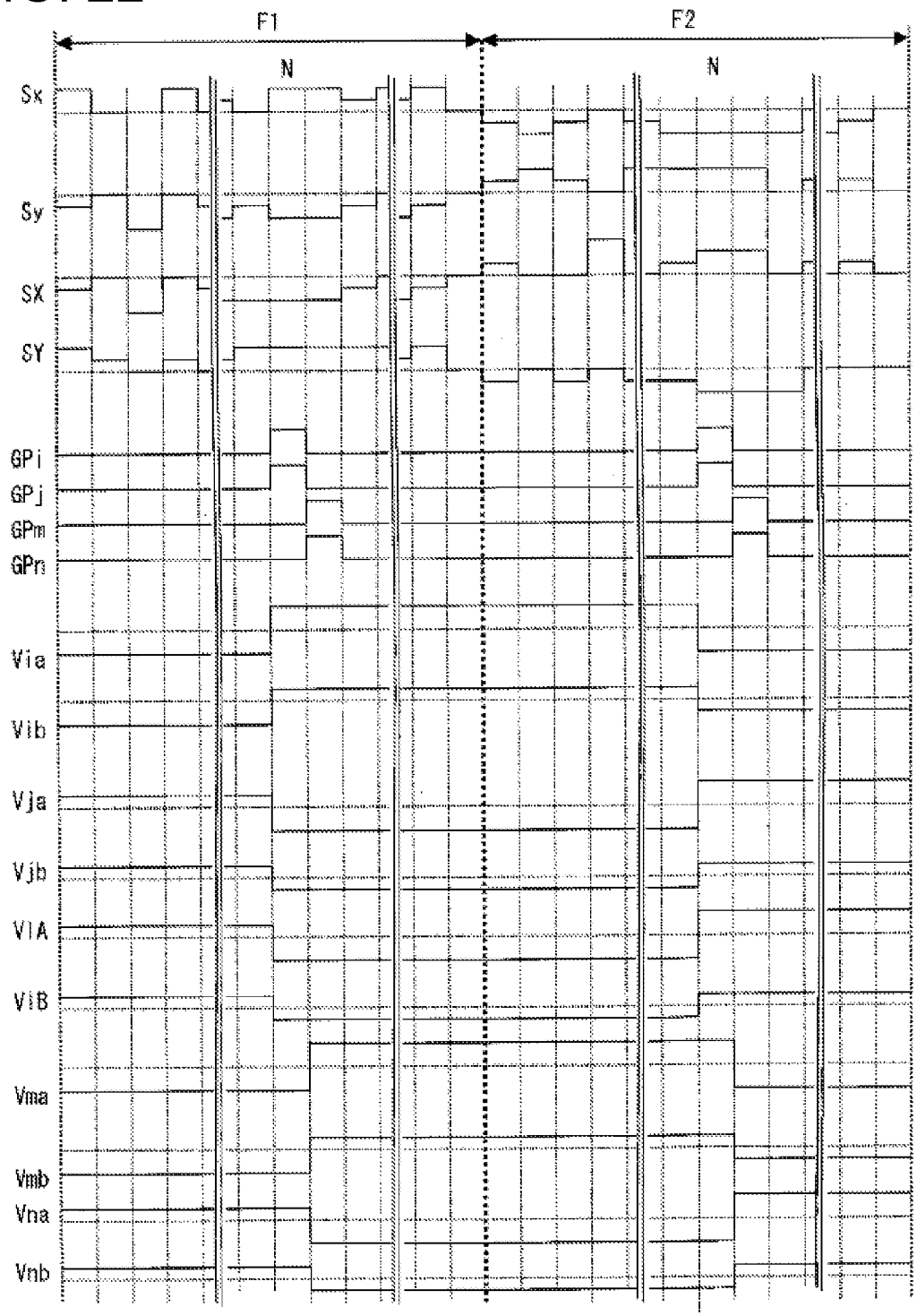
FIG. 22 is a timing chart showing a driving method (frames 1 and 2) of a liquid crystal panel equipped with the active matrix substrate of FIG. 21.

FIG. 21 is an equivalent circuit diagram of the active matrix substrate of FIG. 18, and FIG. 22 is a timing chart illustrating the driving method (normally black mode) of a liquid crystal panel equipped with the active matrix substrate of FIG. 18. Sx, Sy, SX, and SY denote data signals (data signals) supplied to data signal lines 15*x*, 15*y*, 15X, and 15Y, respectively. GPi, GPj, GPm, and GPn denote gate signals supplied to scan signal lines 16*i*, 16*j*, 16*m*, and 16*n*, respectively. Via, Vib, Vja, Vjb, VIA, VIB, Vma, Vmb, Vna, and Vnb denote potentials of pixel electrodes 17*ia*, 17*ib*, 17*ja*, 17*jb*, 17IA, 17IB, 17*ma*, 17*mb*, 17*na*, and 17*nb*, respectively.

According to the present driving method, as shown in FIG. 22, two scan signal lines are selected simultaneously at a time, polarities of data signals supplied to the data signal lines are reversed for every frame period (1V) in the same vertical scanning period, data signals of opposite polarities are supplied to two data signal lines (15*x* and 15*y* or 15X and 15Y) for the same pixel column, and a constant potential signal (Vcom signal) whose potential is equal to that of the common electrode is supplied to the storage capacitance wirings.

Specifically, in F1 of consecutive frames F1 and F2, to the data signal line 15*x* and the data signal line 15Y, data signals of positive polarity are supplied during the Nth horizontal scanning period (including the scanning period of the scan signal lines 16*i* and 16*j*), and data signals of positive polarity are supplied also during the (N+1)th horizontal scanning period (including the scanning period of the scan signal lines 16*m* and 16*n*); to the data signal line 15*y* and the data signal line 15X, data signals of negative polarity are supplied during the Nth horizontal scanning period (including the scanning period of the scan signal lines 16*i* and 16*j*), and data signals of negative polarity are supplied also during the (N+1)th horizontal scanning period (including the scanning period of scan signal lines 16*m* and 16*n*).

Thus, as shown in FIG. 22, the potential of the pixel electrode 17*ia* has a positive polarity, and is equal to that of the data signal. The pixel electrode 17*ib* is connected to the pixel electrode 17*ia* through a capacitance, and therefore, the potential of the pixel electrode 17*ib* has a positive polarity and its absolute value is equal to or less than the absolute value of the data signal. Also, the potential of the pixel electrode 17*ja* has a negative polarity, and is equal to that of the data signal. The pixel electrode 17*jb* is connected to the pixel electrode 17*ja* through a capacitance, and therefore, the potential of the pixel electrode 17*jb* has a negative polarity and its absolute value is equal to or less than the absolute value of the data signal. Also, the potential of the pixel electrode 17*ma* has a positive polarity and is equal to that of the data signal. The pixel electrode 17*mb* is connected to the pixel electrode 17*ma* through a capacitance, and therefore the potential of the pixel electrode 17*mb* has a positive polarity and its absolute value is equal to or less than the absolute value of the data signal. Also, the potential of the pixel electrode 17*na* has a negative polarity and is equal to that of the data signal. The pixel electrode 17*nb* is connected to the pixel electrode 17*na* through a capacitance, and therefore the potential of the pixel electrode 17*nb* has a negative polarity and its absolute value is equal to or less than the absolute value of the data signal. Also, the potential of the pixel electrode 17IA has a negative polarity and is equal to that of the data signal. The pixel electrode 17IB is connected to the pixel electrode 17IA through a capacitance, and therefore the potential of the pixel electrode 17IB has a negative polarity, and its absolute value is equal to or less than the absolute value of the data signal. Also, the potential of the pixel electrode 17JA has a positive polarity and is equal to that of the data signal. The pixel electrode 17JB is connected to the pixel electrode 17JA through a capacitance, and therefore the potential of the pixel electrode 17JB has a positive polarity, and its absolute value is equal to or less than the absolute value of the data signal.

Figure 23:
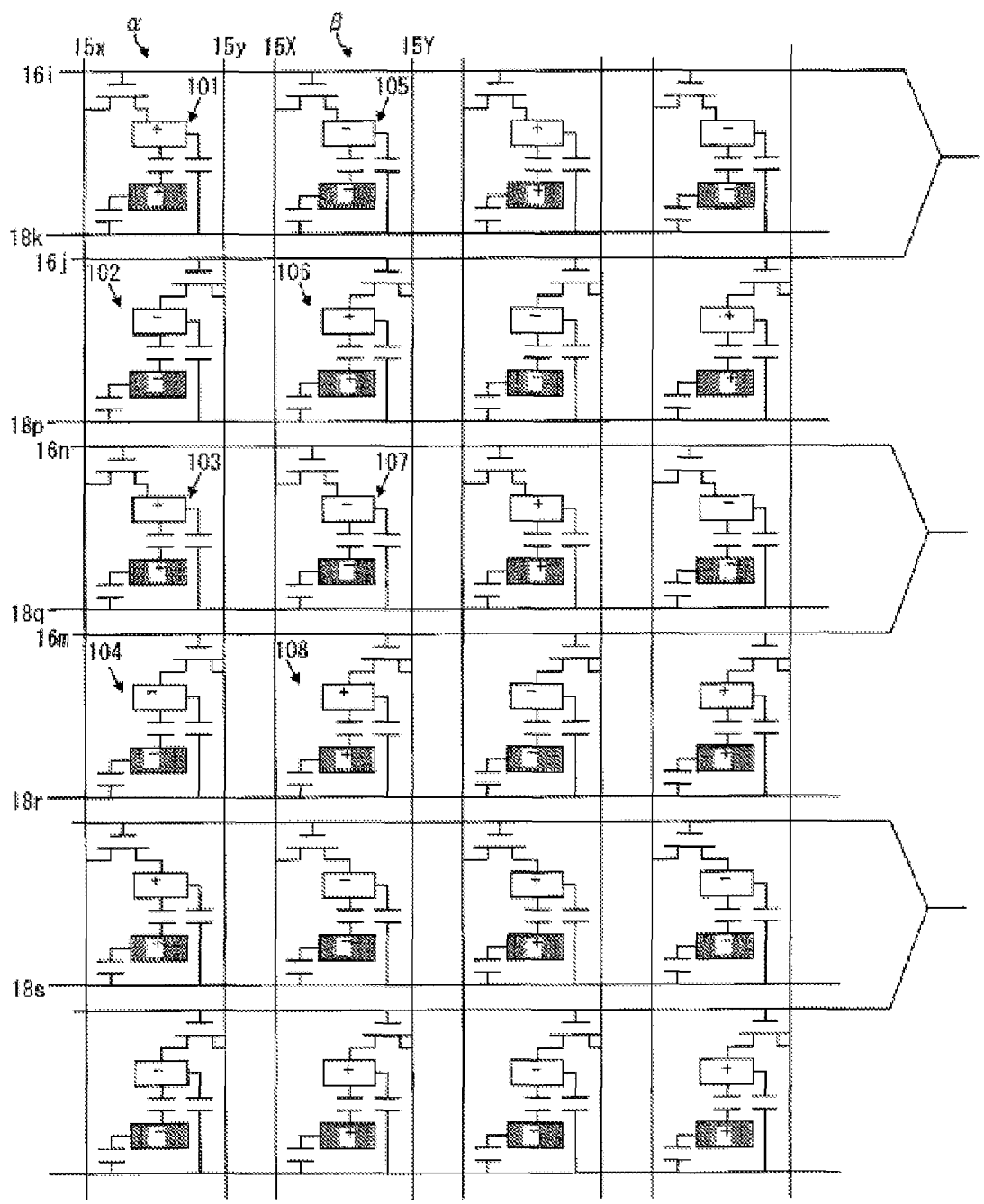
FIG. 23 is a schematic view showing the display state of a liquid crystal panel according to the driving method of FIG. 22.

Thus, in F1, as shown in FIG. 23, the sub-pixel including the pixel electrode 17*ia* becomes a bright sub-pixel of positive polarity; the sub-pixel including the pixel electrode 17*ib* becomes a dark sub-pixel of positive polarity; the sub-pixel including the pixel electrode 17*ja* becomes a bright sub-pixel of negative polarity; a sub-pixel including the pixel electrode 17*jb* becomes a dark sub-pixel of negative polarity; the sub-pixel including the pixel electrode 17*ma* becomes a bright sub-pixel of positive polarity; the sub-pixel including the pixel electrode 17*mb* becomes a dark sub-pixel of positive polarity; the sub-pixel including the pixel electrode 17*na* becomes a bright sub-pixel of negative polarity; the sub-pixel including the pixel electrode 17*nb* becomes a dark sub-pixel of negative polarity; the sub-pixel including the pixel electrode 17IA becomes a bright sub-pixel of negative polarity; and the sub-pixel including the pixel electrode 17IB becomes a dark sub-pixel of negative polarity. This way, the dot inversion driving is performed during F1.

In frame F2, as shown in FIG. 22, to the data signal line 15*x* and the data signal line 15Y, data signals of negative polarity are supplied during the Nth horizontal scanning period (including the scanning period of the scan signal lines 16*i* and 16*j*) and data signals of negative polarity are supplied also during the (N+1)th horizontal scanning period (including the scanning period of the scan signal lines 16*m* and 16*n*). To the data signal line 15*y* and the data signal line 15X, data signals of positive polarity are supplied during the Nth horizontal scanning period (including the scanning period of the scan signal lines 16*i* and 16*j*) and data signals of positive polarity are supplied also during the (N+1)th horizontal scanning period (including the scanning period of the scan signal lines 16*m* and 16*n*).

As a result, in F2, the sub-pixel including the pixel electrode 17*ia* becomes a bright sub-pixel of negative polarity; the sub-pixel including the pixel electrode 17*ib* becomes a dark sub-pixel of negative polarity; the sub-pixel including the pixel electrode 17*ja* becomes a bright sub-pixel of positive polarity; the sub-pixel including the pixel electrode 17*jb* becomes a dark sub-pixel of positive polarity; the sub-pixel including the pixel electrode 17*ma* becomes a bright sub-pixel of negative polarity; the sub-pixel including the pixel electrode 17*mb* becomes a dark sub-pixel of negative polarity; the sub-pixel including the pixel electrode 17*na* becomes a bright sub-pixel of positive polarity; the sub-pixel including the pixel electrode 17*nb* becomes a dark sub-pixel of positive polarity; the sub-pixel including the pixel electrode 17IA becomes a bright sub-pixel of positive polarity; the sub-pixel including the pixel electrode 17IB becomes a dark sub-pixel of positive polarity. This way, the dot inversion driving is performed also during F2.

Thus, in the present liquid crystal panel, because halftones are represented by the bright and dark sub-pixels, the viewing angle characteristics can be improved.

Also, a linear electrode (shield electrode) connected to the storage capacitance wiring is disposed in the gap between two pixel electrodes, one of which being the pixel electrode included in a given pixel region and the other being the pixel electrode included in the pixel region adjacent to the aforementioned given pixel region on the downstream side of the scanning direction. As a result, each of the aforementioned pixel electrodes that are adjacent to each other are electrically shielded with the linear electrode, and the phenomenon that the effective potential of the scan signal lines fluctuate for every other line (scan signal line) when two scan signal lines are scanned at a time can be suppressed. Consequently, the horizontal streaks caused by this phenomenon can be reduced.

Figure 24:
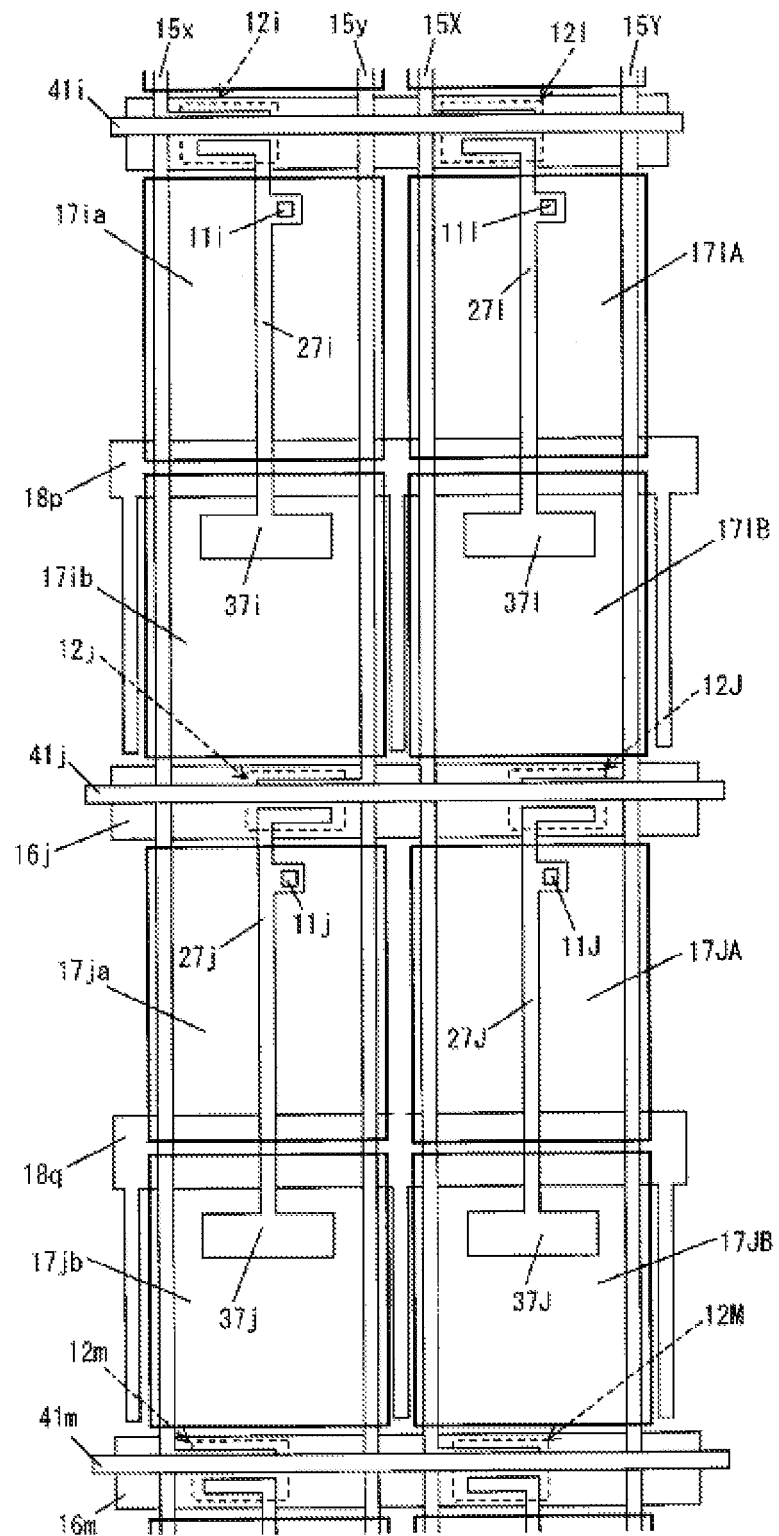
FIG. 24 is a schematic view showing a modification example of the liquid crystal panel of FIG. 20.

Referring to the liquid crystal panel of FIG. 20, as shown in FIG. 24, a storage capacitance wiring extension can be extended from the storage capacitance wiring to go along the edges of the pixel electrodes that are electrically floating. This way, the pixel electrodes that are electrically floating (pixel electrodes 17*ib*, 17IB, 17*jb*, and 17JB) are electrically shielded by the storage capacitance wiring extension, and the pixel burning can be suppressed.

Figure 25:
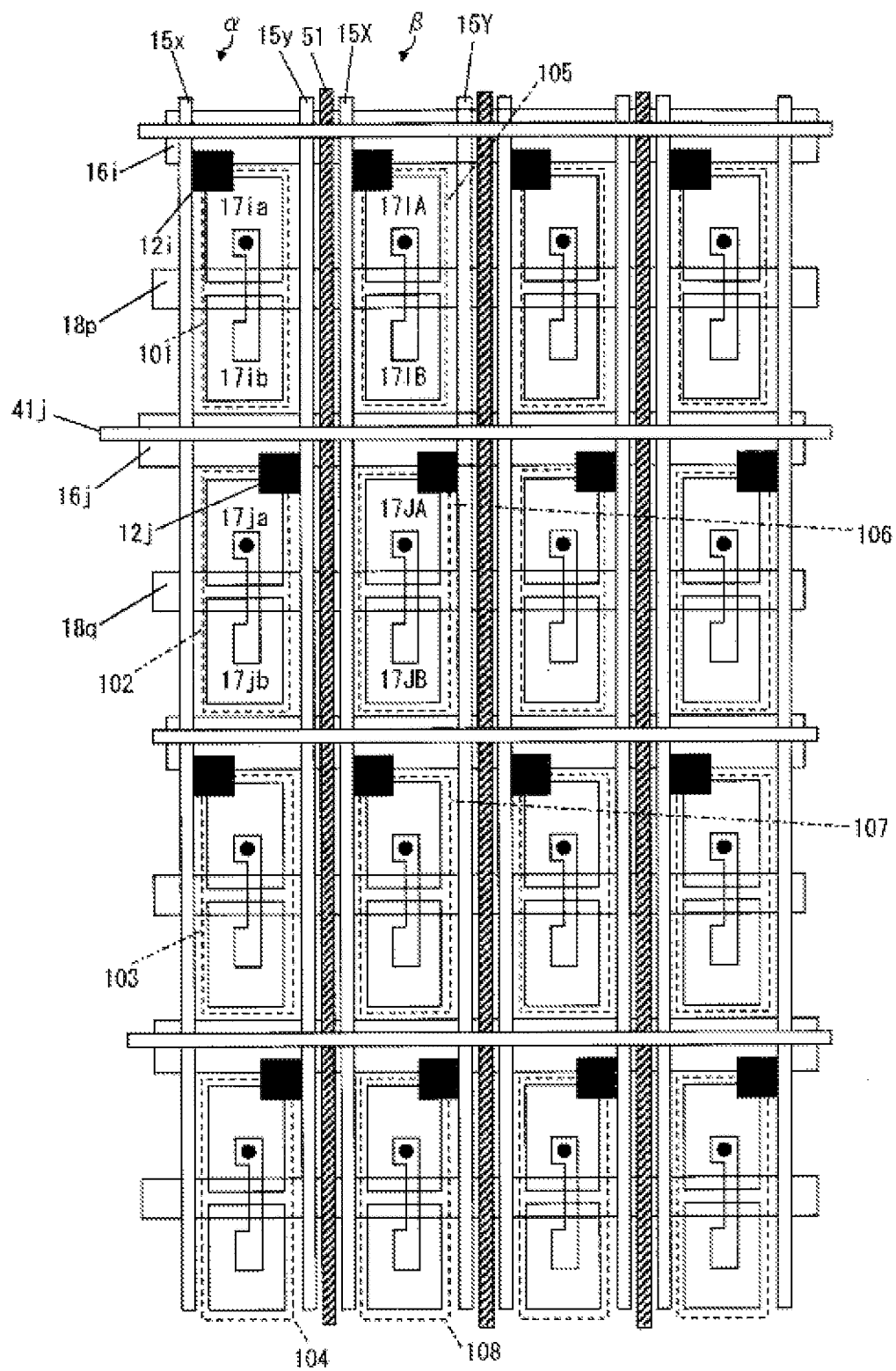
FIG. 25 is a schematic view showing a modification example of the active matrix substrate of FIG. 18.

The active matrix substrate of FIG. 18 may also be configured as shown in FIG. 25. That is, an inter-wiring is disposed in the gap between two adjacent data signal lines, one of which being a data signal line provided for a given pixel region column and the other being a data signal line provided for the pixel region column adjacent to the aforementioned given pixel region column. Specifically, as shown in FIG. 25, the data signal line 15*y* for the pixel region column α and the data signal line 15X for the pixel region column β are adjacent to each other, and an inter-wiring 51 is disposed in the gap between the data signal line 15*y* and the data signal line 15X. The inter-wiring 51 extends under the gap between the pixel electrode 17*ia* and the pixel electrode 17Ia, under the gap between the pixel electrode 17*ib* and the pixel electrode 17IB, under the gap between the pixel electrode 17*ja* and the pixel electrode 17JA, and under the gap between the pixel electrode 17*jb* and the pixel electrode 17JB.

Figure 26:
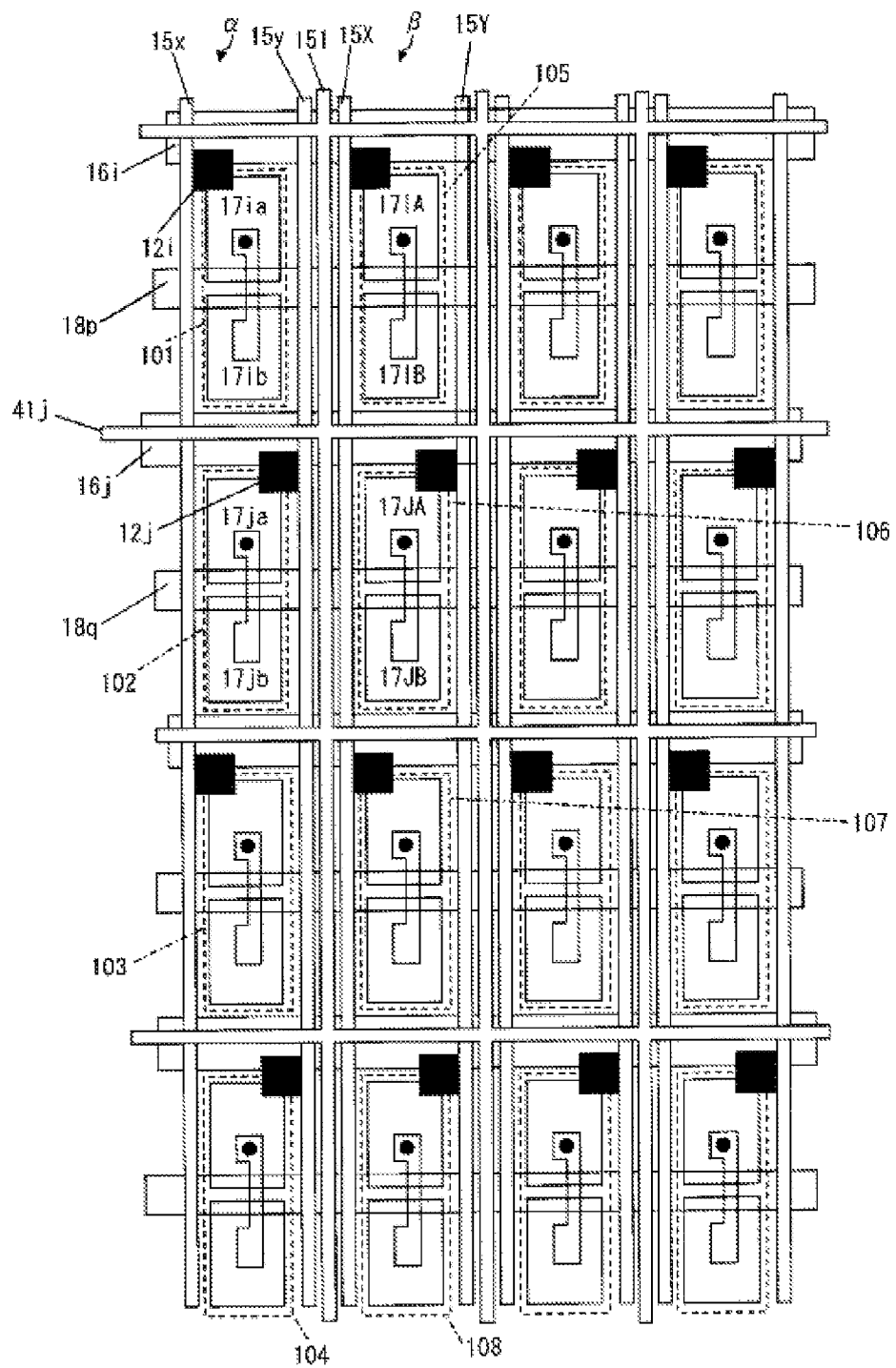
FIG. 26 is a schematic view showing another modification example of the active matrix substrate shown in FIG. 18.

Also, as shown in FIG. 26, an inter-wiring can be disposed over the gap between the aforementioned two adjacent data signal lines (in the same layer as the pixel electrodes) to form the inter-wiring and the linear electrode as a unit. Specifically, an inter-wiring 151 is disposed over the gap between the data signal line 15*y* and the data signal line 15X (in the same layer as the pixel electrodes 17*ia* and 17IA), and the inter-wiring 151 and the linear electrode 41*j* are connected to each other in the same layer.

In a liquid crystal display device equipped with the active matrix substrate of FIGS. 25 and 26, the crosstalk caused by the parasitic capacitance between each of the pixel electrodes in the pixel region column α and the data signal line 15X, and the crosstalk caused by the parasitic capacitance between each of the pixel electrodes in the pixel region column β and the data signal line 15*y* can be significantly reduced, and the vertical shadow generated due to the crosstalk can therefore be suppressed.

Figure 41:
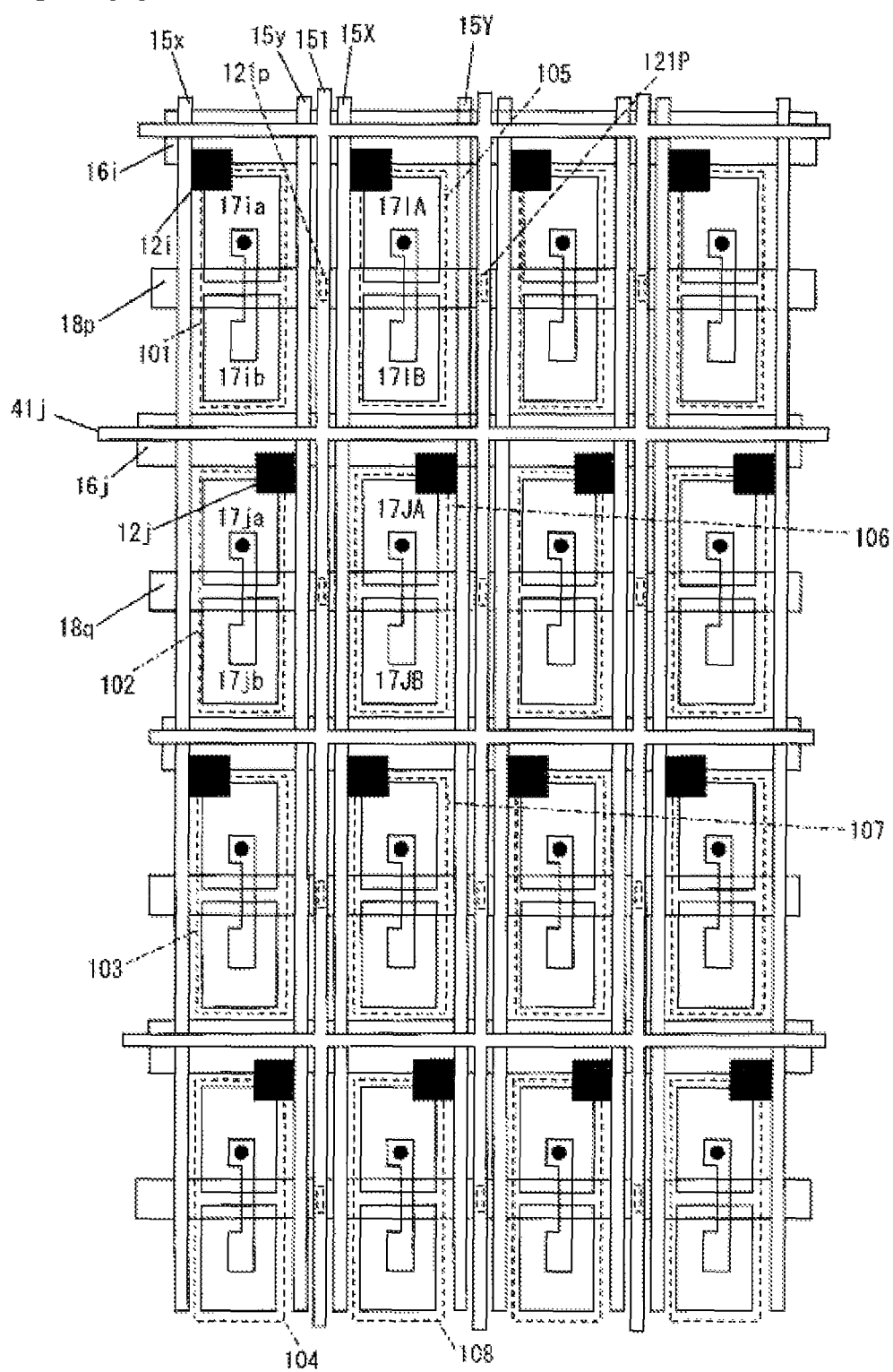
FIG. 41 is a schematic view showing a modification example of the active matrix substrate shown in FIG. 26.

In the configuration of FIG. 26, the inter-wiring and the storage capacitance wiring may also be connected to each other through contact holes (see FIG. 41). For example, the inter-wiring 151 and the storage capacitance wiring 18*p* are connected to each other through contact holes 121*p* and 121P. This configuration makes it possible to narrow the frame region. Consequently, it is suitable for a tiled display (a display device that displays one picture by combining a plurality of liquid crystal panels that are driven separately), for example.

Embodiment 3

Figure 27:
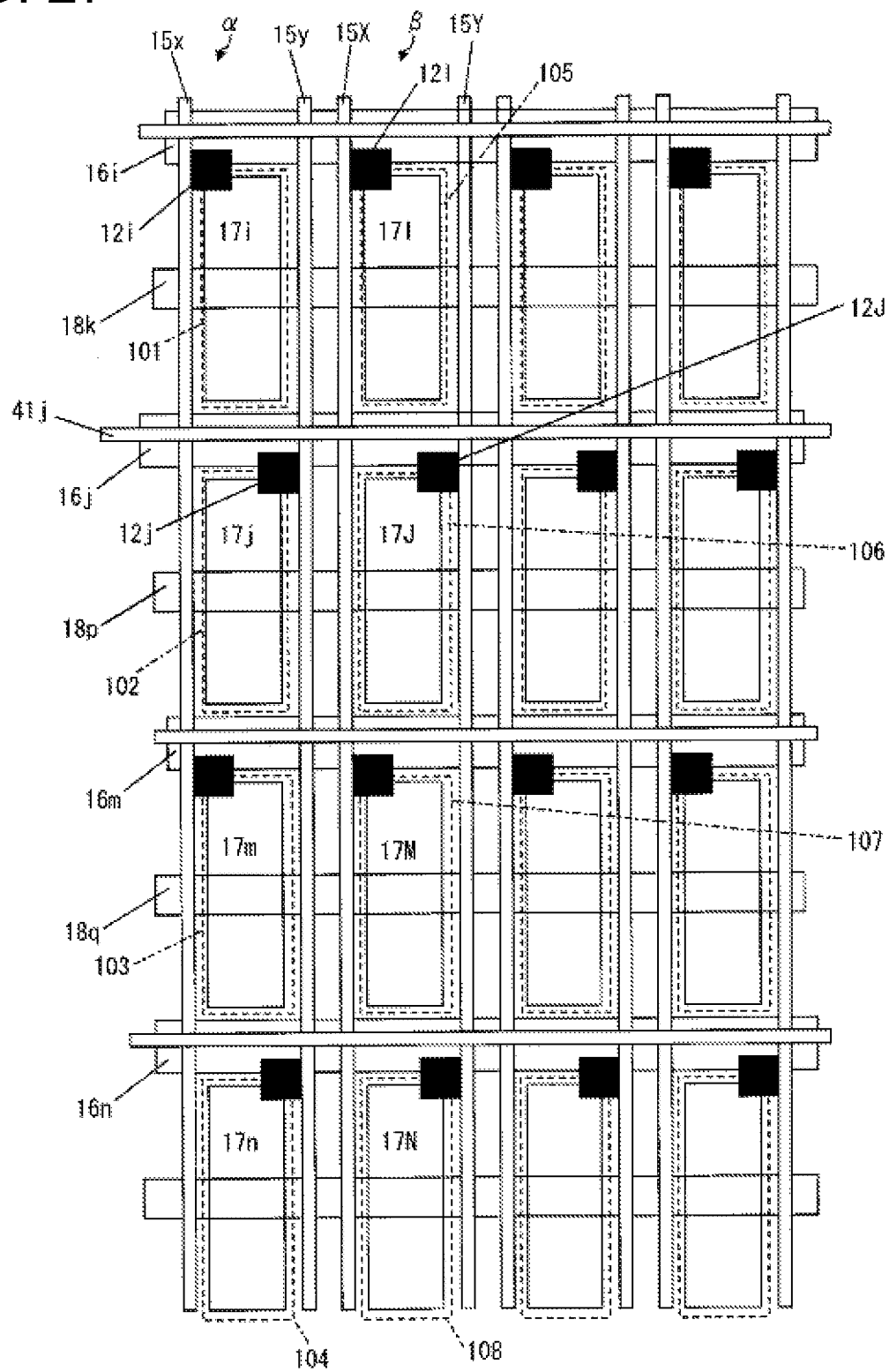
FIG. 27 is a schematic view showing a configuration example of an active matrix substrate according to Embodiment 3.

FIG. 27 is a schematic view showing a portion of an active matrix substrate according to Embodiment 3. In the active matrix of FIG. 27, the pixel regions, data signal lines, and scan signal lines are arranged in the same way as in the active matrix substrate of FIG. 18. Further, in a given pixel region included in one pixel region column, one pixel electrode connected to one of the two data signal lines for this pixel region column through a transistor is disposed, and in the pixel region adjacent to the aforementioned given pixel region on the downstream side of the scanning direction, one pixel electrode connected to the other of the two data signal lines through a transistor is disposed. Specifically, in the pixel region 101 of the pixel region column α, a pixel electrode 17*i* is disposed, and the pixel electrode 17*i* is connected to the data signal line 15*x* through a transistor 12*i* tied to the scan signal line 16*i*. In the pixel region 102, which is adjacent to the pixel region 101 on the downstream side of the scanning direction, a pixel electrode 17*j* is disposed, and the pixel electrode 17*j* is connected to the data signal line 15*y* tied to the scan signal line 16*j* through a transistor 12*j*.

Similarly, in the pixel region 105 of the pixel region column β, a pixel electrode 17I is disposed, and the pixel electrode 17I is connected to the data signal line 15X through a transistor 12I tied to the scan signal line 16*i*. In the pixel region 106 adjacent to the pixel region 105 on the downstream side of the scanning direction, a pixel electrode 17J is disposed, and the pixel electrode 17J is connected to the data signal line 15Y through a transistor 12J tied to the scan signal line 16*j*.

In the pixel region 103 of the pixel region column α, a pixel electrode 17*m* is disposed, and the pixel electrode 17*m* is connected to the data signal line 15*x* through a transistor 12*m* tied to the scan signal line 16*m*. In the pixel region 104, which is adjacent to the pixel region 103 on the downstream side of the scanning direction, a pixel electrode 17*n* is disposed, and the pixel electrode 17*n* is connected to the data signal line 15*y* through a transistor 12*n* tied to the scan signal line 16*n*.

Here, a linear electrode (shield electrode) is disposed in the gap between two adjacent pixel electrodes, one of which being the pixel electrode included in a given pixel region and the other being the pixel electrode included in the pixel region adjacent to the aforementioned given pixel region on the downstream side of the scanning direction, and a storage capacitance wiring is disposed across the pixel region row.

Specifically, the pixel electrode 17*i* in the pixel region 101 and the pixel electrode 17*j* in the pixel region 102 are adjacent to each other, a linear electrode 41*j* is disposed in a gap between the pixel electrode 17*i* and the pixel electrode 17*j* (to overlap the scan signal line 16*j*), and a storage capacitance wiring 18*p* is disposed to overlap the pixel electrode 17*j* in the pixel region 102. Also, the pixel electrode 17I in the pixel region 105 and the pixel electrode 17J in the pixel region 106 are adjacent to each other, a linear electrode 41*j* extends through the gap between the pixel electrode 17I and the pixel electrode 17J, and the storage capacitance wiring 18*p* overlaps the pixel electrode 17J in the pixel region 106. Also, the pixel electrode 17*j* in the pixel region 102 and the pixel electrode 17*m* in the pixel region 103 are adjacent to each other, a linear electrode 41*m* is disposed in the gap between the pixel electrode 17*j* and the pixel electrode 17*m* (to overlap the scan signal line 16*m*), and a storage capacitance wiring 18*q* is disposed to overlap the pixel electrode 17*m* in the pixel region 103.

Figure 28:
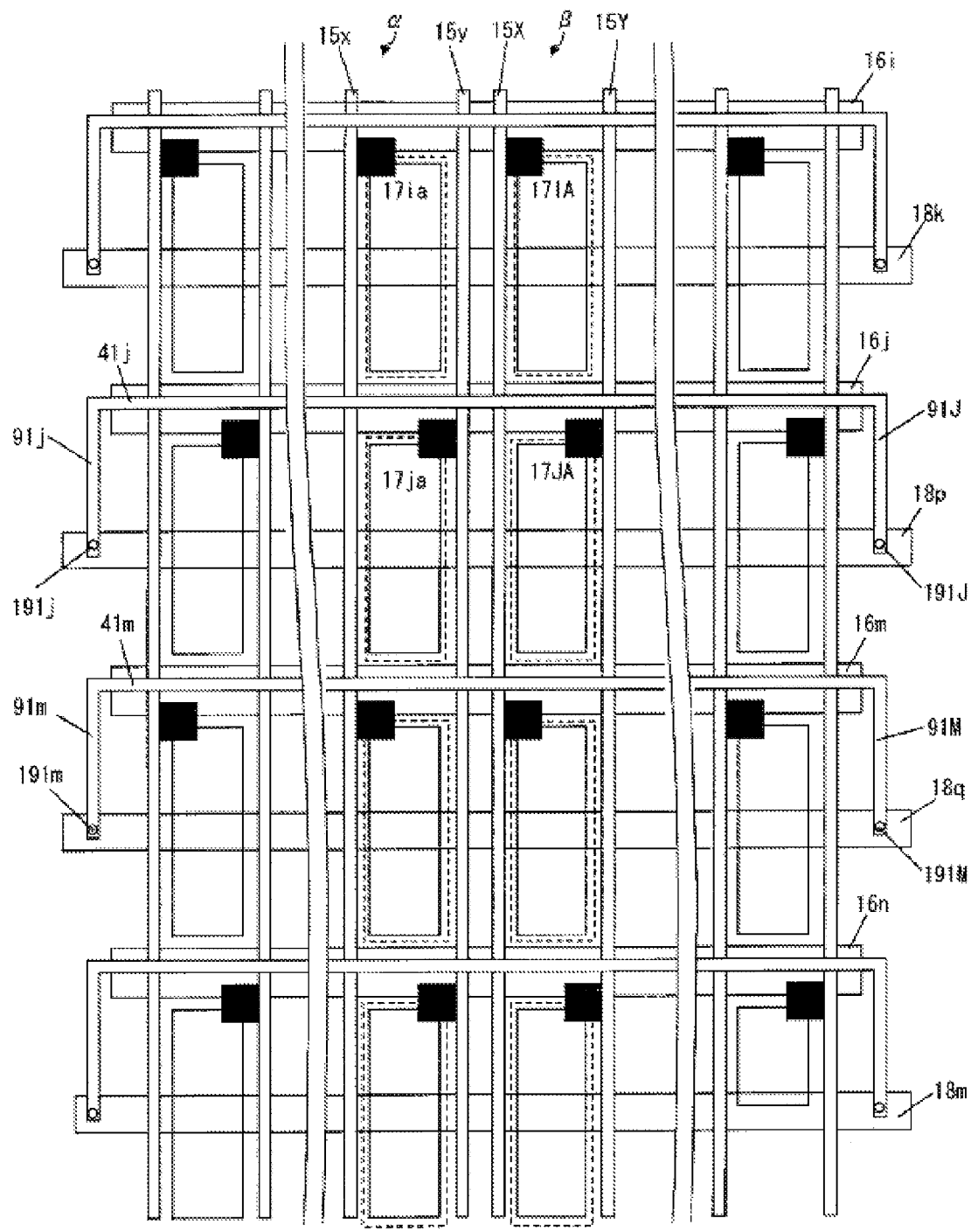
FIG. 28 is a schematic view showing end portions of the active matrix substrate of FIG. 27.

Also, as shown in FIG. 28, one end of the linear electrode 41*j* is connected to one end of the storage capacitance wiring 18*p* through a connection electrode 91*j* and a contact hole 191*j* formed in the frame region of the display section, and the other end of the linear electrode 41*j* is connected to the other end of the storage capacitance wiring 18*p* through a connection electrode 91J and a contact hole 191J formed in the frame region of the display section. Also, one end of the linear electrode 41*m* is connected to one end of the storage capacitance wiring 18*q* through a connection electrode 91*m* and a contact hole 191*m* formed in the frame region of the display section, and the other end of the linear electrode 41*m* is connected to the other end of the storage capacitance wiring 18q through a connection electrode 91M and a contact hole 191M formed in the frame region of the display section.

The scan signal line 16i and scan signal line 16j are connected inside the panel or outside the panel, for example, and they (16i·16j) are selected simultaneously (to be described later). Also, the scan signal line 16m and the scan signal line 16n are connected inside the panel or outside the panel, for example, and they (16m and 16n) are selected simultaneously (to be described later).

Figure 29:
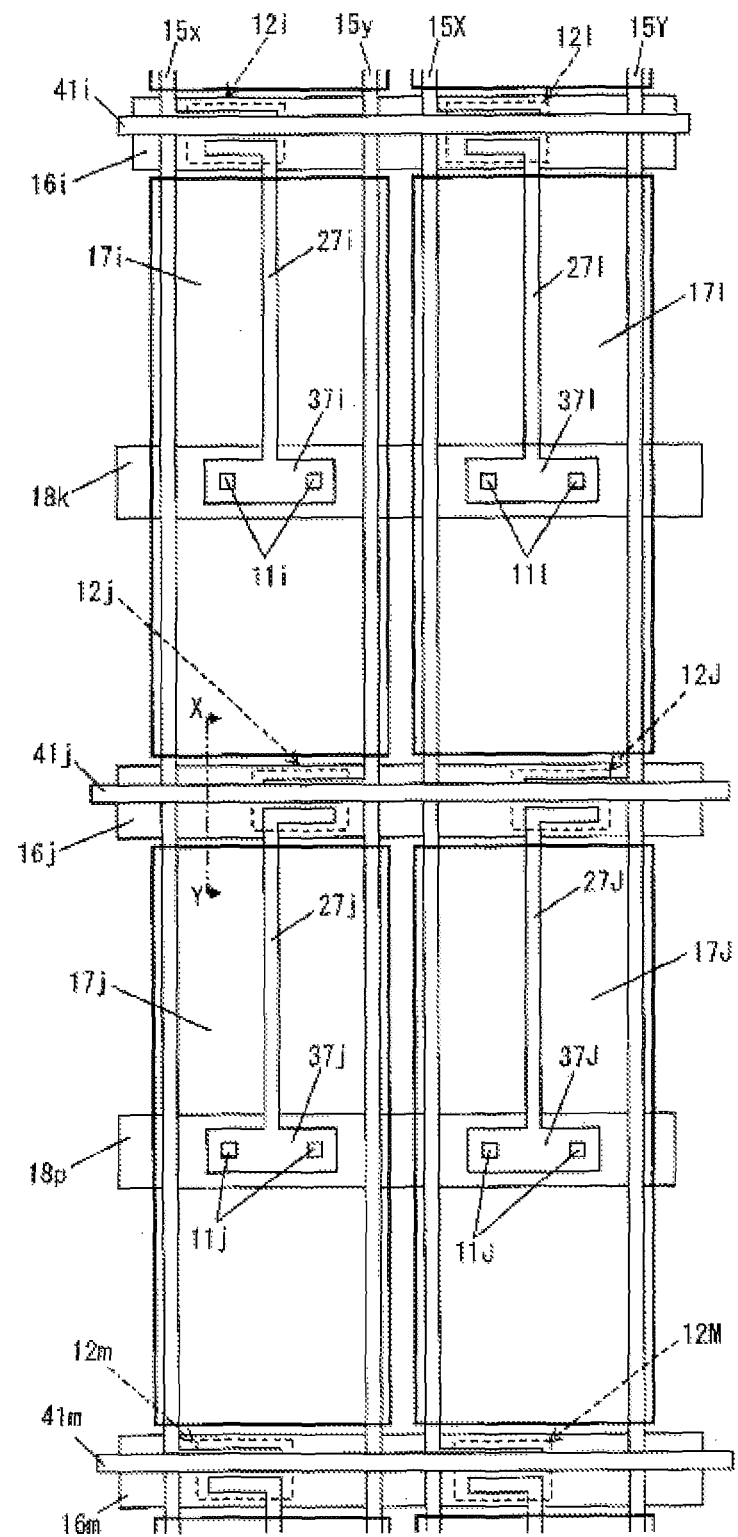
FIG. 29 is a plan view showing a configuration example of a liquid crystal panel equipped with the active matrix substrate of FIG. 27.

FIG. 29 is a plan view showing a portion of a liquid crystal panel equipped with the active matrix substrate of FIG. 27. In FIG. 29, members of the color filter substrate (opposite substrate) are omitted, and only members of the active matrix substrate are illustrated for simplicity.

For the present liquid crystal panel, a pair of (two) data signal lines 15x and 15y and a pair of (two) data signal lines 15X and 15Y are arranged such that the data signal line 15y and the data signal line 15X are adjacent to each other, and the scan signal line 16i and the scan signal line 16j are disposed to cross the data signal lines at a right angle, a transistor 12i is disposed near the intersection of the data signal line 15x and the scan signal line 16i, a transistor 12j is disposed near the intersection of the data signal line 15y and the scan signal line 16j, a transistor 12I is disposed near the intersection of the data signal line 15X and the scan signal line 16i, and a transistor 12J is disposed near the intersection of the data signal line 15Y and the scan signal line 16j.

Between the scan signal lines 16i and 16j, a pixel electrode 17i is disposed to overlap the data signal lines 15x and 15y, and a pixel electrode 17I is disposed to overlap the data signal lines 15X and 15Y. Between the scan signal lines 16j and 16m, a pixel electrode 17j is disposed to overlap the data signal lines 15x and 15y, and a pixel electrode 17J is disposed to overlap the data signal lines 15X and 15Y.

Here, in the gap between the pixel electrode 17i and the pixel electrode 17j, a linear electrode 41j is disposed, and a storage capacitance wiring 18p is disposed to overlap the pixel electrode 17j. The linear electrode 41j extends through the gap between the pixel electrode 17I and the pixel electrode 17J, and the storage capacitance wiring 18p overlaps with the pixel electrode 17J.

When observed in a plan view, the two edges of the pixel electrode 17i that extend in the column direction are located outside the data signal line 15x and the data signal line 15y; the two edges of the pixel electrode 17j that extend in the column direction are located outside the data signal line 15x and the data signal line 15y; the two edges of the pixel electrode 17I that extend in the column direction are located outside the data signal line 15X and the data signal line 15Y; and the two edges of the pixel electrode 17J that extend in the column direction are located outside the data signal line 15X and data signal line 15Y.

The scan signal line 16i functions as the gate electrode of the transistor 12i, the source electrode of the transistor 12i is connected to the data signal line 15x and the drain electrode is connected to the capacitance electrode 37i, which overlaps the storage capacitance wiring 18k, through the drain lead-out electrode 27i, and the capacitance electrode 37i is connected to the pixel electrode 17i through the contact hole 11i. The scan signal line 16j functions as the gate electrode of the transistor 12j, the source electrode of the transistor 12j is connected to the data signal line 15y and the drain electrode is connected to the capacitance electrode 37j, which overlaps the storage capacitance wiring 18p, through the drain lead-out electrode 27j, and the capacitance electrode 37j is connected to the pixel electrode 17j through a contact hole 11j.

Similarly, the scan signal line 16i functions as the gate electrode of the transistor 12I, the source electrode of the transistor 12I is connected to the data signal line 15X and the drain electrode is connected to the capacitance electrode 37I, which overlaps the storage capacitance wiring 18k, through the drain lead-out electrode 27I, and the capacitance electrode 37I is connected to the pixel electrode 17I through the contact hole 11I. The scan signal line 16j functions as the gate electrode of the transistor 12J, the source electrode of the transistor 12J is connected to the data signal line 15Y and the drain electrode is connected to the capacitance electrode 37J, which overlaps the storage capacitance wiring 18p, through the drain lead-out electrode 27J, and the capacitance electrode 37J is connected to the pixel electrode 17J through the contact hole 11J.

In the present liquid crystal panel, storage capacitances are formed at locations where the storage capacitance wiring 18k overlaps with the capacitance electrodes 37i and 37I through the gate insulating film, and where the storage capacitance wiring 18p overlaps with the capacitance electrodes 37j and 37J through the gate insulating film.

Figure 30:
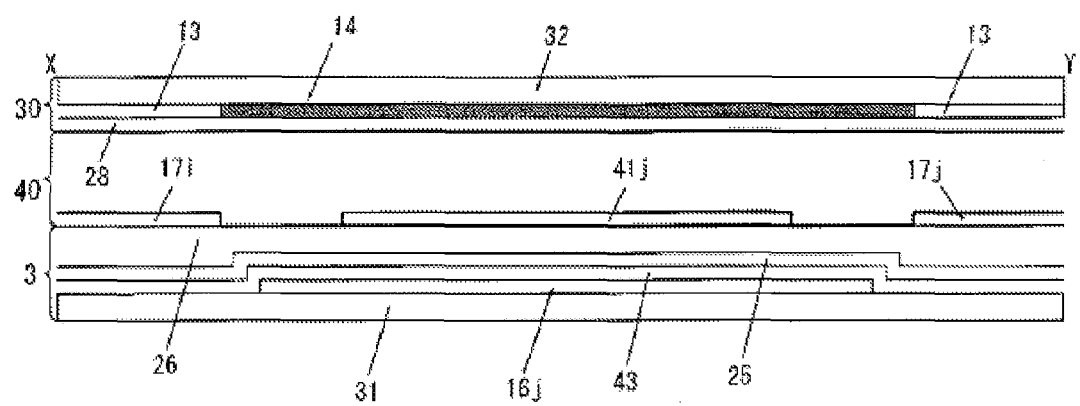
FIG. 30 is a cross-sectional arrow view of the liquid crystal panel of FIG. 29, taken along the line X-Y.

FIG. 30 is a cross-sectional arrow view taken along the line X-Y of FIG. 29. As shown in FIG. 30, a scan signal line 16j is formed on the substrate 31, and a gate insulating film 43 is formed to cover the scan signal line 16j. On the gate insulating film 43, an inorganic interlayer insulating film 25 and an organic interlayer insulating film 26 are layered, and on the organic interlayer insulating film 26, pixel electrodes 17i and 17j and a linear electrode 41j are formed.

Figure 31:
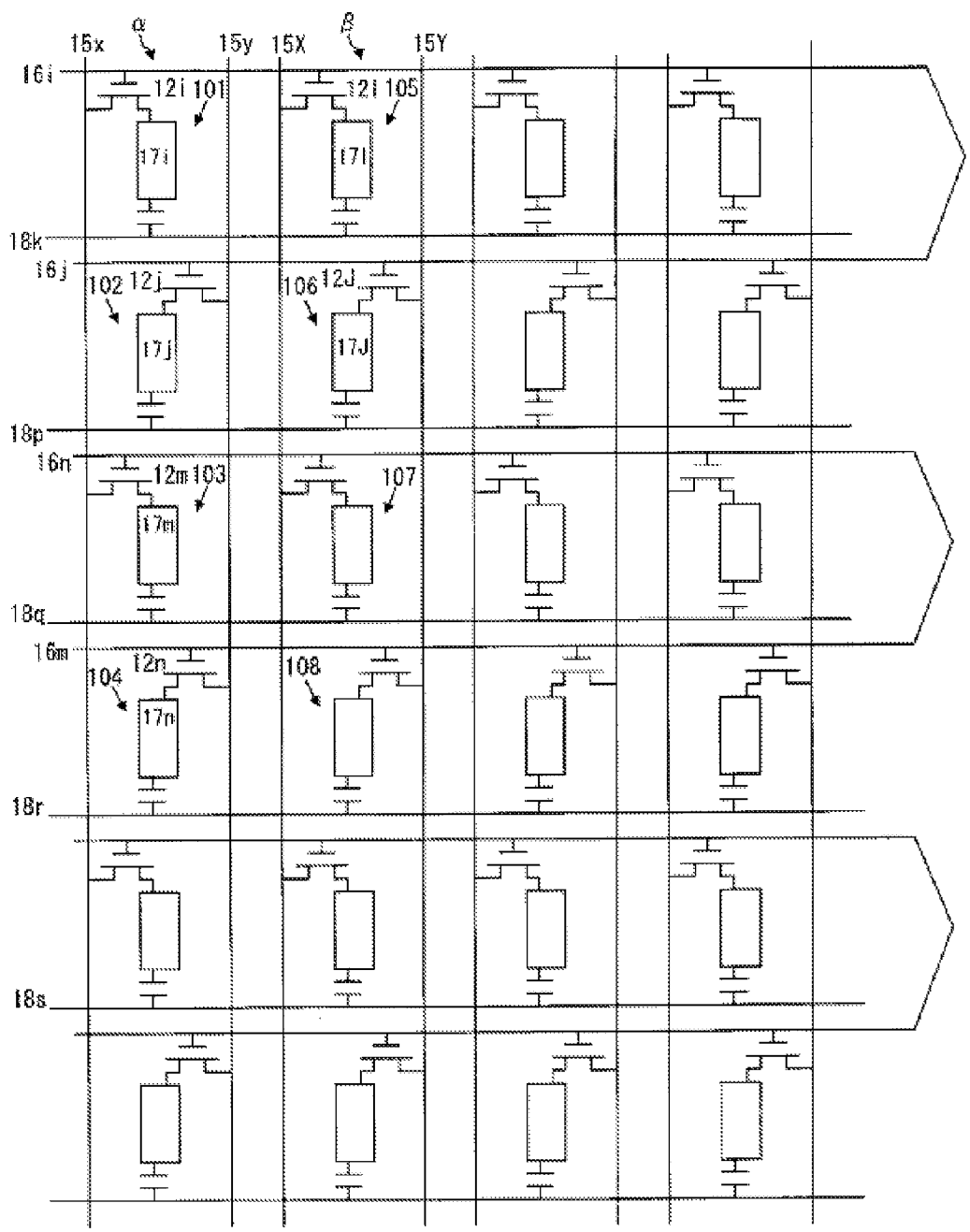
FIG. 31 is an equivalent circuit diagram of the active matrix substrate of FIG. 27.
Figure 32:
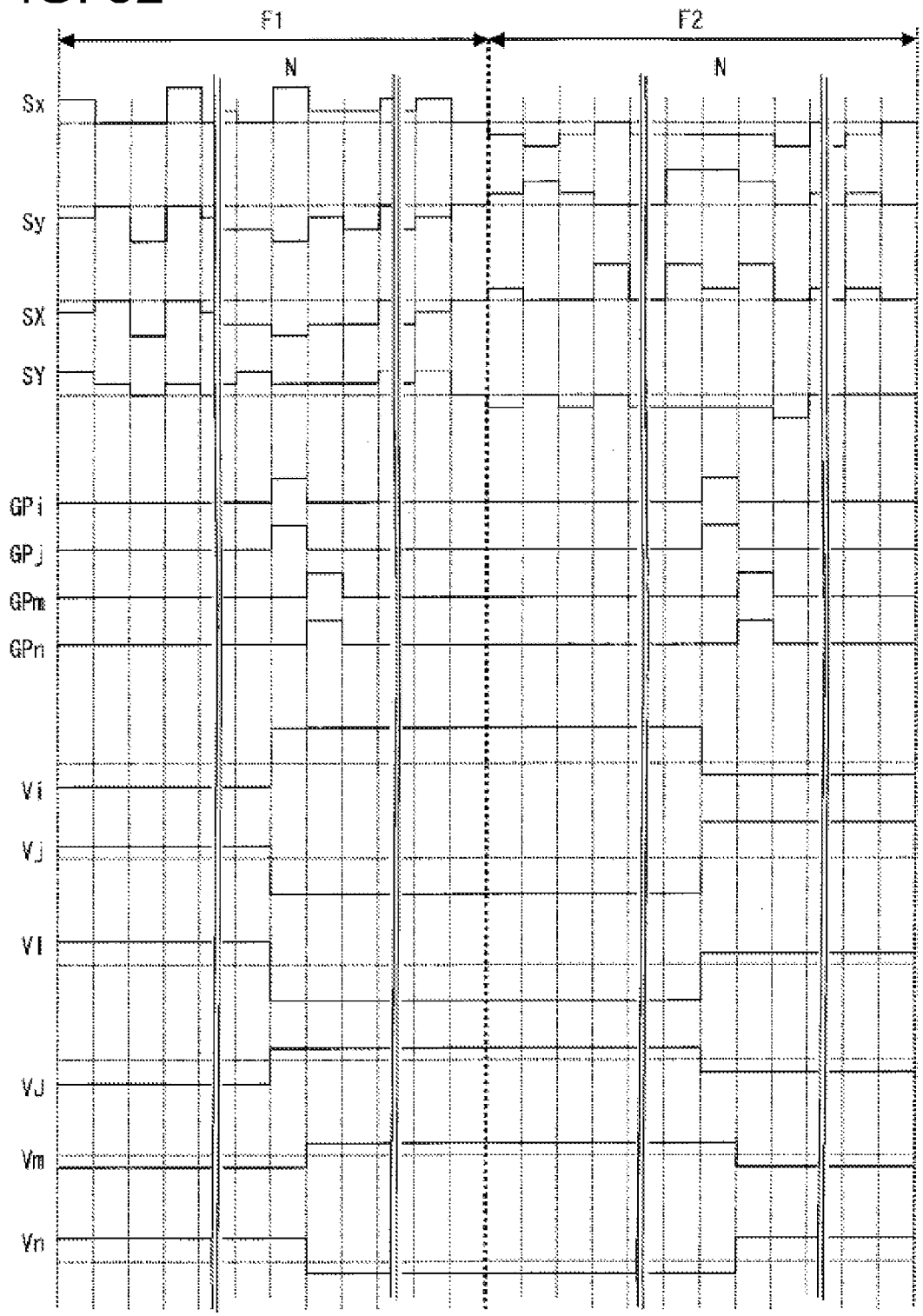
FIG. 32 is a timing chart showing a driving method (frames 1 and 2) of a liquid crystal panel equipped with the active matrix substrate of FIG. 27.

FIG. 32 is a timing chart showing a driving method (normally black mode) of a liquid crystal panel equipped with the active matrix substrate of FIG. 31. Sx, Sy, SX, and SY denote data signals (data signals) supplied to the data signal lines 15x, 15y, 15X, and 15Y, respectively. GPi, GPj, GPm, and GPn denote gate signals supplied to the scan signal lines 16i, 16j, 16m, and 16n, respectively. Vi, Vj, VI, VJ, Vm, and Vn denote the potentials of the pixel electrodes 17i, 17j, 17I, 17J, 17m, and 17n, respectively.

In the present driving method, as shown in FIG. 32, two scan signal lines are simultaneously selected at a time, the polarity of the data signals supplied to the data signal lines are reversed in every frame period (1V), and in the same horizontal scanning period (H), data signals of opposite polarities are supplied to two data signal lines for the same pixel column (15x and 15y or 15X and 15Y). To the storage capacitance wirings, constant potential signals whose potential is the same as that of the common electrode (Vcom signals) are supplied.

Specifically, in F1 of consecutive frames F1 and F2, to the data signal line 15x and the data signal line 15Y, data signals of positive polarity are supplied during the Nth horizontal scanning period (including the scanning period of the scan signal lines 16i and 16j), and data signals of positive polarity are supplied also during the (N+1)th horizontal scanning period (including the scanning period of the scan signal lines 16m and 16n). To the data signal line 15y and the data signal line 15X, data signals of negative polarity are supplied during the Nth horizontal scanning period (including the scanning period of the scan signal lines 16i and 16j), and data signals of negative polarity are supplied also during the (N+1)th horizontal scanning period (including the scanning period of the scan signal lines 16m and 16n).

Figure 33:
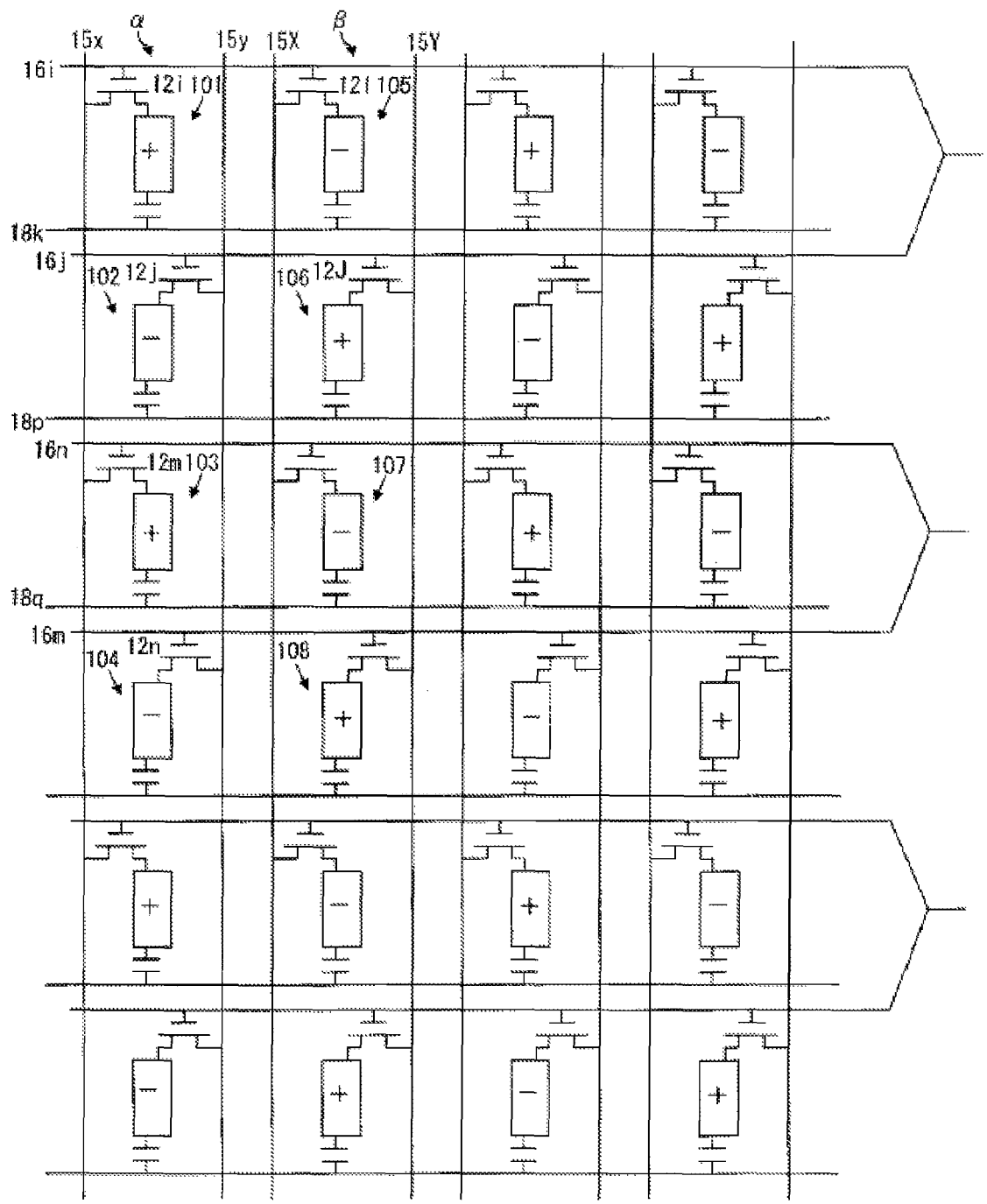
FIG. 33 is a schematic view showing a display state of a liquid crystal panel according to the driving method shown in FIG. 32.

Consequently, when the present liquid crystal panel is driven, as shown in FIG. 33, the polarity of the pixel that includes the pixel electrode 17i becomes positive, the polarity of the pixel that includes the pixel electrode 17j becomes negative, the polarity of the pixel that includes the pixel electrode 17m becomes positive, the polarity of the pixel that includes the pixel electrode 17n becomes negative, the polarity of the pixel that includes the pixel electrode 17I becomes negative, and the polarity of the pixel that includes the pixel electrode 17J becomes positive. Thus, dot inversion drive is performed during F1.

During F2, to the data signal line 15x and the data signal line 15Y, data signals of negative polarity are supplied during the Nth horizontal scanning period (including the scanning period of the scan signal lines 16i and 16j), and data signals of negative polarity are supplied also during the (N+1)th horizontal scanning period (including the scanning period of the scan signal lines 16m and 16n). To the data signal line 15y and the data signal line 15X, data signals of positive polarity are supplied during the Nth horizontal scanning period (including the scanning period of the scan signal lines 16i and 16j), and data signals of positive polarity are supplied also during the (N+1)th horizontal scanning period (including the scanning period of the scan signal lines 16m and 16n). Consequently, the polarity of the pixel electrode 17i becomes negative, the polarity of the pixel electrode 17j becomes positive, the polarity of the pixel electrode 17m becomes negative, the polarity of the pixel electrode 17n becomes positive, the polarity of the pixel electrode 17I becomes positive, and the polarity of the pixel electrode 17J becomes negative. Thus, dot inversion drive is performed also during F2.

Figure 34:
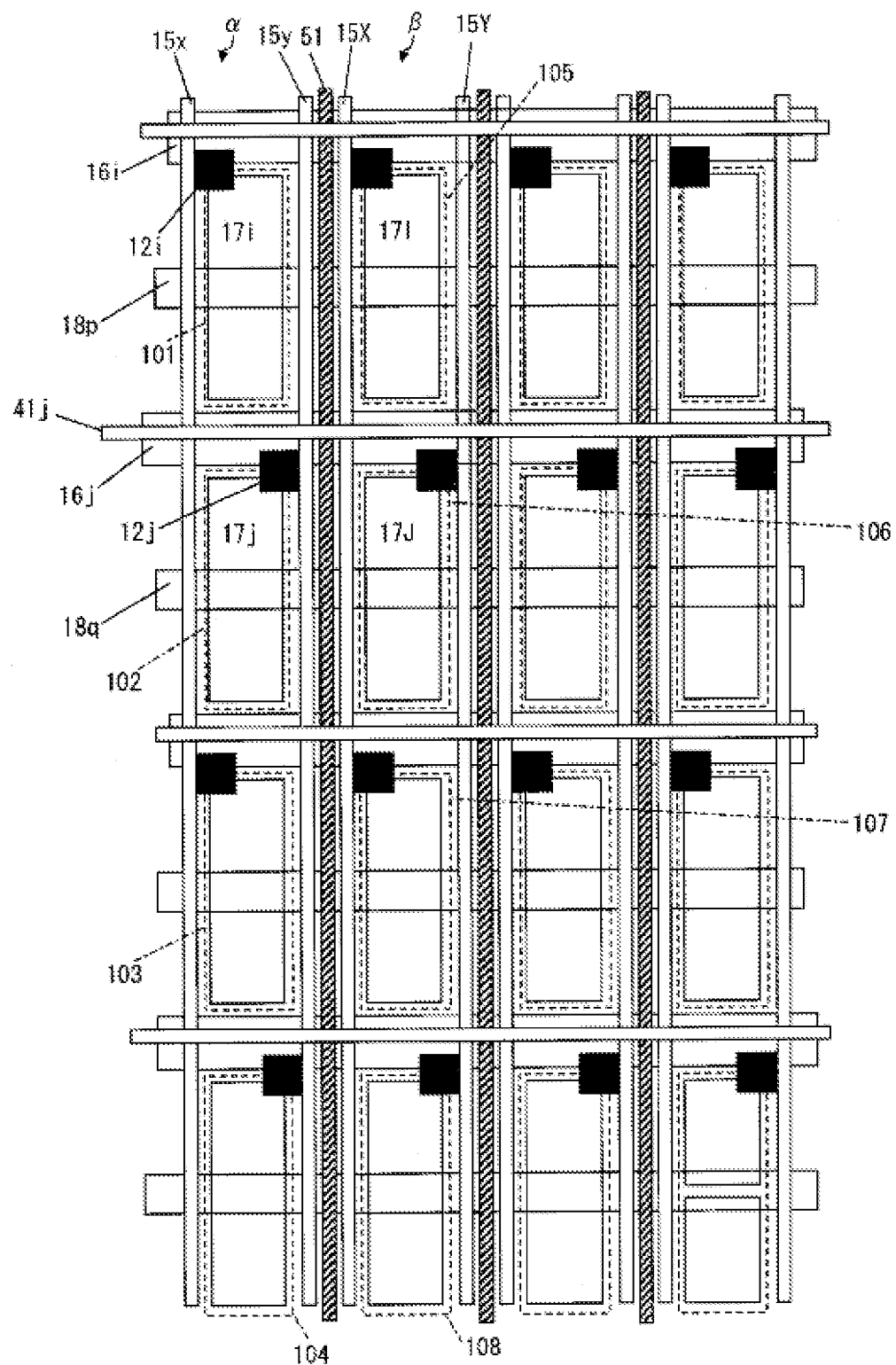
FIG. 34 is a schematic view showing a modification example of the active matrix substrate of FIG. 27.

The active matrix substrate of FIG. 27 may also be configured as shown in FIG. 34. That is, an inter-wiring is disposed in the gap between two adjacent data signal lines, one of which being a data signal line provided for a given pixel region column and the other being a data signal line provided for the pixel region column adjacent to the aforementioned given pixel region column. Specifically, as shown in FIG. 34, the data signal line 15y for the pixel region column α and the data signal line 15X for the pixel region column β are adjacent to each other, and an inter-wiring 51 is disposed in the gap between the data signal line 15y and the data signal line 15X. The inter-wiring 51 extends under the gap between the pixel electrode 17i and the pixel electrode 17I and also under the gap between the pixel electrode 17j and the pixel electrode 17J.

Figure 35:
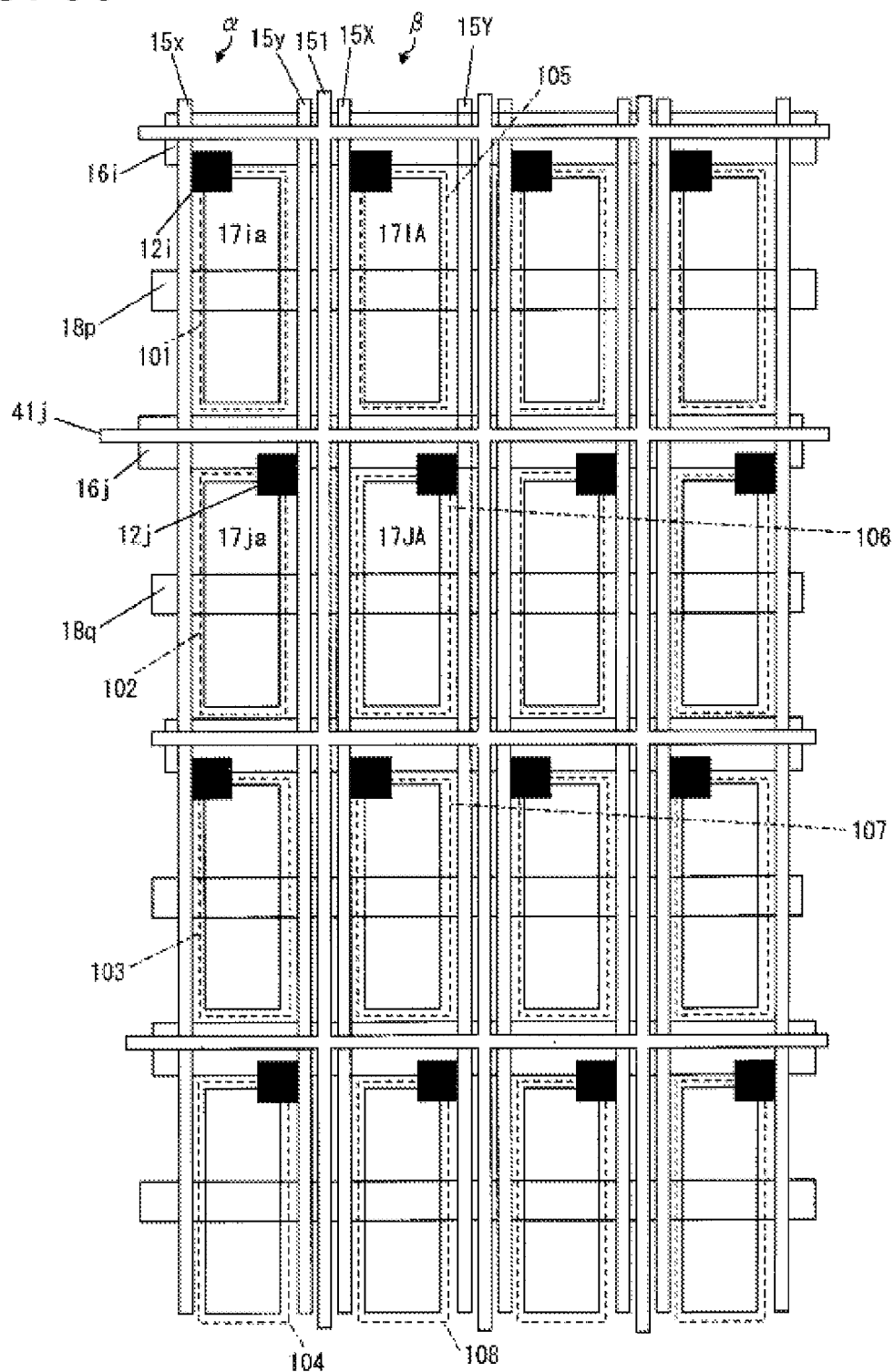
FIG. 35 is a schematic view showing another modification example of the active matrix substrate shown in FIG. 27.

As shown in FIG. 35, an inter-wiring may be disposed over the gap between the aforementioned two adjacent data signal lines (in the same layer as the pixel electrode) to form the inter-wiring and the linear electrode as a unit. Specifically, an inter-wiring 151 is disposed over the gap between the data signal line 15y and the data signal line 15X (in the same layer as the pixel electrodes 17i and 17I), and the inter-wiring 151 and the linear electrode 41j are connected to each other in the same layer.

In a liquid crystal display device equipped with the active matrix substrate of FIGS. 34 and 35, the crosstalk caused by the parasitic capacitance between each of the pixel electrodes in the pixel region column α and the data signal line 15X, and the crosstalk caused by the parasitic capacitance between each of the pixel electrodes in the pixel region column β and the data signal line 15y can be significantly reduced, and the vertical shadow generated due to the crosstalk can, therefore, be suppressed.

Figure 42:
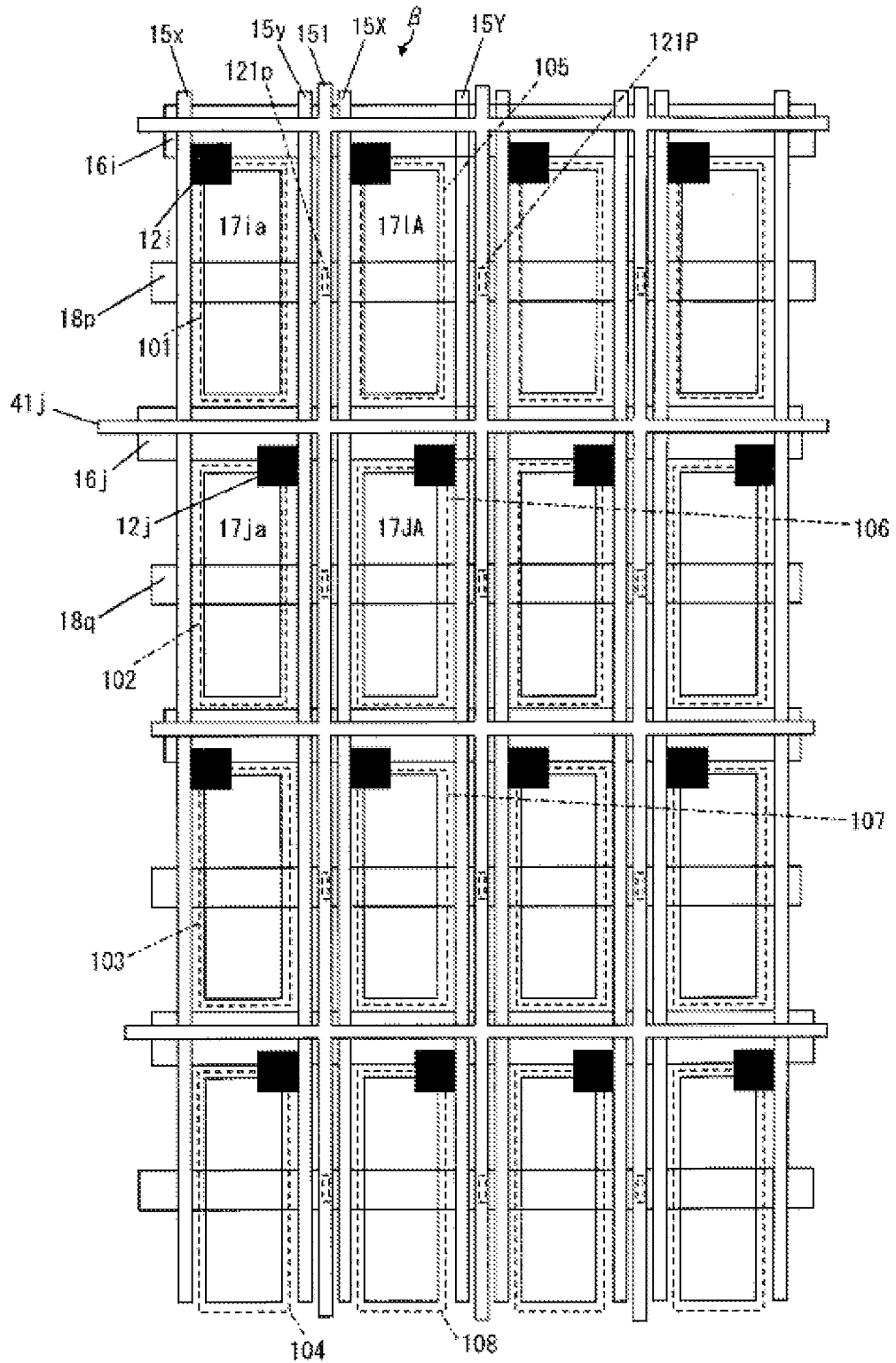
FIG. 42 is a schematic view showing a modification example of the active matrix substrate shown in FIG. 35.

In the configuration of FIG. 35, the inter-wiring and the storage capacitance wiring may also be connected through contact holes (see FIG. 42). For example, the inter-wiring 151 and the storage capacitance wiring 18p are connected to each other through contact holes 121p and 121P. This configuration makes it possible to narrow the frame region. Consequently, it is suitable for a tiled display, for example.

Embodiment 4

Figure 36:
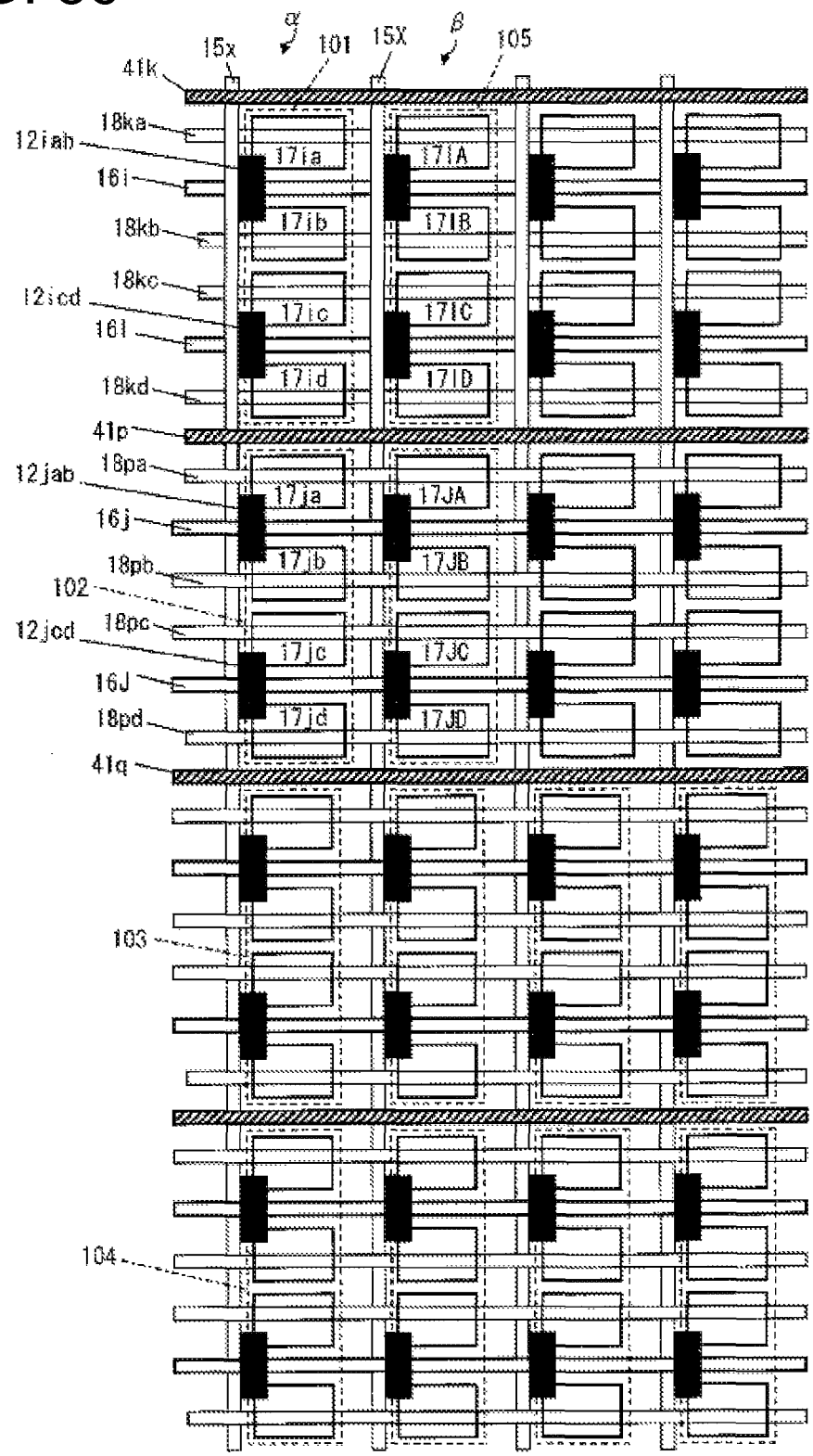
FIG. 36 is a schematic view showing a configuration example of an active matrix substrate according to Embodiment 4.

FIG. 36 is a schematic view showing a portion of an active matrix substrate according to Embodiment 4. The arrangements of the pixel regions, pixel electrodes, and data signal lines on the active matrix substrate of FIG. 36 are the same as those in FIG. 1. For one pixel region row, two scan signal lines, which are to be selected simultaneously, are provided, and for one pixel region column, one data signal line is provided. In one pixel region, four pixel electrodes are disposed along the scanning direction.

Specifically, in the pixel region 101 of the pixel region column α, pixel electrodes 17ia, 17ib, 17ic, and 17id are arranged in this order along the scanning direction. Here, the pixel electrode 17ia is connected to the data signal line 15x through a transistor 12iab tied to the scan signal line 16i, the pixel electrode 17ib is connected to the data signal line 15x through a transistor 12iab tied to the scan signal line 16i, the pixel electrode 17ic is connected to the data signal line 15x through a transistor 12icd tied to the scan signal line 16I, and the pixel electrode 17id is connected to the data signal line 15x through a transistor 12icd tied to the scan signal line 16I. In the pixel region 102, which is adjacent to the pixel region 101 on the downstream side of the scanning direction, pixel electrodes 17ja, 17jb, 17jc, and 17jd are arranged in this order along the scanning direction; and the pixel electrode 17ja is connected to the data signal line 15x through a transistor 12jab tied to the scan signal line 16j, the pixel electrode 17jb is connected to the data signal line 15x through a transistor 12jab tied to the scan signal line 16j, the pixel electrode 17jc is connected to the data signal line 15x through a transistor 12jcd tied to the scan signal line 16J, and the pixel electrode 17jd is connected to the data signal line 15x through a transistor 12jcd tied to the scan signal line 16J.

Similarly, in the pixel region 105 of the pixel region column β, pixel electrodes 17IA, 17IB, 17IC, and 17ID are disposed in this order along the scanning direction. Here, the pixel electrode 17IA is connected to the data signal line 15X through a transistor tied to the scan signal line 16i, the pixel electrode 17IB is connected to the data signal line 15x through a transistor tied to the scan signal line 16i, the pixel electrode 17IC is connected to the data signal line 15X through a transistor tied to the scan signal line 16I, and the pixel electrode 17ID is connected to the data signal line 15X through a transistor tied to the scan signal line 16I. In the pixel region 106, which is adjacent to the pixel region 105 on the downstream side of the scanning direction, pixel electrodes 17JA, 17JB, 17JC, and 17JD are arranged in this order along the scanning direction. Here, the pixel electrode 17JA is connected to the data signal line 15X through a transistor tied to the scan signal line 16j, the pixel electrode 17JB is connected to the data signal line 15X through a transistor tied to the scan signal line 16j, the pixel electrode 17JC is connected to the data signal line 15X through a transistor tied to the scan signal line 16J, and the pixel electrode 17JD is connected to the data signal line 15X through a transistor tied to the scan signal line 16J.

Here, a linear electrode (shield electrode) is disposed in the gap between two adjacent pixel electrodes, one of which being a pixel electrode included in a given pixel region and the other being a pixel electrode included in a pixel region adjacent to the aforementioned given pixel region on the downstream side of the scanning direction, and one storage capacitance wiring is disposed across one pixel electrode (pixel electrode column).

Specifically, the pixel electrode 17id of the pixel region 101 and the pixel electrode 17ja of the pixel region 102 are adjacent to each other, and a linear electrode 41p is disposed in the gap between the pixel electrode 17id and the pixel electrode 17ja. The pixel electrode 17ID of the pixel region 105 and the pixel electrode 17JA of the pixel region 106 are adjacent to each other, and the linear electrode 41p extends through the gap between the pixel electrode 17ID and the pixel electrode 17JA. The storage capacitance wiring 18ka overlaps with each of the pixel electrodes 17ia and 17IA, the storage capacitance wiring 18kb overlaps with each of the pixel electrodes 17ib and 17IB, the storage capacitance wiring 18kc overlaps each of the pixel electrodes 17ic and 17IC, and the storage capacitance wiring 18kd overlaps with each of the pixel electrodes 17id and 17ID. Also, the storage capacitance wiring 18pa overlaps each of the pixel electrodes 17ja and 17JA, the storage capacitance wiring 18pb overlaps each of the pixel electrodes 17jb and 17JB, the storage capacitance wiring 18pc overlaps each of the pixel electrodes 17jc and 17JC, and the storage capacitance wiring 18pd overlaps each of the pixel electrodes 17jd and 17JD.

When a liquid crystal panel equipped with the active matrix substrate of FIG. 36 is driven, the two scan signal lines provided for the same pixel region row are selected simultaneously. Specifically, the scan signal lines 16i and 16I are selected simultaneously, and then 16j and 16J are selected simultaneously. Also, the polarity of the data signals supplied to the same data signal line may reverse every 1H (horizontal scanning period), every plurality of H's, or every 1V (vertical scanning period).

When a constant potential signal (Vcom signal) that is equal to the potential of the common electrode is supplied to the storage capacitance wirings 18ka to 18kd and the storage capacitance wirings 18pa to 18pd, the four pixel electrodes of one pixel region have the same potential. As a result, the pixel has a uniform luminance. In this case, redundancy can be obtained by providing one pixel region with two scan signal lines that are selected simultaneously.

Figure 37:
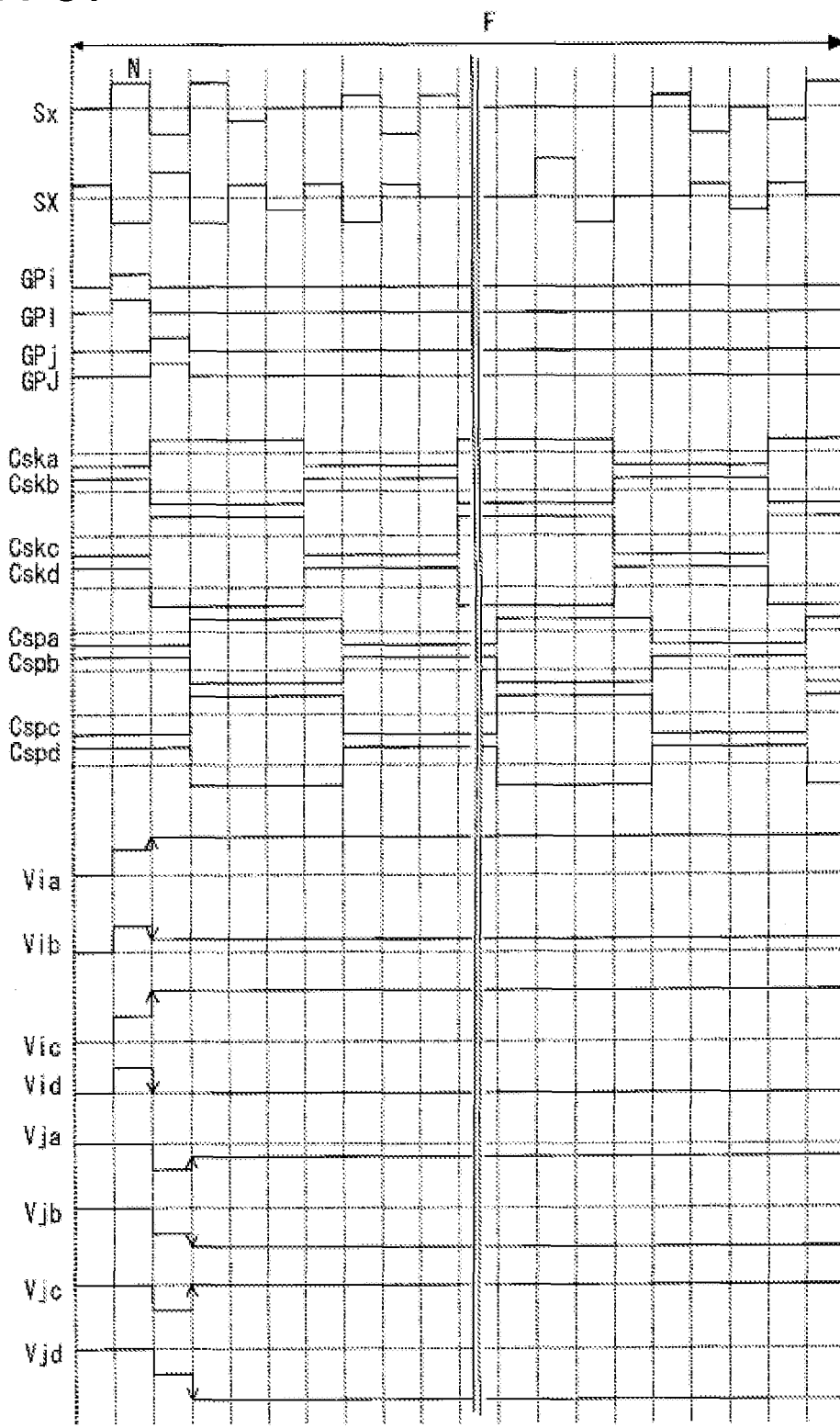
FIG. 37 is a timing chart showing a driving method (one frame) of a liquid crystal panel equipped with the active matrix substrate of FIG. 36.

When modulation signals (storage capacitance wiring signals Cska to Cskd and Cspa to Cspd, which reverse every 4H cycles, as shown in FIG. 37, for example) are supplied to the storage capacitance wirings 18ka to 18kd and the storage capacitance wirings 18pa to 18pd, the four pixel electrodes in a single pixel region can be controlled to a plurality of potentials (see Via (the potential of the pixel electrode 17ia), Vib (the potential of the pixel electrode 17ib), Vic (the potential of the pixel electrode 17ic), Vid (the potential of the pixel electrode 17id) and the like in FIG. 37). As a result, the viewing angle characteristics in the halftone display can be improved.

In embodiments of the present invention, a liquid crystal display unit and a liquid crystal display device are configured as follows. That is, two polarizing plates A and B are attached on respective sides of the liquid crystal panel so that the polarizing axis of the polarizing plate A and the polarizing axis of the polarizing plate B cross each other at a right angle. For the polarizing plates, an optical compensation sheet or the like may be layered as necessary. Next, as shown in FIG. 44(a), drivers (gate driver 202 and source driver 201) are connected. Here, connection of a driver by TCP system is described as an example. First, ACF is temporarily pressure-bonded to the terminal section of the liquid crystal panel. Next, TCP with drivers mounted thereon is punched out from a carrier tape, aligned to the panel terminal electrode, and heated for permanent pressure-bonding. Then, circuit substrates 203 (PWB) for coupling the driver TCPs together and TCP input terminals are connected to each other by ACF. The liquid crystal display unit 200 is thus completed. Subsequently, as shown in FIG. 44(b), a display control circuit 209 is connected to drivers (201 and 202) of the liquid crystal display unit through the circuit substrates 203 for unification with an illumination device (backlight unit) 204 to complete a liquid crystal display device 210.

Figure 45:
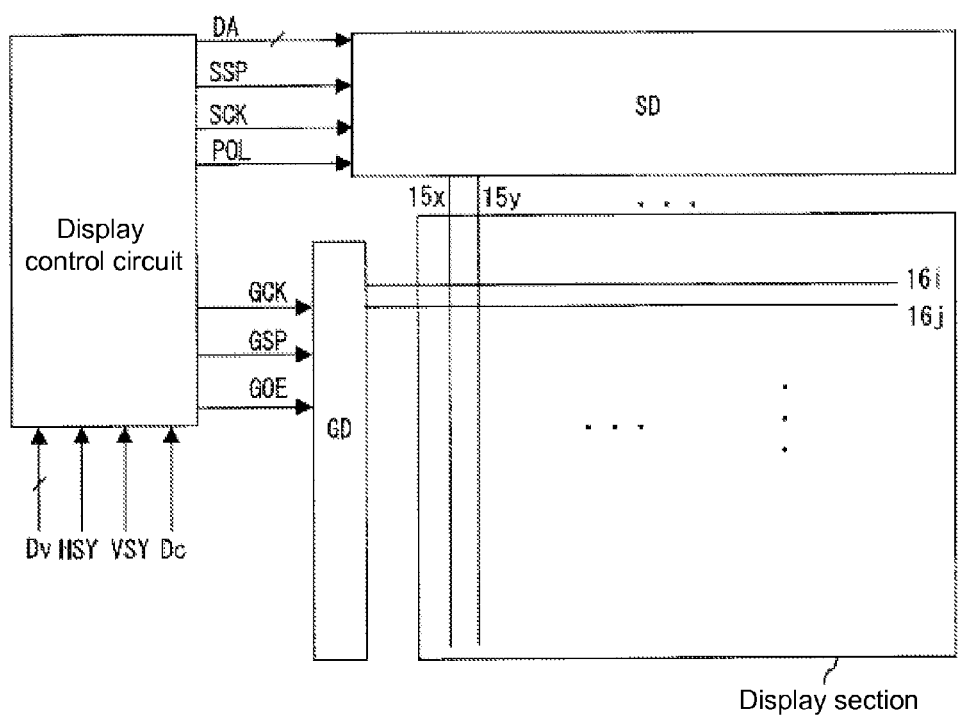
FIG. 45 is a block diagram explaining an entire configuration of a liquid crystal display device according to the present invention.

FIG. 45 is a block diagram showing a configuration of a liquid crystal display device according to the present invention. As shown in the figure, the liquid crystal display device includes a display section (liquid crystal panel), a source driver (SD), a gate driver (GD), and a display control circuit. The source driver drives the data signal lines, the gate driver drives the scan signal lines, and the display control circuit controls the source driver and the gate driver. A storage capacitance wiring driver circuit for driving the storage capacitance wiring (Cs wiring) is provided as necessary.

The display control circuit receives from an external signal source (a tuner, for example) a digital video signal Dv representing images to be displayed, a horizontal synchronization signal HSY and a vertical synchronization signal VSY corresponding to the digital video signal Dv, and a control signal Dc for controlling the display operation. The display control circuit generates signals for displaying images represented by the digital video signal Dv on the display section, based on the received signals Dv, HSY, VSY, and Dc, and outputs them. These are a data start pulse signal SSP, a data clock signal SCK, a digital image signal DA (the signal corresponding to the video signal Dv) representing the image to be displayed, a gate start pulse signal GSP, a gate clock signal GCK, and a gate driver output control signal (scan signal output control signal) GOE.

More specifically, the video signal Dv is subjected to the timing adjustment and the like in the internal memory as necessary, and then is output from the display control circuit as a digital image signal DA. The display control circuit generates: a data clock signal SCK, which is composed of pulses corresponding to the respective pixels of the images represented by the digital image signal DA; a data start pulse signal SSP, which, based on the horizontal synchronization signal HSY, shifts to a high level (H level) for a predetermined period of time for every horizontal scan period; a gate start pulse signal GSP, which, based on the vertical synchronization signal VSY, shifts to H level for a predetermined period of time for every frame period (one vertical scan period); a gate clock signal GCK based on the horizontal synchronization signal HSY; and the gate driver output control signal GOE based on the horizontal synchronization signal HSY and the control signal Dc.

Among signals generated by the display control circuit as described above, the digital image signal DA, the polarity reversing signal POL that controls the polarity of data signals (data signals), the data start pulse signal SSP, and the data clock signal SCK are input to the source driver, and the gate start pulse signal GSP, the gate clock signal GCK, and the gate driver output control signal GOE are input to the gate driver.

The source driver sequentially generates analog potentials (data signals) corresponding to the pixel values at respective scan signal lines of the image represented by the digital image signal DA for every horizontal scan period, based on the digital image signal DA, data clock signal SCK, data start pulse signal SSP, and polarity reversing signal POL, and outputs these data signals to the data signal lines.

The gate driver generates gate signals based on the gate start pulse signal GSP, the gate clock signal GCK, and the gate driver output control signal GOE, and outputs the signals to the scan signal lines to selectively drive the scan signal lines.

As described above, the data signal lines and the scan signal lines in the display section (liquid crystal panel) are driven by the source driver and the gate driver, and data signals are written from the data signal lines to the pixel electrodes through transistors (TFT) connected to the selected scan signal lines. Consequently, voltages are applied to the liquid crystal layer for respective sub-pixels, by which the amount of the light from the backlight that is transmitted is controlled, and images represented by the digital video signal Dv are displayed.

Figure 46:
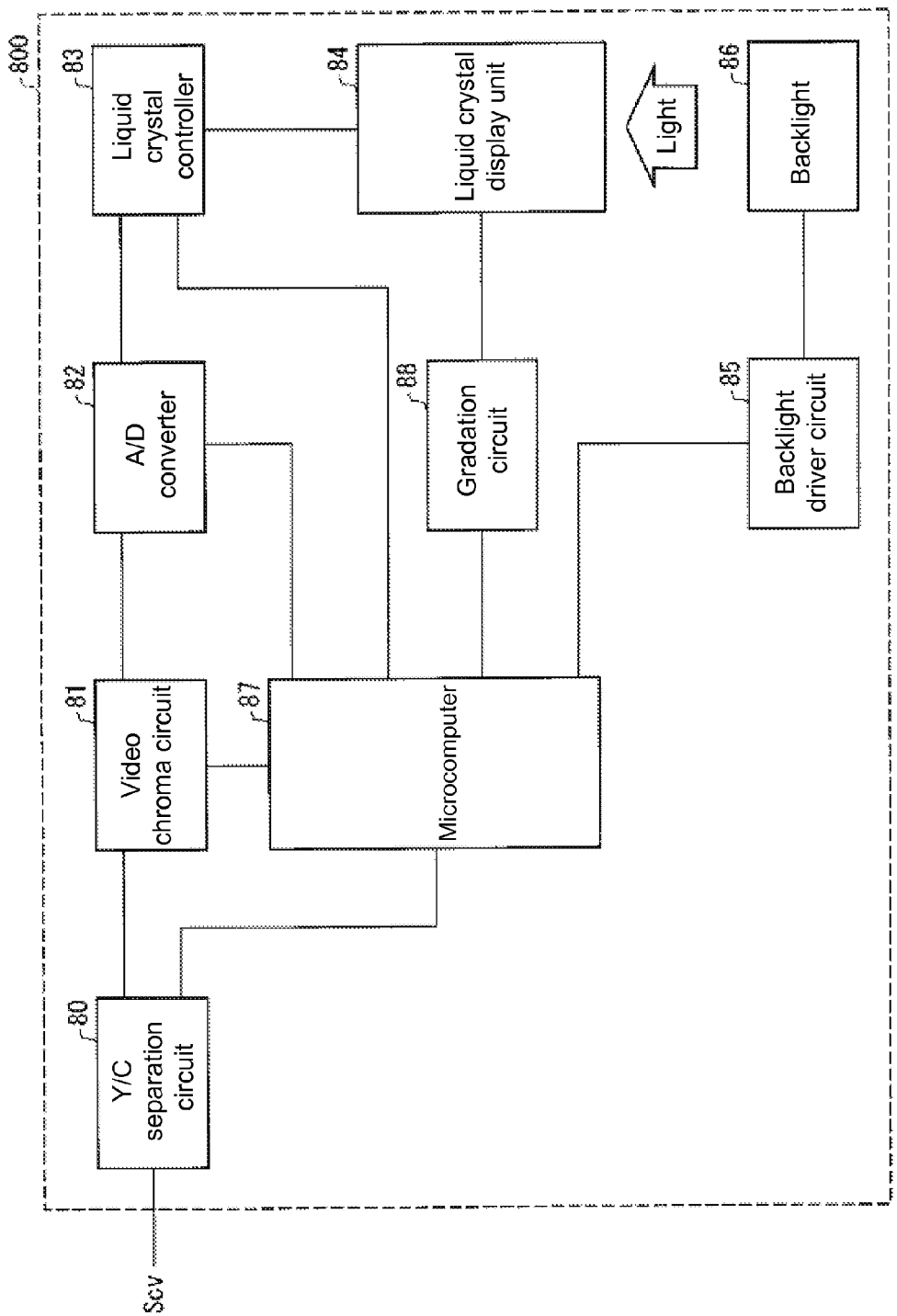
FIG. 46 is a block diagram explaining the functions of a liquid crystal display device according to the present invention.

Next, a configuration example of the liquid crystal display device as applied to a television receiver is described. FIG. 46 is a block diagram showing the configuration of a liquid crystal display device 800 for television receiver. The liquid crystal display device 800 includes a liquid crystal display unit 84, a Y/C separation circuit 80, a video chroma circuit 81, an A/D converter 82, a liquid crystal controller 83, a backlight driver circuit 85, a backlight 86, a microcomputer 87, and a gradation circuit 88. The liquid crystal display unit 84 is composed of a liquid crystal panel and a source driver and a gate driver for driving the liquid crystal panel.

In the liquid crystal display device 800 having the configuration described above, first, a composite color image signal Scv, which is a television signal, is input from outside to the Y/C separation circuit 80. There, the signal is separated into a luminance signal and a color signal. The luminance signal and the color signal are converted to an analog RGB signal corresponding to three primary colors of light by the video chroma circuit 81. Further, this analog RGB signal is converted to a digital RGB signal by the A/D converter 82. The digital RGB signal is input to the liquid crystal controller 83. In the Y/C separation circuit 80, horizontal and vertical synchronization signals are also obtained from the composite color image signal Scv, which is input from outside. These synchronization signals are also input to the liquid crystal controller 83 through the microcomputer 87.

To the liquid crystal display unit 84, the digital RGB signal is input from the liquid crystal controller 83 together with the timing signal based on the aforementioned synchronization signals at a predetermined timing. Also, in the gradation circuit 88, gradation potentials of respective three primary colors R, G, and B for color display are generated, and the gradation potentials are also supplied to the liquid crystal display unit 84. In the liquid crystal display unit 84, signals for driving (data signal, gate signal, and the like) are generated by the internal source driver, the gate driver, and the like based on the RGB signals, the timing signals, and gradation potentials. Based on the signals for driving, color images are displayed on the internal liquid crystal panel. In order for the images to be displayed by the liquid crystal display unit 84, light needs to be radiated from behind the liquid crystal panel in the liquid crystal display unit. In the liquid crystal display device 800, the backlight driver circuit 85 drives the backlight 86 under the control of the microcomputer 87, and irradiates the backside of the liquid crystal panel with the light. Overall system control, including the processes described above, is conducted by the microcomputer 87. Not only image signals based on television broadcasting, but signals of images captured by cameras and of other images supplied via internet connection can also be used as image signals input from outside (composite color image signals). In the liquid crystal display device 800, image display based on various image signals is possible.

Figure 47:
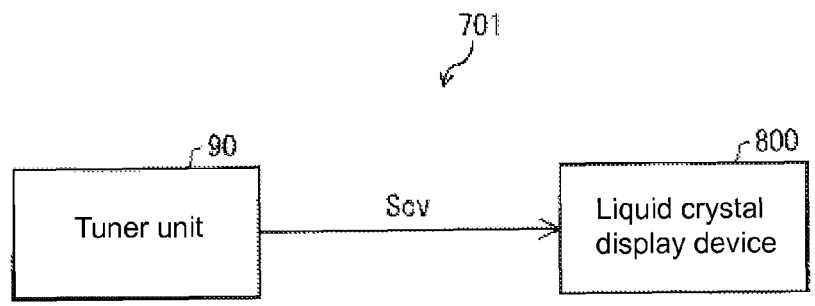
FIG. 47 is a block diagram explaining the functions of a television receiver according to the present invention.

When the liquid crystal display device 800 is used to display images based on television broadcasting, as shown in FIG. 47, a tuner unit 90 is connected to the liquid crystal display device 800 to constitute a television receiver 701. The tuner unit 90 extracts signals of the channel to be received from the waves (high frequency signals) received through an antenna (not shown), and converts the extracted signals to a middle frequency signal. The tuner section 90 then detects the middle frequency signal to retrieve composite color image signal Scv as a television signal. The composite color image signal Scv is input to the liquid crystal display device 800 as described above. Images based on the composite color image signal Scv are displayed by the liquid crystal display device 800.

Figure 48:
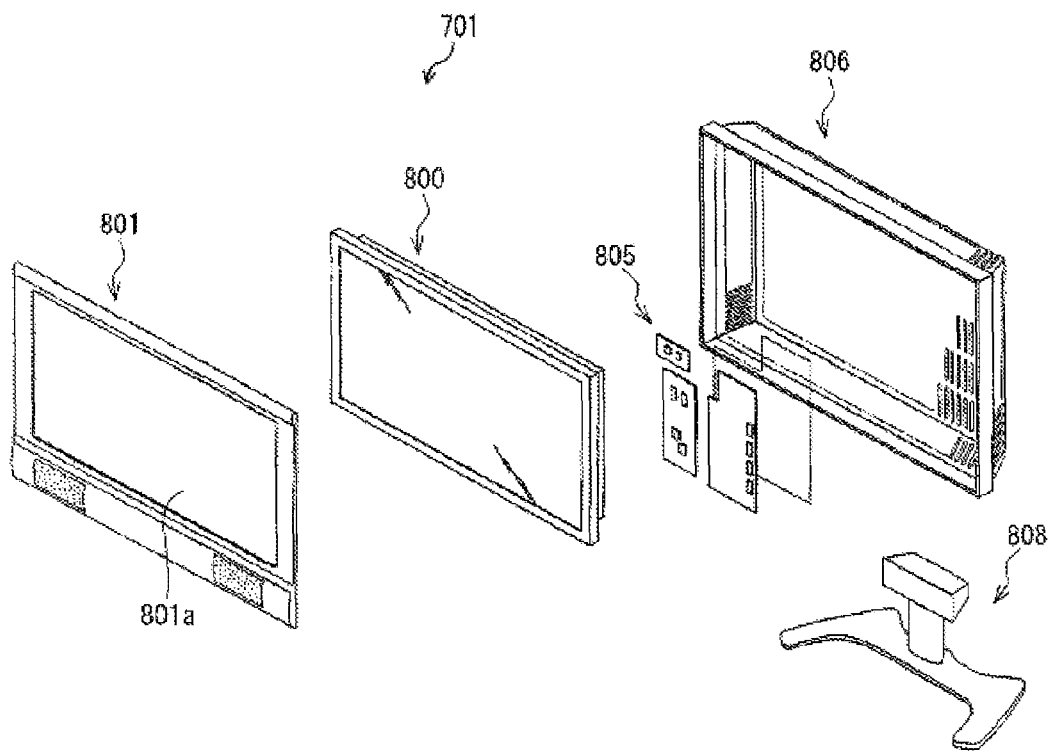
FIG. 48 is an exploded perspective view showing a configuration of a television receiver according to the present invention.
Figure 49:
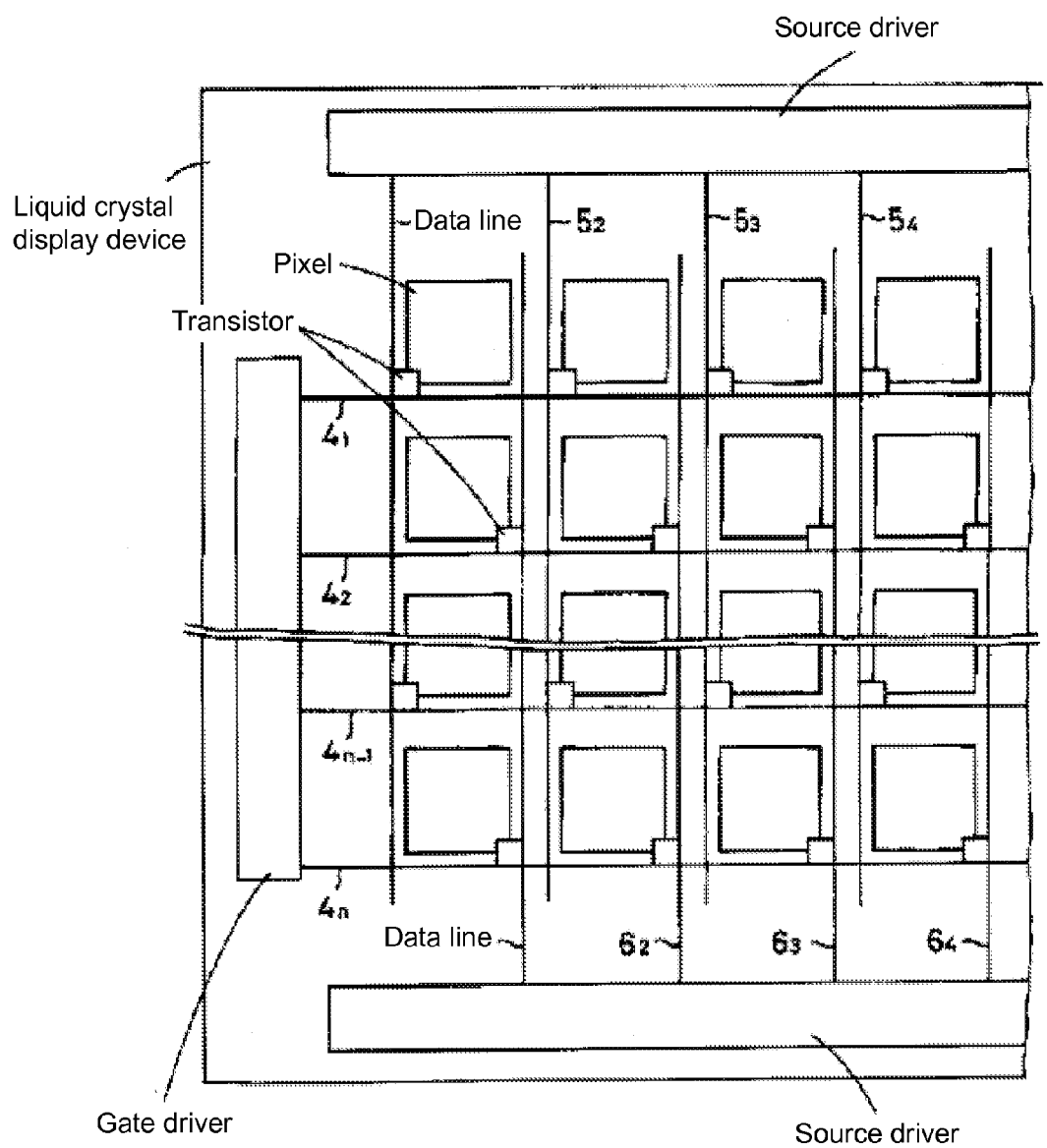
FIG. 49 is a plan view showing the configuration of a conventional active matrix substrate.

FIG. 48 is an exploded perspective view showing a configuration example of a television receiver according to the present invention. As shown in the figure, the television receiver 701 includes a first case 801 and a second case 806, in addition to the liquid crystal display device 800, as its constituting elements, and the liquid crystal display device 800 is held in the first case 801 and the second case 806. In the first case 801, there is an opening portion 801a that transmits the image to be displayed on the liquid crystal display device 800. The second case 806 covers the back side of the liquid crystal display device 800. An operation circuit 805 for operating the display device 800 is provided in the second case 806, and a supporting member 808 is attached at the bottom the second case 806.

An active matrix substrate of the present invention is for use in a liquid crystal display device in which two scan signal lines are simultaneously scanned at a time, and includes a plurality of scan signal lines and a plurality of data signal lines. The active matrix substrate is configured such that, when the scanning direction is the column direction, pixel regions including pixel electrodes are arranged in the row and column directions; one scan signal line is provided for one pixel region row; and a conductive body is disposed to overlap the gap (or disposed in the gap or under the gap) between two adjacent pixel electrodes, one of which being a pixel electrode included in a pixel region at the even numbered position in a pixel region column and the other being the pixel electrode included in the pixel region adjacent to the aforementioned pixel region at the even numbered position on the downstream side of the scanning direction, or a conductive body is disposed to overlap the gap (or disposed in the gap or under the gap) between two adjacent pixel electrodes, one of which being a pixel electrode included in a pixel region at an odd numbered position in a pixel region column and the other being a pixel electrode included in the pixel region adjacent to the aforementioned pixel region at an odd-numbered position on the downstream side of the scanning direction, or a conductive body is disposed to overlap the gap (or disposed in the gap or under the gap) between two adjacent pixel electrodes, one of which being a pixel electrode included in a given pixel region and the other being a pixel electrode included in the pixel region adjacent to the aforementioned given pixel region on the downstream side of the scanning direction.

According to the aforementioned configuration, each of the two adjacent pixel electrodes can be electrically shielded with the conductive body. As a result, a phenomenon that the effective potential fluctuates for every other line (scan signal line) when two scan signal lines are simultaneously scanned at a time can be suppressed, and consequently the horizontal streaks cause by this phenomenon can be reduced.

The present active matrix substrate may also be configured such that the aforementioned conductive body is formed in the same layer with the pixel electrodes.

The present active matrix substrate may also be configured such that a storage capacitance wiring is provided to overlap each of the aforementioned two adjacent pixel electrodes.

The present active matrix substrate may also be configured such that the above-mentioned conductive body and the storage capacitance wiring are connected to each other through a contact hole.

The present active matrix substrate may also be configured such that the above-mentioned conductive body is a part of the linear electrode extending in the row direction.

The present active matrix substrate may also be configured such that the above-mentioned conductive body is an island-shaped electrode.

The present active matrix substrate may also be configured such that two data signal lines are provided for one pixel region column.

The present active matrix substrate may also be configured such that a pixel electrode connected to one of the aforementioned two data signal lines through a transistor is included in a given pixel region of the aforementioned pixel region column, and a pixel electrode connected to the other of the aforementioned two data signal lines through a transistor is included in the pixel region adjacent to the aforementioned given pixel region on the downstream side of the scanning direction.

The present active matrix substrate may also be configured such that an inter-wiring is disposed in or over the gap between two adjacent data signal lines, one of which being a data signal line provided for a given pixel region column and the other being a data signal line provided for a pixel region column adjacent to the aforementioned given pixel region column.

The present active matrix substrate may also be configured such that the aforementioned conductive body and the inter-wiring are formed in the same layer as the pixel electrodes, the conductive body is a part of the linear electrode extending in the row direction, and the linear electrode is connected to the inter-wiring.

The present active matrix substrate may also be configured such that the inter-wiring is formed in the same layer with the data signal line.

The present active matrix substrate may also be configured such that a plurality of pixel electrodes are disposed in a single pixel region.

The present active matrix substrate may also be configured such that a plurality of storage capacitance wirings are provided, two pixel electrodes disposed in a single pixel region are connected to the same data signal line through separate transistors tied to the same scan signal line, and one of the pixel electrodes forms a capacitance with a storage capacitance wiring and the other pixel electrode forms a capacitance with another storage capacitance wiring.

The present active matrix substrate may be configured such that two pixel electrodes provided in a single pixel region are connected to each other through a capacitance, and only one of the pixel electrodes is connected to the data signal line through a transistor tied to one scan signal line.

The present active matrix substrate may be used for a liquid crystal display device in which n scan signal lines are simultaneously scanned at a time, and may include a plurality of scan signal lines and a plurality of data signal lines. The present active matrix substrate may also be configured such that pixel regions including pixel electrodes are arranged in the row and column directions when the scanning direction is the column direction; n scan signal lines that are simultaneously selected are provided for one pixel region row; and a conductive body is disposed to overlap the gap between two adjacent pixel electrodes, one of which being included in a given pixel region and the other being included in a pixel region adjacent to the aforementioned given pixel region on the downstream side of the scanning direction.

The present liquid crystal panel is characterized in that it is equipped with the aforementioned active matrix substrate. Also, the present liquid crystal display device is characterized in that it is equipped with the aforementioned liquid crystal panel.

The present liquid crystal display device is characterized in that it includes the aforementioned active matrix substrate and signals that reverse the polarity periodically is supplied to the respective storage capacitance wirings.

The present television receiver is characterized in that it includes the aforementioned liquid crystal display device and a tuner unit that receives the television broadcasting.

As described above, with the present active matrix substrate, a phenomenon that, when two scan signal lines are simultaneously scanned at a time, the effective potential of every other line (scan signal line) fluctuates can be suppressed. Consequently, horizontal streaks caused by this phenomenon can be reduced.

The present invention is not limited to the embodiments described above. Any appropriate modifications of the embodiments described above based on the known or common technical knowledge, and any combinations of them are also included in embodiments of the present invention. Also, operations and effects and the like discussed in the descriptions of embodiments are merely examples.

INDUSTRIAL APPLICABILITY

An active matrix substrate of the present invention and a liquid crystal panel equipped with the active matrix substrate is suitable, for example, for a liquid crystal television.

DESCRIPTION OF REFERENCE CHARACTERS

101-108 pixel region
12*ia*, 12*ib*, 12*ja*, 12*jb* transistor
15*x*, 15*y*, 15X, 15Y data signal line
16*i*, 16*j*, 16*m*, 16*n* scan signal line
17*ia*, 17*ib*, 17*ja*, 17*jb* pixel electrode
18*p*, 18*q* storage capacitance wiring
41*p*, 41*q* linear electrode (shield electrode)
51, 151 inter-wiring
α, β pixel region column

The invention claimed is:

1. An active matrix substrate for use in a liquid crystal display device in which two scan signal lines are simultaneously scanned at a time, comprising a plurality of scan signal lines and a plurality of data signal lines, wherein pixel regions including pixel electrodes are arranged in row and column directions when scanning direction is the column direction, and one scan signal line is provided for one pixel region row, wherein a conductive body is disposed to overlap a gap between two adjacent pixel electrodes, one of the two adjacent pixel electrodes being an pixel electrode included in a pixel region at an even numbered position and the other being an pixel electrode included in a pixel region adjacent to said pixel region on the even numbered position on a downstream side of a scanning direction, or a conductive body is disposed to overlap the gap between two adjacent pixel electrodes, one of the two adjacent pixel electrodes being a pixel electrode included in a pixel region at an odd-numbered position of a pixel region column and the other being a pixel electrode included in a pixel region adjacent to said pixel region at the odd-numbered position on a downstream side of the scanning direction, or a conductive body is disposed to overlap a gap between two adjacent pixel electrodes, one of the two adjacent pixel electrodes being a pixel electrode included in a given pixel region and the other being a pixel electrode included in a pixel region adjacent to said given pixel region on a downstream side of the scanning direction.

2. The active matrix substrate according to claim 1, wherein said conductive body is formed in same layer as the pixel electrodes.

3. The active matrix substrate according to claim 2, wherein said conductive body and said storage capacitance wiring are connected to each other through a contact hole.

4. The active matrix substrate according to claim 1, wherein a storage capacitance wiring is disposed to overlap each of said two adjacent pixel electrodes.

5. The active matrix substrate according to claim 1, wherein said conductive body is a part of a linear electrode that extends in the row direction.

6. The active matrix substrate according to claim 1, wherein said conductive body is an island-shaped electrode.

7. The active matrix substrate according to claim 1, wherein two data signal lines are provided for one pixel region column.

8. The active matrix substrate according to claim 7, wherein a pixel electrode connected to one of said two data signal lines through a transistor is included in a given pixel region of said pixel region column, and a pixel electrode connected to the other of said two data signal lines through a transistor is included in a pixel region adjacent to said given pixel region on a downstream side of the scanning direction.

9. The active matrix substrate according to claim 7, wherein an inter-wiring is disposed in or over the gap between two adjacent data signal lines, one of the two adjacent data signal lines being a data signal line provided for a given pixel region column and the other being a data signal line provided for a pixel region column adjacent to said given pixel region column.

10. The active matrix substrate according to claim 9, wherein said conductive body and said inter-wiring are formed in the same layer with the pixel electrodes, and wherein said conductive body is a part of a linear electrode extending in the row direction, and said linear electrode is connected to said inter-wiring.

11. The active matrix substrate according to claim 9, wherein said inter-wiring is formed in same layer with the data signal lines.

12. The active matrix substrate according to claim 1, wherein a plurality of pixel electrodes are provided in one pixel region.

13. The active matrix substrate according to claim 12, further comprising a plurality of storage capacitance wirings, wherein two pixel electrodes in one pixel region are connected to same data signal line through separate transistors tied to the same scan signal line, and one of the pixel electrodes forms a capacitance with a storage capacitance wiring and the other pixel electrode forms a capacitance with another storage capacitance wiring.

14. A liquid crystal display device equipped with the active matrix substrate according to claim 13, wherein a signal whose polarity reverses periodically is supplied to the storage capacitance wirings.

15. The active matrix substrate according to claim 12, wherein two pixel electrodes provided in one pixel region are connected to each other through a capacitance, and only one of the pixel electrodes is connected to a data signal line through a transistor tied to one scan signal line.

16. The active matrix substrate according to claim 1, wherein said conductive body is formed in same layer with the data signal lines.

17. A liquid crystal panel equipped with the active matrix substrate according to claim 1.

18. A liquid crystal display device equipped with the liquid crystal panel according to claim 17.

19. A television receiver comprising the liquid crystal display device according to claim 18 and a tuner unit for television broadcasting reception.

20. An active matrix substrate for use in a liquid crystal display device wherein n scan signal lines (where n is an integer of 2 or greater) are simultaneously scanned at a time, said active matrix substrate including a plurality of scan signal lines and a plurality of data signal lines, wherein pixel regions including pixel electrodes are arranged in row and column directions when the scanning direction is the column direction, and n scan signal lines that are simultaneously selected are provided for one pixel region row, and wherein a conductive body is disposed to overlap a gap between two adjacent pixel electrodes, one of the two adjacent pixel electrodes being a pixel electrode included in a given pixel region and the other being a pixel electrode included in a pixel region adjacent to said given pixel region on a downstream side of the scanning direction.

* * * * *